US012671581B2

(12) United States Patent
Chillotti et al.

(10) Patent No.: US 12,671,581 B2
(45) Date of Patent: Jun. 30, 2026

(54) COMPUTATION ON LWE-ENCRYPTED VALUES

(71) Applicant: ZAMA SAS, Paris (FR)

(72) Inventors: Ilaria Chillotti, Paris (FR); Damien Ligier, Paris (FR); Jean-Baptiste Orfila, Vincennes (FR); Samuel Tap, Villeurbanne (FR)

(73) Assignee: ZAMA SAS, Paris (FR)

( * ) Notice: Subject to any disclaimer, the term of this patent is extended or adjusted under 35 U.S.C. 154(b) by 339 days.

(21) Appl. No.: 18/563,752

(22) PCT Filed: May 23, 2022

(86) PCT No.: PCT/EP2022/063874
§ 371 (c)(1),
(2) Date: Nov. 22, 2023

(87) PCT Pub. No.: WO2022/248396
PCT Pub. Date: Dec. 1, 2022

(65) Prior Publication Data
US 2024/0267222 A1     Aug. 8, 2024

(30) Foreign Application Priority Data

| | | |
|---|---|---|
| May 26, 2021 | (EP) ..................................... | 21290033 |
| Sep. 20, 2021 | (EP) ..................................... | 21197779 |

(51) Int. Cl.
| | |
|---|---|
| *H04L 9/30* | (2006.01) |
| *G06F 9/4401* | (2018.01) |
| *H04L 9/00* | (2022.01) |

(52) U.S. Cl.
CPC .......... *H04L 9/3093* (2013.01); *G06F 9/4401* (2013.01); *H04L 9/008* (2013.01)

(58) Field of Classification Search
CPC ...... H04L 9/3093; H04L 9/008; G06F 9/4401
See application file for complete search history.

(56) References Cited

U.S. PATENT DOCUMENTS 11,177,935 B2 * 11/2021 Musuvathi .............. H04L 9/008

OTHER PUBLICATIONS

Paper by Martin R. Albrecht et al., "On the concrete hardness of Leaning with Errors", available in J. Math. Cryptol., vol. 9, No. 3, 2015, 42 pages.

(Continued)

*Primary Examiner* — Vu V Tran
(74) *Attorney, Agent, or Firm* — NIXON & VANDERHYE P.C.

(57) ABSTRACT

Some embodiments are directed to a computer-implemented method (1200) of performing a computation on LWE-encrypted values. The invention relates to the TFHE setting in which the encryption supports a programmable bootstrapping operation that evaluates an LWE decryption in an exponent of a GLWE-encrypted monomial. In this setting, a LWE-encrypted product value is computed based on one or more LWE-encrypted input values by applying a cryptographic key switching operation to convert the LWE-encrypted input values to GLWE-encrypted polynomials, wherein a coefficient of an polynomial is a linear combination of the set of input values; applying an encrypted polynomial multiplication in the GLWE domain, and applying a cryptographic sample extraction operation to the resulting GLWE-encrypted polynomial to obtain the LWE-encrypted product value as an encryption of one of its coefficients.

19 Claims, 11 Drawing Sheets

(56)　　　　References Cited

OTHER PUBLICATIONS

Paper by Christina Boura et al., "CHIMERA: Combining Ring-LWE-based Fully Homomorphic Encryption Schemes", available in J. Math. Cryptol. , vol. 14, 2020, 29 pages.
Paper by Florian Bourse et al., "Fast Homomorphic Evaluation of Deep Discretized Neural Networks", Advances in Cryptology—CRYPTO 2018: 38th Annual International Cryptology Conference, Santa Barbara, CA, USA, Aug. 19-23, 2018, Proceedings, Part III, 30 pages.
Paper by Zvika Brakerski et al., "Fully Homomorphic Encryption from Ring-LWE and Security for Key Dependent Messages", CRYPTO'11: Proceedings of the 31st annual conference on Advances in cryptology, Santa Barbara, CA Aug. 14-18, 2011, 20 pages.
Paper by Zvika Brakerski, "Fully Homomorphic Encryption without Modulus Switching from Classical GapSVP", Annual Cryptology Conference, Advances in Cryptology—CRYPTO 2012, 20 pages.
Paper by Sergiu Carpov et al., New techniques for multi-value input homomorphic evaluation and applications: The Cryptographers'

Track at the RSA Conference 2019, San Francisco, CA, USA, Mar. 4-8, 2019, Proceedings, 20 pages.
Ilaria Chillotti et al., "TFHE: Fast Fully Homomorphic Encryption Over the Torus*", Journal of CRYPTOLOGY, vol. 33, 2020, 58 pages.
Ilaria Chillotti et al., "Programmable Bootstrapping Enables Efficient Homomorphic Inference of Deep Neural Networks", Lecture Notes in Computer Science Cyber Security Cryptography and Machine Learning, 2021, 18 pages.
Paper by Leo Ducas et al., "FHEW: Bootstrapping Homomorphic Encryption in less than a second*", 18 pages, at URL: https://eprint.iacr.org/2014/816.pdf.
Junfeng Fan et al., "Somewhat Practical Fully Homomorphic Encryption*", IACR Cryptol. ePrint Arch. 2012 (2012): 144, 19 pages.
Antonio Guimaraes et al., "Revisiting the functional bootstrap in TFHE", IACR Transactions on Cryptographic Hardware and Embedded Systems, vol. 2021, No. 2, pp. 229-253.
International Search Report and Written Opinion of the ISA for PCT/EP2022/063874 mailed Sep. 20, 2022, 14 pages.

* cited by examiner

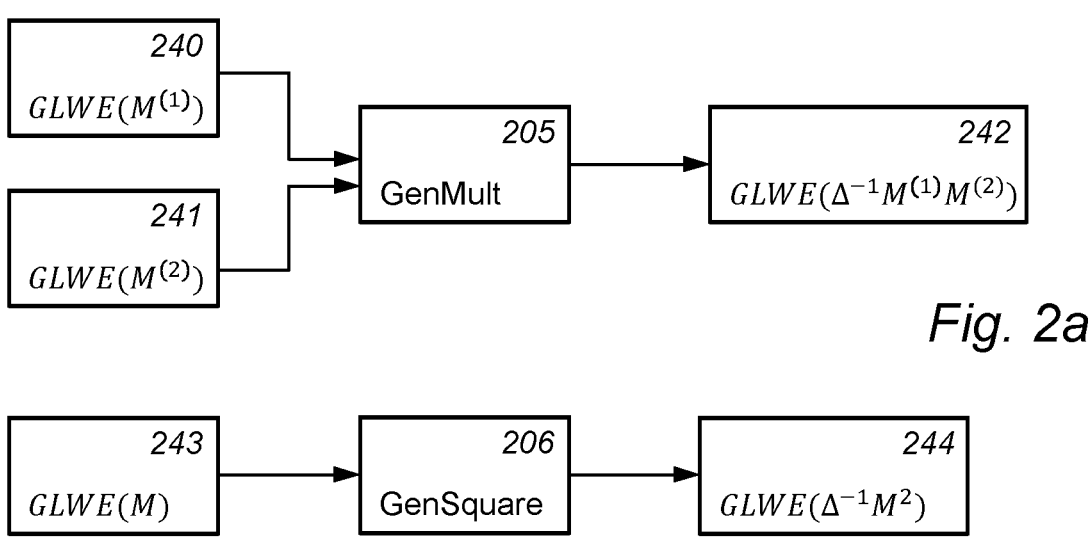
*Fig. 2a*
*Fig. 2b*
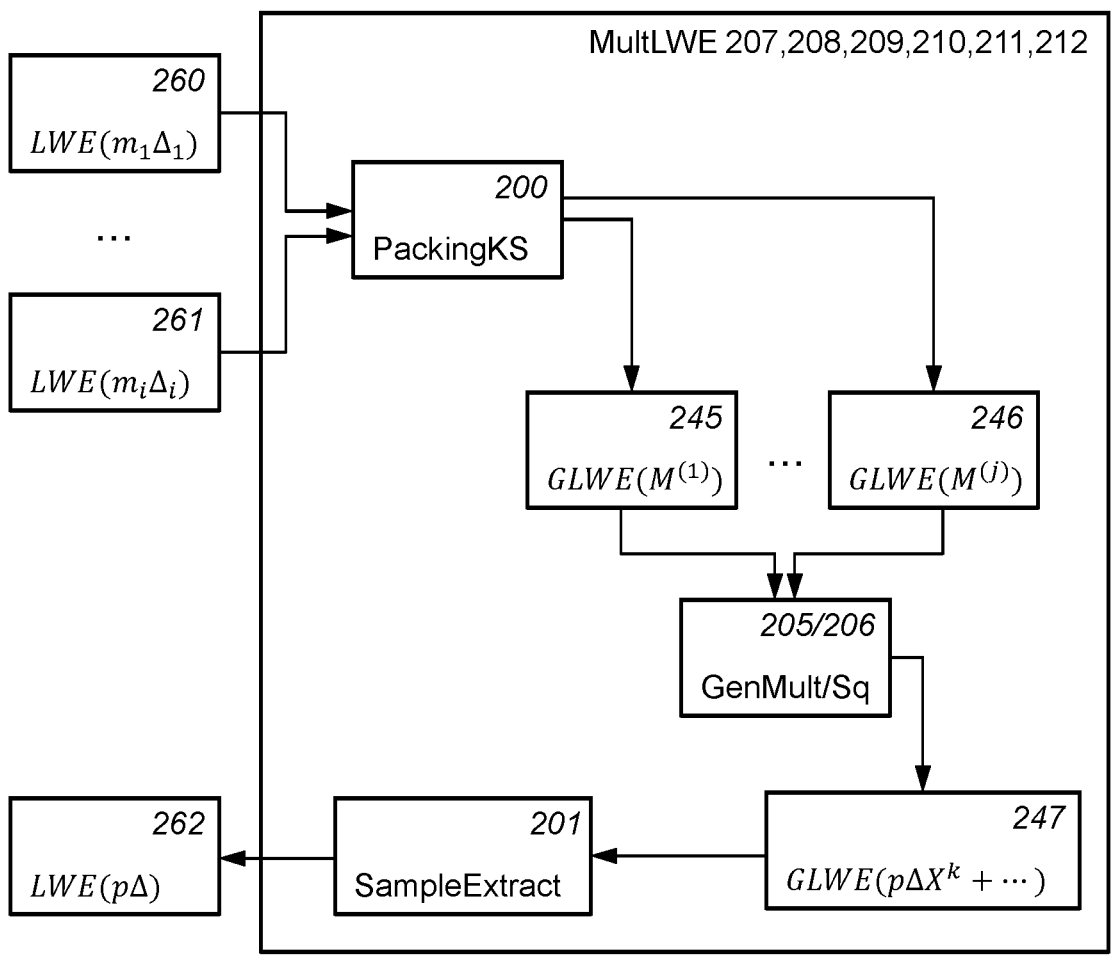
*Fig. 2c*

Fig. 5a $\Delta_{in}$, 593

COMPUTATION ON LWE-ENCRYPTED VALUES

CROSS-REFERENCE TO RELATED APPLICATIONS

This application is the U.S. national phase of International Application No. PCT/EP2022/063874 filed May 23, 2022, which designated the U.S. and claims priority to EP 21290033.6 filed May 26, 2021, and EP 21197779.8 filed Sep. 20, 2021, the entire contents of each of which are hereby incorporated by reference.

TECHNICAL FIELD

The presently disclosed subject matter relates to a computer-implemented method of performing a computation on LWE-encrypted values, to a corresponding device, and to a computer readable medium.

BACKGROUND

Homomorphic cryptography allows one to perform computations, e.g., evaluate circuits, over encrypted data without being able to decrypt. For example, input data and computation results may be received and returned in encrypted form. Intermediate data, e.g., an internal state of the computation, may also be in encrypted form.

Even though the result of the computation is returned in an encrypted form, when decrypted the output is the same as if the operations had been performed on the unencrypted data. Homomorphic encryption can be used for privacy-preserving outsourced storage and computation. This allows data to be encrypted and outsourced to a cloud environment for processing and/or storage, all while encrypted.

For example, homomorphic cryptography may be applied in fields such as health care in which privacy regulations may make it difficult to share plain data, but computations on encrypted medical data may be allowable. For example, a medical model developed, say, to classify medical data may be configured to receive medical data from a third party, say a hospital, in encrypted form. The medical model might, e.g., classify medical data, e.g., as normal or abnormal, or as having some particular medical syndrome, disease, or other disorder. Using homomorphic encryption, the medical model may be applied to medical data that is received in encrypted form. This means that the party that offers the medical model does not have access to the plain medical data that corresponds to the encrypted medical data. The user of the service can decrypt the result of the medical model application.

In particular, homomorphic cryptography techniques exist that can be used, at least in principle, to compute any function on encrypted data. Such techniques are referred to as "fully homomorphic encryption" (FHE) techniques.

Known implementations of FHE use noisy ciphertexts for security reasons. For example, encryption of a data item may comprise mapping the data item to a point in a key-dependent lattice, to which some noise is added. In particular, many known implementations of FHE use LWE-encrypted values, whose encryptions depend on the cryptographic hardness of the Learning With Errors problem, or variants depending e.g. on the Ring Learning With Errors (RLWE) problem or the Generalized Learning With Errors (GLWE) problem.

When a data item has just been encrypted the noise is low—the encryption is fresh. For example, the amount of noise is so low, that if a data item were to be decrypted, the noise can be removed at some point in the decryption process, e.g., by rounding. On the other hand, the noise should be high enough to make attacks on the system sufficiently hard. For example, in the hypothetical absence of noise, many homomorphic encryption schemes could be attacked with linear algebra, or other efficient algorithms, e.g., lattice-based algorithms. When a data item is encrypted, noise is added that is chosen so that attacks are hard while homomorphic operations can still be performed.

Most homomorphic operations increase the noise that is inherent in a homomorphically encrypted data item. When many such operations are performed, the noise may reach a level such that unique decryption is no longer possible. Generally, it is known to use a technique called bootstrapping to reduce the noise of a homomorphically encrypted value. Bootstrapping may use a public key called a bootstrapping key. By using bootstrapping to reducing noise when needed, in principle it is possible to compute any desired number of homomorphic operations.

A particular class of fully homomorphic encryption schemes are the TFHE-like homomorphic encryption schemes. Such a scheme is described in I. Chillotti et al., "TFHE: fast fully homomorphic encryption over the torus", J. Cryptol., 33(1):34-91, 2020 (incorporated by reference herein) and also in I. Chillotti et al., "Programmable Bootstrapping Enables Efficient Homomorphic Inference of Deep Neural Networks", available at https://eprint.iacr.org/2021/091/20210127:133406. TFHE-like schemes differentiate themselves from other FHE schemes by supporting a comparatively very efficient technique for bootstrapping. This bootstrapping technique can reduce noise in an LWE-encrypted input value by evaluating a LWE decryption in an exponent of a GLWE-encrypted monomial, resulting in an LWE-encrypted output value with an amount of noise that is independent of the noise in the LWE-encrypted input value. The TFHE bootstrapping is also programmable in the sense that the output value can be the result of applying a function on the input value.

Although TFHE-like schemes allow a wide range of computations to be performed on encrypted data relatively efficiently, there is still a need to improve these schemes, in particular to improve the efficiency with which these operations can be carried out, and/or to support a wider range of operations that can be performed.

SUMMARY

According to one aspect of the invention, a computer-implemented method of performing a computation on LWE-encrypted values is provided, as defined by the claims. According to a second aspect, a device for performing a computation on LWE-encrypted values is provided, as defined by the claims. According to a third aspect, a computer-readable medium is provided as defined by the claims.

Generally, the claims relate to performing computations on LWE-encrypted values. In general, a LWE-encrypted value may be an encryption of a value that is based on the cryptographic hardness of a Learning With Errors (LWE) problem. LWE-encrypted values are generally single numeric values. The claims also relate to the use of GLWE-encrypted polynomials. A GLWE-encrypted polynomial may be an encryption of a polynomial based on a Generalized Learning With Errors problem. Generally, a GLWE encryption may be used to encrypt polynomials of degree strictly smaller than a given polynomial ring dimension $N$. In this specification, the term GLWE-encrypted polynomial, and sometimes also simply GLWE, is used to refer to the case where the polynomial ring dimension is larger than one, e.g., GLWE does not include LWE.

The claims relate to LWE encryptions according to a "TFHE-like" fully homomorphic encryption scheme, meaning: a scheme that supports a programmable bootstrapping (PBS) operation that evaluates an LWE decryption of the LWE-encrypted input value in an exponent of a GLWE-encrypted monomial. An example is the scheme of I. Chillotti et al. The programmable bootstrapping may be applied according to an identity function, in which case it may result in an encryption of the same input value with less noise, or with another function, in which case it may result in an encryption of the result of applying the function to the input value. The programmable bootstrapping may use a set of bootstrapping keys that enable the bootstrapping while not allowing to decrypt the LWE-encrypted values.

The programmable bootstrapping operation in TFHE-like schemes makes them an appealing choice for a wide range of applications. Because bootstrapping is relatively efficient compared to many other FHE schemes, it is much more feasible to perform relatively complex computations, e.g., with a multiplicative depth of at least 10, at least 50, or at least 100. In particular, the cryptographic parameters of TFHE-like schemes can be selected based on the required precision and resulting computational cost, independently from the quantity of homomorphic operations and their circuit depth. In other FHE schemes, in contrast, bootstrapping is so inefficient that, in practice, these schemes are typically applied in a levelled way, meaning that their parameters are selected depending on a given computation such that it can be performed without the need for bootstrapping. Such a levelled approach is not feasible for more complex computations, however, so in such cases, TFHE-like schemes are particularly beneficial.

However, a disadvantage of existing TFHE-like schemes is that they have a number of limitations regarding multiplications of LWE-encrypted values. (Throughout this specification, the term "product" is used to refer to a result of a multiplication.) Multiplication $x \cdot y$ is typically implemented using the programmable bootstrapping operation, either directly by writing the product in terms of univariate functions and applying the programmable bootstrapping to these univariate functions, e.g., $x \cdot y = (x+y)^2/4 - (x-y)^2/4$, or indirectly using circuit bootstrapping and an external product.

Using the PBS to perform multiplication can have at least two disadvantages. The first one is that a PBS is relatively expensive in terms of computational efficiency and memory and storage requirements for the key material it uses. The second one is that the known PBS has the restriction that its input needs to have a bit of padding, in other words, the most significant bit of an LWE-encrypted input value to which the PBS is applied, needs to be zero, or at least, to be known. This is a consequence of the way in which the existing PBS evaluates the LWE decryption in the exponent of the GLWE-encrypted monomial, as is discussed in more detail elsewhere. This restriction of the PBS restricts which values can be multiplied by using it, e.g., $x+y$ and $x-y$ in the example above may both be required to have a bit of padding. This is undesirable, because it restricts the size of the values that can be computed on, or necessitates the use of larger parameters to allow computations on values of a given size, making the computations less efficient.

Interestingly, the inventors managed to find an alternative way to perform multiplications in TFHE-like schemes. Namely, the inventors were able to implement a multiplication of LWE-encrypted input values a, b of a TFHE-like scheme by converting them to GLWE-encrypted polynomials p(x), q(x) using a cryptographic key switching operation. The key switching may result in GLWE-encrypted polynomials with coefficients equal to the input values, e.g., $p(x) = a \cdot x^0$ and $q(x) = b \cdot x^0$, or, more generally, to a linear combination of input values. An encrypted polynomial multiplication may then be applied to the GLWE-encrypted polynomials to obtain a GLWE encryption of a product, e.g., $p(x)q(x) = ab \cdot x^0$, of the polynomials. By performing a suitable key switching, a coefficient of the polynomial product, e.g., the constant coefficient, can be equal to a product $a \cdot b$ of the LWE-encrypted input values, or, more generally, to a desired sum of products of linear combinations of these input values. The desired product value can then be obtained as an LWE encryption by applying a cryptographic sample extraction operation to the GLWE-encrypted product or an encryption derived from it.

While encrypted polynomial multiplication of GLWE-encrypted polynomials is known per se, the inventors made the surprising finding that this encrypted polynomial multiplication can be used to improve multiplications of LWE-encrypted values, i.e., non-polynomials, in the TFHE-like setting. It would initially seem that this is not possible. GLWE polynomial multiplication is typically applied in the levelled setting, where cryptographic parameters are typically chosen to be very large to enable a particular application without the need for bootstrapping. In TFHE-like schemes, because bootstrapping is more efficient, parameters are typically selected much smaller and in an application-independent way. This difference in setting in itself already makes it seem unlikely that GLWE polynomial application techniques would work in a TFHE-like setting.

In particular, GLWE encryptions used in the TFHE-like setting for programmable bootstrapping typically have relatively small parameters for efficiency reasons, e.g., parameter $n = kN$ of at most 640 or a most 1000, e.g., $n = 630$, e.g., in combination with $q = 2^{32}$. The output of the known PBS for such known parameters may have a relatively small number of noiseless bits, e.g., less than 8. GLWE multiplication is typically applied in settings with much more noiseless bits, e.g., at least 20, at least 100, or at least 250. In the TFHE-like setting, applying techniques from this setting would be expected to add so much noise to the message that its meaningful contents would completely disappear. Indeed, an elaborate noise analysis by the inventors shows that in the above example, a combination of key switching, GLWE multiplication, and sample extraction might result in an around 11 extra bits of noise, thus completely eliminating the 8 available noiseless bits. Interestingly, however, using the same noise analysis, the inventors discovered that when using a suitable polynomial ring dimension, e.g., at most or at least $N = 2^{11}$ or at most or at least $N = 2^{12}$, it is possible to perform the multiplication such that sufficient noiseless bits remain. With these parameters, still, it is possible to efficiently perform programmable bootstrapping.

Moreover, the inventors found that using GLWE polynomial multiplication in the TFHE setting, greatly improves efficiency. It was found possible to reduce the cost of a multiplication from twice doing a PBS at a cost of over 500 external products, to performing operations with a cost equivalent to less than 7 external products. Also the amount of key material needed for the multiplication was found to be reduced, by a factor of over two. Another advantage is that it is possible to multiply two LWE-encrypted values without the need for a bit of padding. This means that given the same parameters, it is possible to perform multiplications on larger values. It also enables various other applications that were not possible before in the TFHE setting, various examples of which are given throughout this specification.

Also from the point of view of levelled techniques, it would seem unnatural to combine these techniques with TFHE programmable bootstrapping. Since the cryptographic parameters used in the levelled setting are typically much larger, applying programmable bootstrapping in this setting is much less efficient. Moreover, in the levelled setting, SIMD (single instruction, multiple data) packing is typically used. With SIMD packing, multiple plaintexts may be combined in a single GLWE polynomial encryption, and a homomorphic operations may be applied to the single ciphertext to apply the operation to each of the underlying plaintexts, allowing to amortize the time for the operation over the respective plaintexts. TFHE bootstrapping is not compatible with the SIMD packing, making it impractical to integrate TFHE in the levelled setting.

In an embodiment, the GLWE-encrypted polynomial multiplication may be implemented using a relinearization. A GLWE encryption may be regarded as a degree-1 polynomial in the secret key (e.g., seen as a single variable in case of RLWE or as multiple variables for other types of GLWE encryption). Thus, by computing a polynomial product of GLWE encryptions, seen as polynomials in the secret key, a polynomial may be obtained that has degree 2 in the secret key. A relinearization key may be provided that can be used to transform this degree-2 polynomial back to a degree-1 polynomial, e.g., a GLWE encryption of the product, without obtaining the plaintext. Such GLWE multiplication based on relinearization is known per se and, when used to implement multiplication of LWE-encrypted values as discussed above, was found to provide the mentioned computational and storage efficiency improvements.

In an embodiment, the provided techniques may be used to multiply LWE-encrypted first and second values, that is, to determine a LWE encryption of the product of the first and second values. To this end, the key switching may be used to determine GLWE-encrypted first and second input polynomials having the first and second values as coefficients (e.g., as the constant coefficient). A GLWE-encrypted product of the first and second input polynomials may be computed, such that a coefficient of the resulting output polynomial is equal to the desired product. A LWE encryption of the product may be obtained by using the sample extraction to extract this coefficient.

In an embodiment, the provided techniques may be used to compute an inner product between a first set of LWE-encrypted values and a second set of LWE-encrypted values. To this end, GLWE-encrypted first and second input polynomials may be determined having the first and second sets of values as coefficients, respectively. The values may be mapped to the coefficients in such a way that a coefficient of the product polynomial corresponds to the inner product. An LWE-encrypted inner product may then be obtained as a coefficient of the GLWE-encrypted output polynomial. Interestingly, the GLWE polynomial multiplication only needs to be computed once, making this inner product computation more efficient than separately multiplying the input values.

Many variations are possible. For example, additional values may be included in the GLWE-encrypted input polynomials to compute, e.g., multiple products using a single GLWE polynomial multiplication. For example, the product value may represent a quadratic function in the LWE-encrypted input values that can thus be efficiently evaluated. It is also possible to perform additional operations in the GLWE polynomial domain, e.g., having computed a GLWE-encrypted product polynomial, it is possible to apply a further polynomial multiplication based on this GLWE-encrypted product polynomial, such that the obtained LWE-encrypted product value may represent a cubic or even higher-degree polynomial function in the LWE-encrypted input values.

In an embodiment, a computation on LWE-encrypted values may involve both a computation of an LWE-encrypted product value and a programmable bootstrapping operation, e.g., the programmable bootstrapping may be applied to the LWE-encrypted product value, or the LWE-encrypted product value may be computed for an LWE-encrypted input value based on a programmable bootstrapping. This way, it is possible to combine both an efficient (programmable) bootstrapping, and an efficient multiplication without padding, in the same homomorphic computation, which was not possible before.

By enabling the computation of LWE-encrypted product values without padding, many other applications are enabled as well. For many of these applications, it is not important how exactly this product value is determined, e.g., it is irrelevant for these applications whether or not it is done with a key switching, a GLWE-encrypted polynomial multiplication, and a sample extraction. Although the inventors are not aware of existing alternative techniques for efficiently computing LWE-encrypted product values, the inventors do envisage the use of these applications in combination with any other current or future technique for computing an LWE-encrypted product value, e.g., any technique resulting in a product value without padding.

In an embodiment, the provided techniques are used to improve the TFHE programmable bootstrapping operation. As mentioned above for the particular case of multiplying two values, the known TFHE programmable bootstrapping has the problem that it requires its LWE-encrypted input value to have a bit of padding. This requirement is due to its modulus switching. The modulus switching scales the LWE-encrypted input value to the domain $[0,2N)$, where N is the polynomial ring dimension of the GLWE encryption. A blind rotation is then performed to decrypt the scaled LWE encryption in the exponent, resulting in a monomial $X^{m'}$, with $m' \in [0,2N)$. Due to dimension N, the relation $X^N = -1$ holds, such that for values m' lying in $[N,2N)$, the resulting monomial is $-X^{m'-N}$. As a consequence, with the known programmable bootstrapping, it is not possible to evaluate a function whose value depends on the most significant bit, and/or the resulting output may have an incorrect sign.

Interestingly, the inventors realized that this deficiency can be remedied by using a multiplication without padding. To this end, a programmable bootstrapping may be applied, but the modulus switching may be performed such that it scales the LWE-encrypted input value in a way that results in an LWE-encrypted function output correct up to a sign. For example, if the function is to be applied to the full input value, it can be scaled to $[0,N)$. In this case, the blind rotation may result in a monomial $X^{m'}$, where, because exponents of X are values modulo 2N subject to the relation $X^N = -1$, the monomial may be correct up to the sign. As also discussed elsewhere, other scalings are possible to control the part of the input value to which the programmable bootstrapping is applied, while still obtaining a result correct up to the sign.

As the inventors realized, by using this same programmable bootstrapping also to apply a constant function to the LWE-encrypted input value, an LWE-encrypted constant output may be obtained, that is correct up to the same sign: if the LWE-encrypted function output is correct then the LWE-encrypted constant output is correct, and if the LWE-encrypted function output is negated, then the LWE-encrypted constant output is negated as well.

Interestingly, the fact that the two signs are the same, means that the programmable bootstrapping of the function can be corrected according to the LWE-encrypted constant output correct up to the sign, namely, by computing a corrected function output such that it is correct both when the signs are both correct and when the signs are both incorrect. Thus, an improved programmable bootstrapping may be obtained that works correctly without requiring its inputs to have a bit of padding.

The correction may be performed in various ways. In an embodiment, the programmable bootstrapping may be used to obtain an LWE encryption of the function output $\pm f(x)$ correct up to the sign, and this LWE encryption may be multiplied by the constant encryption, e.g. of $\pm 1$, or of another constant if a rescaled output is desired. If the signs are correct then the result is $+f(x) \cdot +1 = f(x)$. If the signs are incorrect then the result is $-f(x) \cdot -1 = f(x)$. Thus, the multiplication corrects the function output.

In an embodiment, the correcting may be performed in the GLWE domain. The LWE-encrypted constant output correct up to the sign may be converted to a GLWE-encrypted constant polynomial up to the sign, e.g., $\pm 1 \cdot X^0$. The GLWE-encrypted monomial of the programmable bootstrapping, e.g., $\pm X^{m'}$, may be multiplied by the GLWE-encrypted constant polynomial. This can be done at any suitable point during the programmable bootstrapping, e.g., before or after multiplying by a test polynomial. The result is the same: the programmable bootstrapping of the LWE-encrypted function output is corrected so that a bit of padding is no longer needed.

Apart from varying in which domain the correction is applied, it can also be varied what correction is applied. In a particularly advantageous embodiment, the programmable bootstrapping is used to apply respective functions $f_0$, $f_1$ to obtain respective function outputs $\pm f_0(x)$, $\pm f_1(x)$; and to apply a constant function to obtain a constant $\pm c$ correct up to the sign. In this case, the constant $\pm c$ can be used not only to correct the sign, but also to select whether to use the output of the function $f_0$ or the output of the function $f_1$. In particular, the constant may be equal to $\frac{1}{2}$ up to scaling, in which case the correction may be performed to compute an LWE-encrypted output $(\pm\frac{1}{2}+\frac{1}{2})\cdot\pm f_0(x)+(\pm\frac{1}{2}-\frac{1}{2})\cdot\pm f_1(x)$, up to scaling. If the sign is positive, then the output may correspond to $f_0(x)$; if the sign is negative, then the output may correspond to $f_1(x)$.

Thus, effectively, an overall function $f(x)$ may be computed that corresponds to $f_0(x)$ if the sign is positive and to $f_1(x)$ if the sign is negative. As discussed, the sign may be incorrect if the most significant bit of x is set to 1, and correct otherwise. Thus, an overall function $f(x)$ may be computed by splitting it into a function $f_0(x)$ for the case where the most significant bit is not set and a function $f_1(x)$ for the case where the most significant bit is set. Interestingly, this way of computing $f(x)$ is typically more efficient than computing $f(x)$ by using a PBS for the overall function. The functions $f_0$ and $f_1$ have a domain that is half the size of the domain of $f(x)$. Namely, both functions can ignore the most significant bit of the function. Also the identity function only needs to be evaluated on a domain that is half the size of the domain of $f(x)$. Performing three programmable bootstrappings of a domain of half the size may be more efficient than performing one bootstrapping of the full size of the domain. Thus, surprisingly, efficiency of performing a programmable bootstrapping can be improved, while still, a bit of padding is not needed. Another advantage is that the three bootstrappings can be performed in parallel, making it particularly efficient to implement the PBS in a multithreaded way.

In an embodiment, the programmable bootstrapping to apply the function and the programmable bootstrapping to apply the constant function share their blind rotation operations. Thus, a single GLWE-encrypted monomial may be computed that is then multiplied by respective test polynomials for the function and the constant function. If two functions $f_0$, $f_1$ are used as discussed herein, they can share the blind rotation as well. Since the blind rotation is an expensive part of the programmable bootstrapping, being able to share it greatly improves efficiency.

In an embodiment, the programmable bootstrapping operation may be used to apply multiple respective functions to the LWE-encrypted input value. This can be done by applying a test polynomial that represents function outputs of the multiple respective functions. Namely, the programmable bootstrapping typically comprises multiplying the GLWE-encrypted monomial representing the message by a test polynomial representing the function to be applied (e.g., by starting with the test polynomial and applying the blind rotation to it, or by first performing the blind rotation and then multiplying the result with the test polynomial). The test polynomial may be constructed such that a certain output coefficient (typically the constant coefficient) of the product corresponds to the function output. As the inventors realized, the test polynomial can be constructed such that other coefficients with a fixed offset from the output coefficient, e.g., coefficients directly following the output coefficient, correspond to outputs of further functions. The respective polynomial coefficients can then be extracted to obtain the respective function outputs. This way, multiple functions can be computed using the same programmable bootstrapping. This technique is not only efficient, but interestingly, also the resulting noise growth is limited because it is independent from the evaluated functions. This technique can also be combined with using redundant test polynomials to account for noise.

In an embodiment, by applying the multiple respective functions to the LWE-encrypted input value, a circuit bootstrapping operation may be performed. As is known per se, circuit bootstrapping can be used to convert a LWE ciphertext to a ciphertext for use in a levelled evaluation, for example, to a GGSW ciphertext. Circuit bootstrapping is a computationally intensive procedure, of which evaluating multiple functions on the same LWE ciphertext is an important part. Thus, it benefits particularly from the provided techniques.

In an embodiment, the programmable bootstrapping without padding may be used to extract a least significant part of an LWE-encrypted input value. To this end, a suitably rescaled identity function may be applied to an LWE-encrypted input value to obtain an LWE-encrypted function output. The modulus switching may be configured to scales the LWE-encrypted input value such that the LWE-encrypted function output encrypts the least significant part of the input value. By subtracting the LWE-encrypted least significant part from the LWE-encrypted input value, an LWE-encrypted remainder may be obtained, on which this process may be repeated. Thus, the LWE-encrypted input value can be decomposed into smaller chunks, e.g., k-bit chunks for some k, e.g., k=1, k is at most or at least two, or k is at most or at least four.

Interestingly, by using the scaling in the modulus switching, it is enabled to extract the chunks using a programmable bootstrapping whose input domain corresponds to the size of the chunk and not of the size of the input value. Because a programmable bootstrapping without padding is used, a correct decomposition can be obtained even though the chunk in the LWE-encrypted input value is not guaranteed to be preceded by a bit of padding.

In an embodiment, respective extracted LWE-encrypted least significant parts, suitably scaled, may be added together to obtain an LWE-encrypted output value representing a bootstrapping of the input value. Thus, from being able to decompose the LWE-encrypted input value into chunks, a particular efficient way of bootstrapping the LWE-encrypted input value to reduce its noise can be obtained.

In an embodiment, respective extracted LWE-encrypted least significant parts, suitably scaled, may be input to respective programmable bootstrapping operations to apply an overall function to the LWE-encrypted input value. Thus, an overall function may be decomposed into subfunctions that act on the chunks of the input value, using techniques that are known per se, and this way, the overall function may be evaluated more efficiently on the overall input value. Since the chunks are extracted by means of more efficient programmable bootstrappings, the overall function can be evaluated in a more efficient way.

In an embodiment, the provided techniques for multiplying LWE-encrypted values can be used to evaluate a binary circuit on one or more LWE-encrypted binary input values. In particular, an AND gate may be implemented as a multiplication of LWE-encrypted values by noting that, if binary true is represented as one and binary false is represented as zero, up to scaling, then an AND gate corresponds to a multiplication up to scaling. Thus, the improved multiplication directly results in improved evaluation of binary circuits.

It is particularly beneficial to encode binary false and true as zero and half the modulus of the LWE encryption (or the other way around). This way, several binary operations, particularly, XOR and NOT, may be implemented in terms of addition and subtraction of ciphertexts, making them particularly efficient. In particular, several such operations may be applied to a ciphertext without the need for a bootstrapping or programmable bootstrapping after each one of them. It was not previously possible to use this particularly advantageous encoding: the encoding uses the most significant to encode the binary value, and the known programmable bootstrapping and multiplication are not able to compute on this bit since they require a bit of padding.

When needed, a programmable bootstrapping may be applied to reduce noise in an LWE-encrypted binary value. When binary values are represented as zero or half the modulus of the LWE encryption, two particularly efficient ways of performing this programmable bootstrapping are possible. One way is to multiply the GLWE-encrypted monomial for the binary value by a test polynomial such that the programmable bootstrapping results in an LWE-encrypted bootstrapping output equal to plus or minus a quarter of the LWE modulus. A quarter of the LWE modulus can then be added to obtain a bootstrapping of the input bit that is equal to zero or half the modulus. Another way is to scale the LWE-encrypted binary value such that the programmable bootstrapping results in an LWE-encrypted function output that is itself equal to zero or half the LWE modulus. Both techniques allow to efficiently bootstrap an LWE-encrypted bit, as computed for example by one or more XOR and NOT operations, and thus enable more efficient binary circuit evaluation.

In an embodiment, the programmable bootstrapping may be used to evaluate an arithmetic circuit modulo $2^k$ for some $k>1$. Similarly to the binary case above, such values may be encoded in the upper k bits of a LWE encryption. The arithmetic circuit may include an addition that keeps the k least significant bit. This operation may be efficiently implemented as an addition of the corresponding ciphertexts. A negation may be implemented by negating the ciphertext. Similarly, a multiplication that keeps the least significant bits may be efficiently implemented by performing a multiplication of LWE ciphertexts without padding, as described herein. Again, this was not previously possible because of the need of a bit of padding.

In an embodiment, in the context of an arithmetic circuit modulo $2^k$ or otherwise, an addition or multiplication may be performed that keeps only a most significant part, e.g., that discards the k least significant bits. Interestingly, also such an addition or multiplication can be implemented efficiently by means of a programmable bootstrapping without padding.

In particular, one way to implement these operations is to first compute the full LWE-encrypted sum or product, possibly after first scaling the inputs such that the computation of the sum or product preserves the most significant bits. Then, the programmable bootstrapping may be used to extract the least significant part, e.g., k bits, by applying an identity function, suitably rescaled if needed, to the LWE-encrypted sum or product, while using a modulus switching to scale the LWE-encrypted sum or product such that the programmable bootstrapping results in the LWE-encrypted least significant part. This scaling of the LWE-encrypted sum or product to keep only the least significant part is possible because a programmable bootstrapping is used that does not need a bit of padding. Because of the scaling, the identity function needs to be applied to a domain only the size of the least significant part, improving its efficiency. The LWE-encrypted least significant part may then be extracted from the LWE-encrypted sum or product to get the desired LWE-encrypted result.

The provided techniques for improved computations on encrypted data may be applied in a wide range of practical applications. Such practical applications include the encrypted evaluation of software programs without having access to plain data. For example, one may evaluate medical diagnostic software on medical data without having actual access to said medical data. Medical data may comprise a medical image. A medical image may comprise, e.g., multi-dimensional image data, e.g., to two-dimensional (2D), three-dimensional (3D) or four-dimensional (4D) images, acquired by various acquisition modalities such as, but not limited to, standard X-ray Imaging, Computed Tomography (CT), Magnetic Resonance Imaging (MRI), Ultrasound (US), Positron Emission Tomography (PET), Single Photon Emission Computed Tomography (SPECT), and Nuclear Medicine (NM).

In an embodiment, the provided techniques may be used to evaluate a neural network on encrypted inputs. The party evaluating the neural network may or may not have plaintext access to the trained parameters of the neural network, e.g., weights and biases. In general, the techniques provided herein, e.g., the improved multiplication and the programmable bootstrapping without the need for a padding bit, improve the efficiency of evaluating the neural network, or, looking at it from another way, improve the precision that can be obtained with the same cryptographic parameters. In particular, by using the programmable bootstrapping where the LWE-encrypted constant output correct up to the sign is used to select and correct the LWE-encrypted function output correct up to the sign or the LWE-encrypted further function output correct up to the sign, and/or by using the decomposition into chunks to apply an overall function, it becomes possible and less costly to compute an inference with more bits of precision.

An embodiment of the method may be implemented on a computer as a computer implemented method, or in dedicated hardware, or in a combination of both. Executable code for an embodiment of the method may be stored on a computer program product. Examples of computer program products include memory devices, optical storage devices, integrated circuits, servers, online software, etc. Preferably, the computer program product comprises non-transitory program code stored on a computer readable medium for performing an embodiment of the method when said program product is executed on a computer.

In an embodiment, the computer program comprises computer program code adapted to perform all or part of the steps of an embodiment of the method when the computer program is run on a computer. Preferably, the computer program is embodied on a computer readable medium.

BRIEF DESCRIPTION OF DRAWINGS

Further details, aspects, and embodiments will be described, by way of example only, with reference to the drawings. Elements in the figures are illustrated for simplicity and clarity and have not necessarily been drawn to scale. In the figures, elements which correspond to elements already described may have the same reference numerals. In the drawings, FIG. 1a schematically shows an example of an embodiment of a device for performing a computation on LWE-encrypted values;

FIG. 2a schematically shows an example of an embodiment of a method "GenMult" of applying an encrypted GLWE multiplication;

FIG. 2b schematically shows an example of an embodiment of a method "GenSquare" of applying an encrypted GLWE multiplication;

FIG. 2c schematically shows an example of an embodiment of a method "MultLWE" of computing an LWE-encrypted product value;

FIG. 5a schematically shows an example of an embodiment of a method "WoP-PBS" of applying a function and further function to an LWE-encrypted input value;

12

Figure 7A:
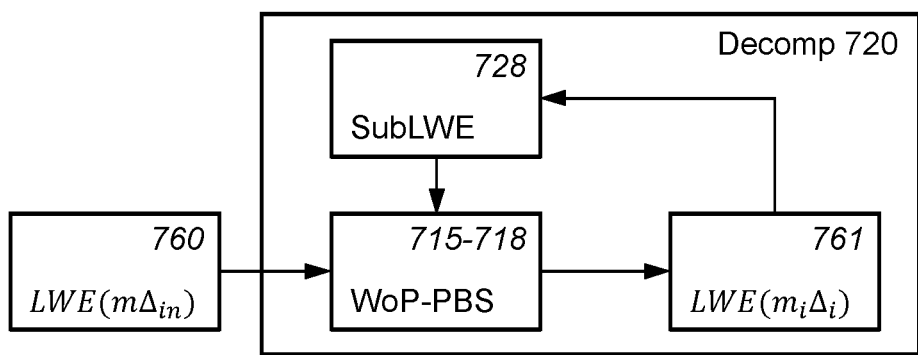
Figure 7B:
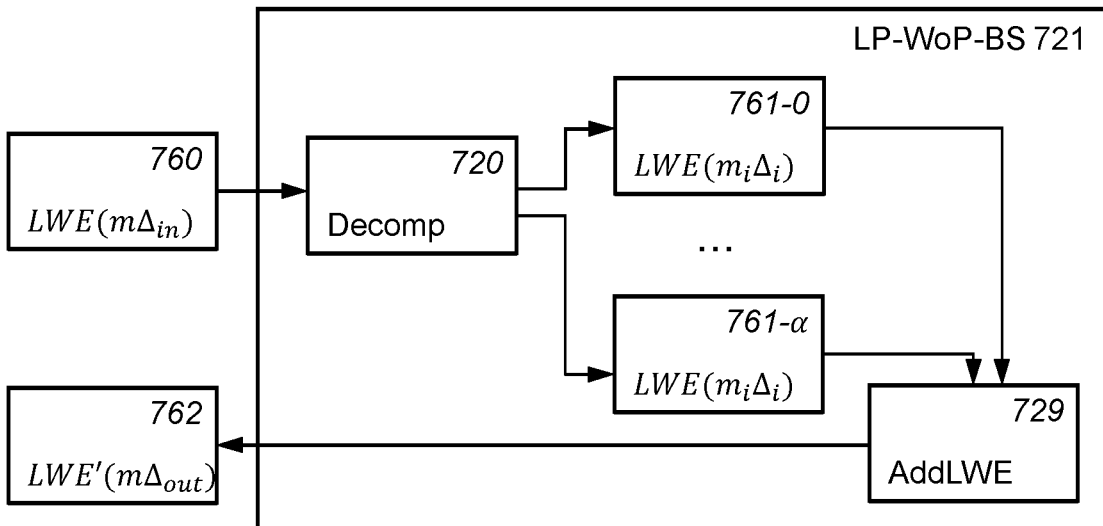
Figure 7C:
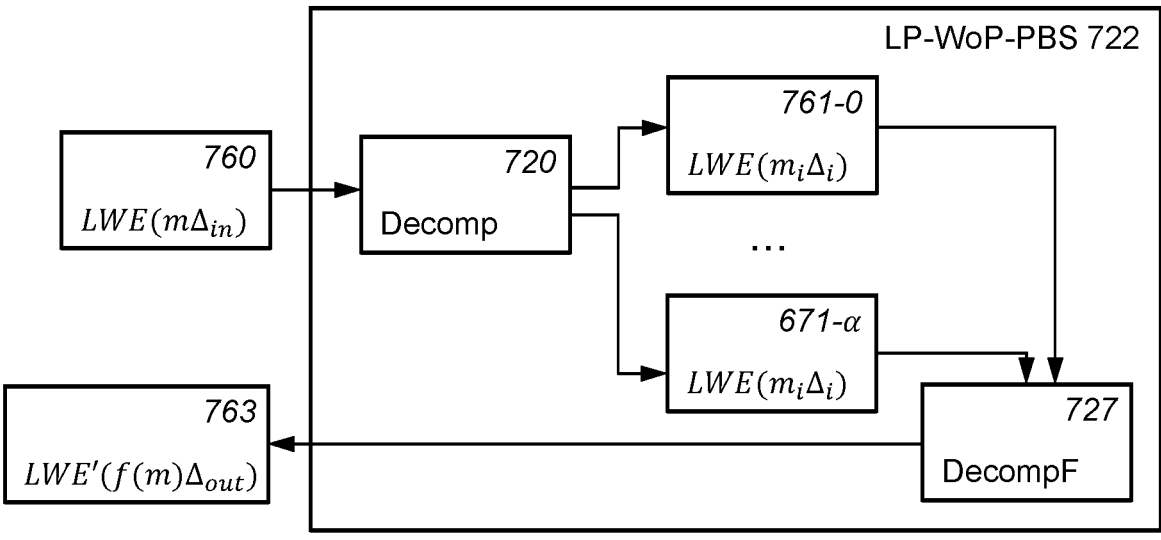
Figure 8A:
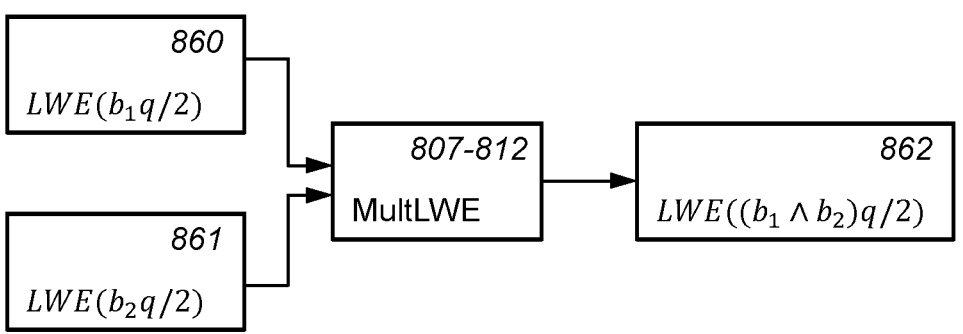
Figure 8B:
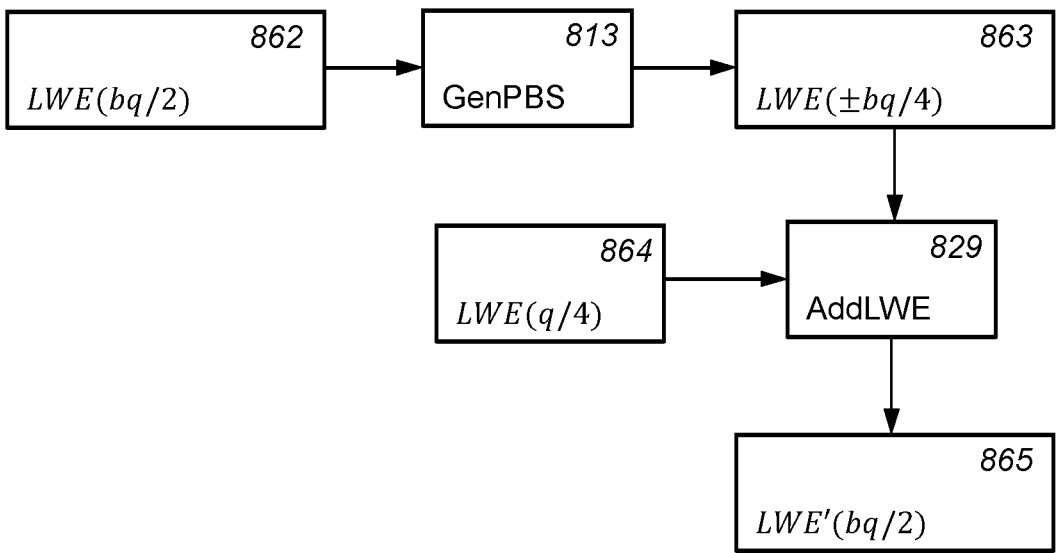
Figure 8C:
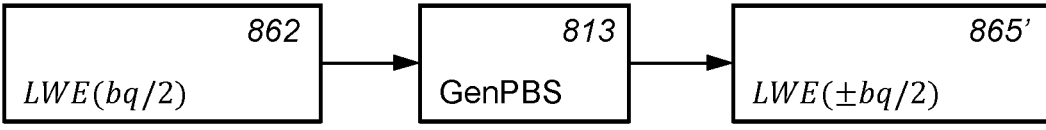
Figure 9:
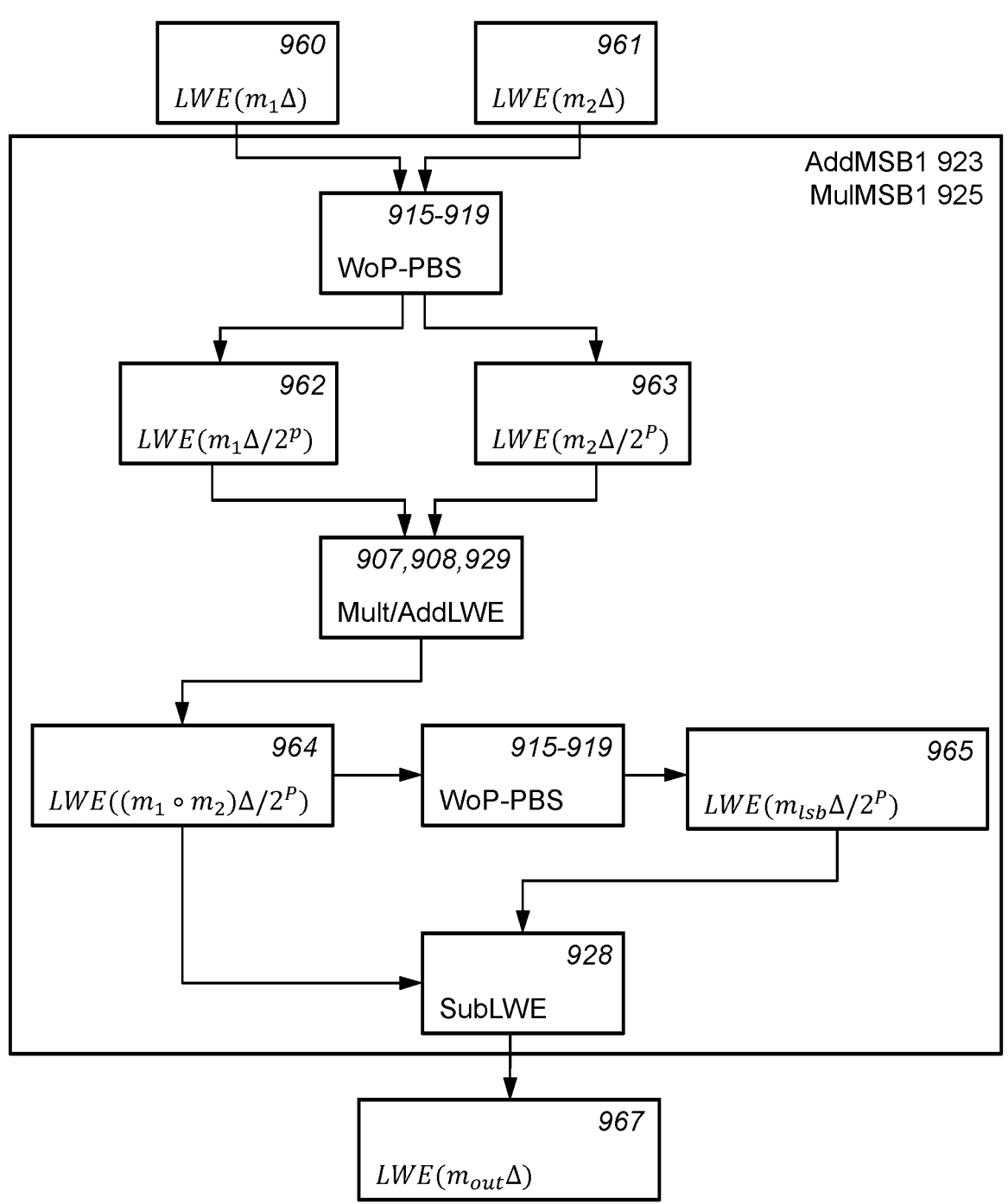
Figures 10A, 10B:
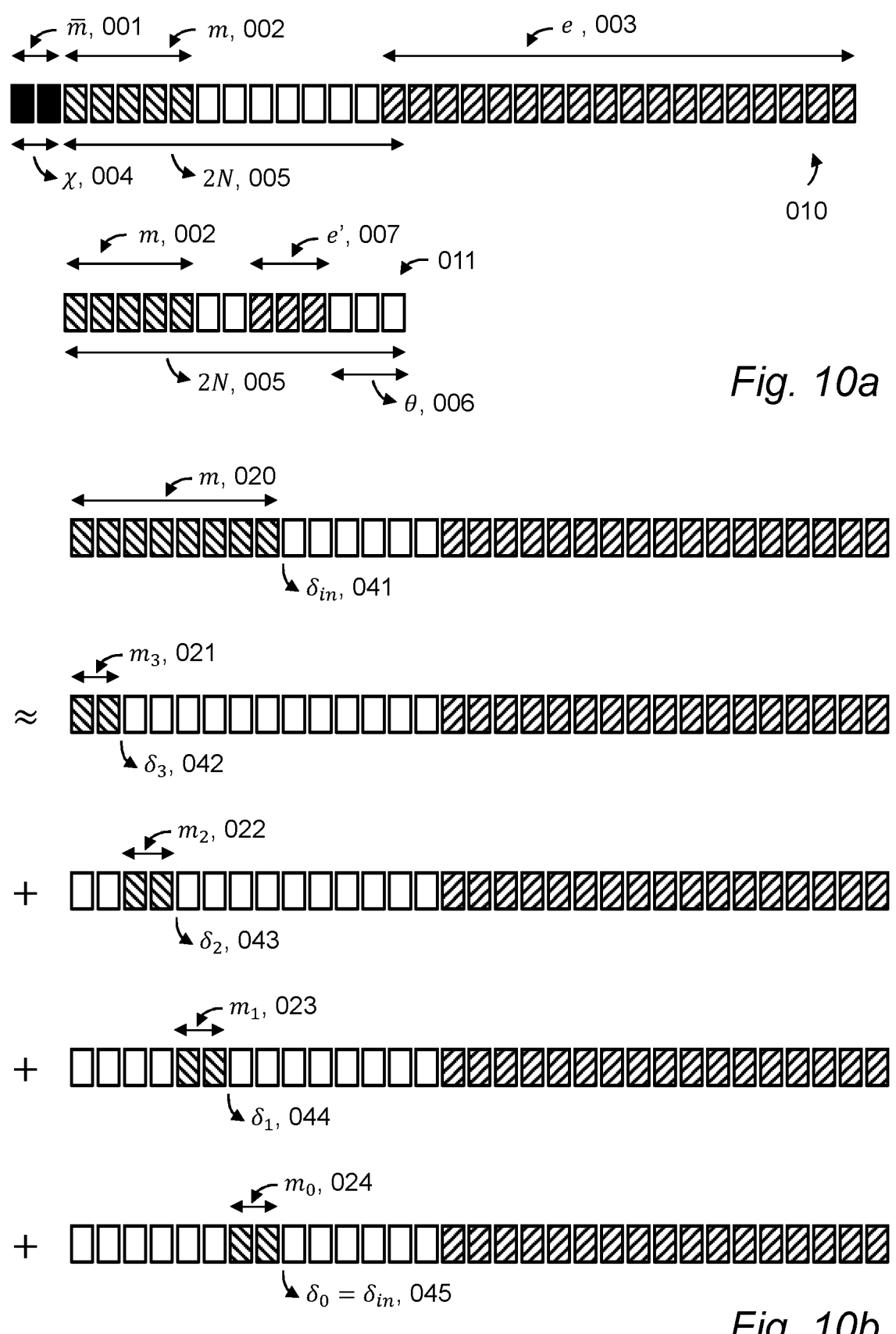
Figure 11A:
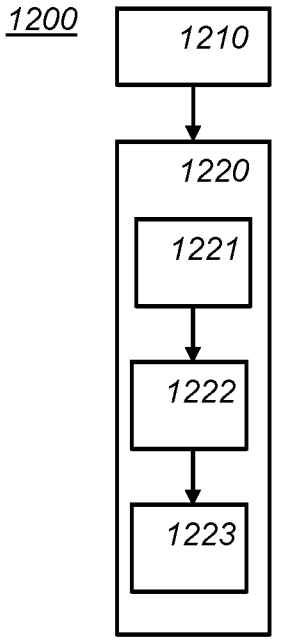
Figure 11C:
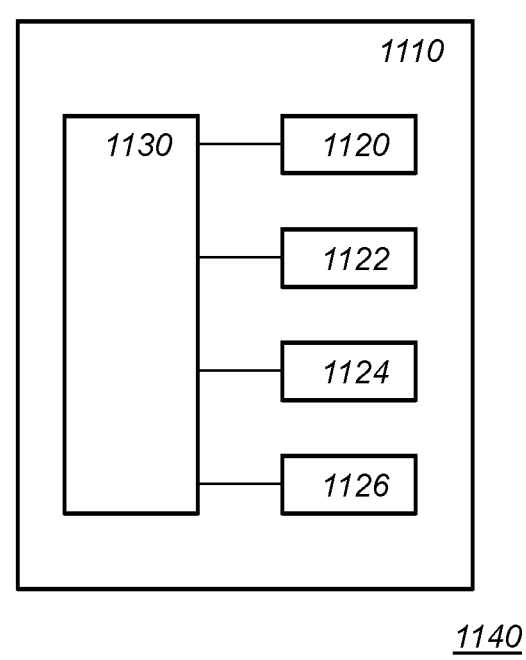
Figure 11B:
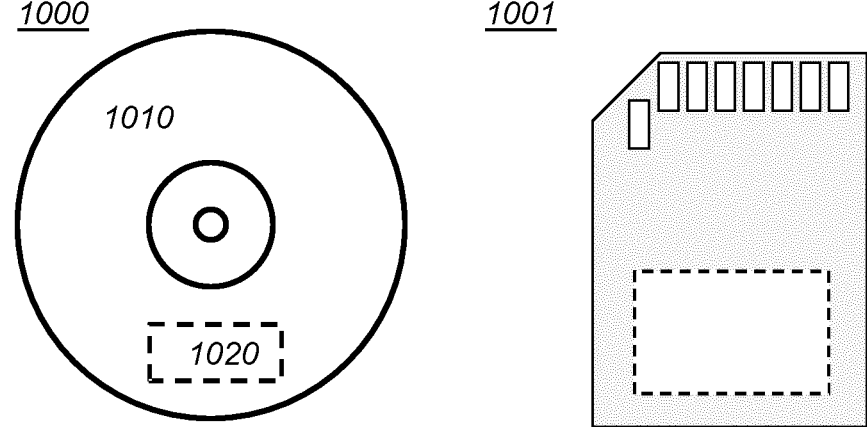

FIG. 7a schematically shows an example of an embodiment of a method "Decomp" of extracting least significant parts of an input value;

FIG. 7b schematically shows an example of an embodiment of a method "LP-WoP-BS" of bootstrapping an LWE-encrypted input value;

FIG. 7c schematically shows an example of an embodiment of a method "LP-WoP-PBS" of applying an overall function to an LWE-encrypted input value;

FIG. 8a schematically shows an example of an embodiment of a method of computing an AND gate on one or more LWE-encrypted binary input values;

FIG. 8b schematically shows an example of an embodiment of a method reducing noise in an LWE-encrypted binary value;

FIG. 8c schematically shows an example of an embodiment of a method reducing noise in an LWE-encrypted binary value;

FIG. 9 schematically shows an example of an embodiment of a method "AddMSB1"/"MulMSB1" of adding or multiplying LWE-encrypted input values and keeping a most significant part;

FIG. 10a schematically shows an example of a modulus switching operation;

FIG. 10b schematically shows an example of extracting respective LWE-encrypted least significant parts of an LWE-encrypted input value;

FIG. 11a schematically shows an example of an embodiment of a computer-implemented method of performing a computation on LWE-encrypted values;

FIG. 11b schematically shows a computer readable medium having a writable part comprising a computer program according to an embodiment;

FIG. 11c schematically shows a representation of a processor system according to an embodiment.

DESCRIPTION OF EMBODIMENTS

While the presently disclosed subject matter is susceptible of embodiment in many different forms, there are shown in the drawings and will herein be described in detail one or more specific embodiments, with the understanding that the present disclosure is to be considered as exemplary of the principles of the presently disclosed subject matter and not intended to limit it to the specific embodiments shown and described.

In the following, for the sake of understanding, elements of embodiments are described in operation. However, it will be apparent that the respective elements are arranged to perform the functions being described as performed by them.

Further, the subject matter that is presently disclosed is not limited to the embodiments only, but also includes every other combination of features described herein or recited in mutually different dependent claims.

Various embodiments relate to values that are encrypted based on the Learning With Errors (LWE) problem or the Generalized Learning With Errors (GLWE) problem. This means that the encryption scheme has the LWE or GLWE problem as an underlying cryptographic hardness problem. Several examples of such encryption schemes are known per se and can be used with the provided techniques.

One known way of encrypting a plaintext M according to an LWE-based or GLWE-based encryption scheme is by encrypting the message as one or more random elements and a sum of an inner product of the random elements with the secret key; an error element; and the plaintext, for example:

$$CT = \left(A_1, \ldots, A_k, B = \sum_{i=1}^{k} A_i \cdot S_i + E + P\right) \in \mathcal{R}_q^{k+1}$$

In this example, q is a modulus; N is a polynomial ring dimension, typically, a power of two; $\mathcal{R} = \mathbb{Z}[X]/f(X)$ with $f(X)$ irreducible, typically $f(x)=X^N+1$ where N is a power of two; $\mathcal{R}_q=\mathbb{Z}/q\mathbb{Z}[X]/f(X)$; $(S_1, \ldots, S_k) \in \mathcal{R}^k$ is the secret key;

$$\{A_i\}_{i=1}^{k}$$

are the random elements in $\mathcal{R}_q$; E is the error polynomial in $\mathcal{R}_q$; and $P=\lfloor \Delta \cdot M \rceil_q$ is the plaintext $M \in \mathcal{R}_q$, in this case scaled according to a scaling factor $\Delta$. LWE encryption corresponds to the special case k=n>1 and N=1. Ring Learning With Errors (RLWE) encryption corresponds to the special case k=1 and N>1. Generally, a GLWE-encrypted polynomial can be obtained by taking N>1 and any k (thus, RLWE encryption of polynomials is an example of GLWE encryption of polynomials).

The polynomial ring dimension N used in GLWE is typically a power of 2. The random elements may be sampled as polynomials with coefficients sampled from the uniform distribution in $\mathbb{Z}/q\mathbb{Z}$. The error polynomial may be sampled according to an error distribution related to the GLWE problem, e.g., a Gaussian distribution $\chi_\sigma$. The secret key may be sampled according to a secret key distribution related to the GLWE problem, e.g., a uniform binary, uniform ternary or Gaussian distribution.

In the above example, the ring $\mathcal{R}_q$ defines both the message space and the ciphertext space. An alternative is to use the real torus $\mathbb{T} = \mathbb{R}/\mathbb{Z}$, the discretized torus $1/q\mathbb{Z}/\mathbb{Z}$, or $\mathbb{R}$ for the message space, and to use $\mathbb{T}$ or $1/q\mathbb{Z}/\mathbb{Z}$ for the ciphertext space.

Another example of encrypting a plaintext M(X) according to an LWE- or GLWE-based encryption is by computing a GGSW ciphertext. A GGSW ciphertext of a message $M(X) \in \mathcal{R}$, encrypted under a GLWE secret key $S=(S_1, \ldots, S_k) \in \mathcal{R}^k$, e.g., as described above, is a matrix $$C \in \mathcal{R}_q^{(k+1)\ell \times (k+1)}$$

whose t-th row where $t=j+(i-1)\ell$, for $1 \le i \le k+1$ and $1 \le j \le \ell$, is an GLWE encryption, e.g., as described above, under key S of the plaintext $$-S_i(X) \cdot M(X) \cdot \frac{q}{\mathcal{B}^j}$$

with $S_{k+1}(X)=-1$ and $\mathcal{B}$ is the base, typically, a power of 2. The above-mentioned alternatives to $\mathcal{R}_q$ for the message and plaintext space also apply here. The instantiation of GGSW with k=n and N=1 is an LWE-based ciphertext referred to as a GSW ciphertext. The instantiation of GGSW with k=1 and N>1 is a RLWE-based ciphertext referred to as a RGSW ciphertext. These types of ciphertexts are known per se for use in producing bootstrapping keys or supporting certain levelled operations.

Generally, the security of LWE- and GLWE-based ciphertexts is based on the distribution of the secret key, and on three main parameters: n=kN, where N is the polynomial ring dimension, k is the number of random elements of a ciphertext, and n is the length of the secret key; q, the ciphertext modulus; and $\sigma$, the statistical parameter of the noise, e.g., its standard deviation. Given these parameters, it is known per se how to estimate a degree of security that is provided, see, e.g., M. Albrecht et al., "On the concrete hardness of Learning with Errors", Journal of Mathematical Cryptology, DOI: 10.1515/jmc-2015-0016 (incorporated herein by reference).

In embodiments herein, the parameters of the TFHE-like LWE- and GLWE-based ciphertexts that are used may be selected based on a desired security level and based on a desired accuracy of operations such as multiplication of LWE ciphertexts and/or applying a programmable bootstrapping as described herein, in other words, a noise level resulting from applying these operations. A detailed noise analysis for multiplying LWE ciphertexts according to the proposed techniques is provided herein. Noise levels for other operations proposed herein can be derived from noise levels of their sub-operations as is known per se. Interestingly, the security parameters may be selected independently of the computational complexity, e.g. independently of the multiplicative depth of the computation. This is unlike for non-TFHE-like schemes, where the security parameters are typically chosen to limit or eliminate bootstrappings.

In particular, LWE-based ciphertext and/or GLWE-based ciphertexts used herein may use a relatively small modulus, e.g., of at most 32 bits, at most 64 bits, or at most 128 bits, e.g., $q=2^{32}$, $q=2^{64}$, or $q=2^{128}$. This modulus is typically selected independent from the computation to be carried out, e.g., it is selected depending on a desired precision and/or efficiency. Parameters n and/or $\sigma$ may be selected to achieve a desired security level, also typically independently from the computation to be carried out. For example, n may be set to at least 512 and/or at most 2048 or 4096, e.g., to 1024. For example, in an embodiment, RLWE is used with N at least 512 and/or at most 2048 or 4096, e.g., 1024, and k=1. Such values for n are not typically used in non-TFHE-like encryption schemes, where such values would severely restrict the computations that can be performed; instead, in non-TFHE-like schemes, q and n are typically both selected based on the desired security level, such that q may be much larger.

As the above examples show, LWE encryption may be regarded as a special case of GLWE encryption, namely, using polynomials with degree smaller than one. Throughout this specification, when referring to GLWE-encrypted polynomials, the special case of LWE encryption is meant to be excluded, e.g. an encryption is meant according to a GLWE encryption with a polynomial ring dimension larger than one. The polynomial to be encrypted can be a degree-zero, e.g., constant, polynomial, however.

The above examples are symmetric key encryption schemes, in which the same symmetric key is used both to encrypt and to decrypt messages. However, the above examples can also be adapted to the asymmetric key setting, in which the public key used for encryption is different from the private key used for decryption. Such a transformation is known per se, see e.g. Z. Brakerski and V. Vaikuntanathan, "Fully Homomorphic Encryption from Ring-LWE and Security for Key Dependent Messages", proceedings CRYPTO2011. Symmetric keys are used as examples throughout this specification, with the understanding that symmetric keys can be used as well.

Generally, the provided techniques can be used in combination with TFHE-like encryption scheme based on the LWE problem, e.g., an encryption scheme based on LWE that supports programmable bootstrapping. Apart from the encryption scheme of "TFHE: fast fully homomorphic encryption over the torus", this also includes the encryption scheme of L. Ducas and D. Micciancio, "FHEW: bootstrapping homomorphic encryption in less than a second", proceedings EUROCRYPT 2015, for example.

Various embodiments employ a cryptographic key switching operation to, given a ciphertext encrypted under a given key according to a given encryption scheme, determine a further ciphertext that is encrypted under a different key and/or according to a different encryption scheme. For example, a key switching may be applied to the result of a programmable bootstrapping. The cryptographic key switching operation typically uses a key switching key, namely, a key that allows the cryptographic key switching operation to be performed while not allowing the ciphertexts to be decrypted. The key switching key may comprise encryptions of bits or other chunks of the secret key used to encrypt the input ciphertext, for example. Key switching may result in additional noise.

In particular, the cryptographic key switching operation may be used to determine a GLWE-encrypted output polynomial from a set of LWE-encrypted input values. The output polynomial can for example be a degree-0 polynomial having an input value as constant coefficient. More generally, the output polynomial may be defined as a linear function over the one or more input values.

In particular, the key switching can be a private key switching. Private key switching allows to apply a private linear or Lipschitzian function $f: (\mathbb{Z}/q\mathbb{Z})^p \to \mathbb{Z}/q\mathbb{Z}[X]$ over p LWE ciphertexts $$\{ct_s^i\}_{i \in (1,p)}$$

and creates a GLWE ciphertext $GLWE_{SK}(f(m_1, \ldots, m_p))$ using a key switching key KSK. The key switching key may hide the function being applied. This key switching operation may be denoted as follows:

$$CT_{out} \leftarrow PrivateKS(\{ct_i\}_{i \in (1, p)}, KSK).$$

The key switching can also be a public key switching. In this case, the linear or Lipschitzian function $f$ to be applied is known to, and may be selected by, the device performing the key switching. This operation may be denoted as follows:

$$CT_{out} \leftarrow PublicKS(\{ct_i\}_{i \in (1, p)}, KSK, f).$$

For example, a programmable bootstrapping on an LWE-encrypted input value may be followed by a key switching, such as a public key switching, to obtain an LWE-encrypted programmable bootstrapping output that uses the same cryptographic parameters as the LWE-encrypted value, e.g., the function $f$ above may be the identity function and the output GLWE may be instantiated as a LWE instance, e.g., k=n' and N=1.

As an example, the key switching can be a packing key switching in which the GLWE-encrypted output polynomial has respective LWE-encrypted input values as coefficients. In particular, given a set of p≥1 LWE ciphertexts as well as a set $$\{i_j\}_{j=1}^p,$$

of p indexes, the following function may be applied:

$$f\left(\{m_j\}_{j=1}^p\right) \to \Sigma_{j=1}^p m_j \cdot X^{i_j}$$

This key switching may be denoted $$CT_{out} \leftarrow PackingKS(\{ct_j\}_{j=1}^p, \{i_j\}_{j=1}^p, KSK).$$

Typically, packing key switching is implemented using public key switching, although it is also possible to use private key switching.

Figures 1A, 1B:
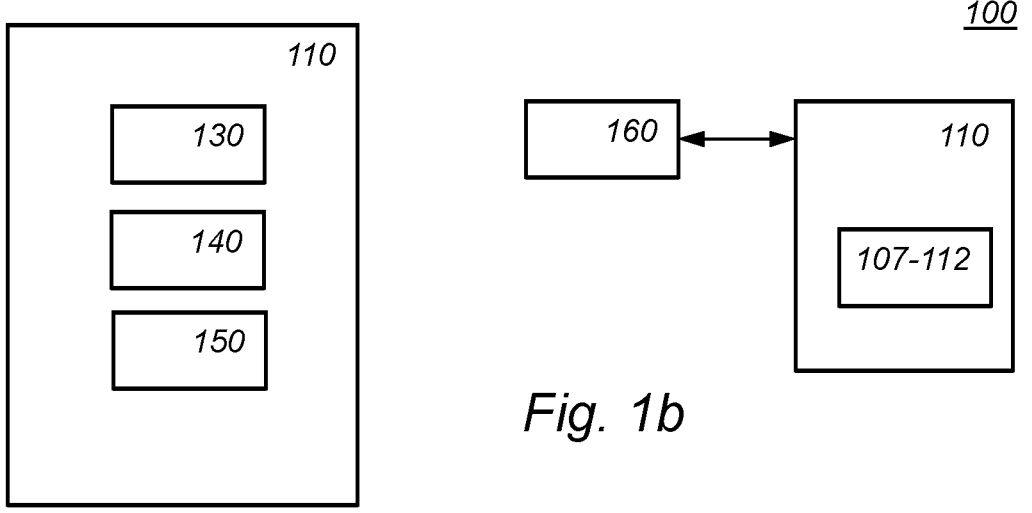
FIG. 1b schematically shows an example of an embodiment of a homomorphic computation system.

FIG. 1a schematically shows an example of an embodiment of a device 110 for performing a computation on LWE-encrypted values.

An LWE-encrypted value may be an encryption of a value based on a Learning With Errors problem. The encryption may support a programmable bootstrapping operation. The programmable bootstrapping operation may evaluate an LWE decryption in an exponent of a GLWE-encrypted monomial. A GLWE-encrypted polynomial may be an encryption of a polynomial based on a Generalized Learning With Errors problems.

Device 110 may comprise a processor system 130, a storage 140, and a communication interface 150. Storage 140 may comprise local storage, e.g., a local hard drive or electronic memory. Storage 140 may comprise non-local storage, e.g., cloud storage. In the latter case, storage 140 may comprise a storage interface to the non-local storage. For example, storage 140 may be for storing a set of auxiliary keys for performing the computation. The auxiliary keys may not allow to decrypt the LWE-encrypted values. The auxiliary keys may comprise a set of bootstrapping keys for performing the programmable bootstrapping operation. Storage 140 may store additional information, such as LWE-encrypted values and/or GLWE-encrypted ciphertext used to perform the computation, as also discussed elsewhere.

Device 110 may communicate internally, with other devices, external storage, input devices, output devices, and/or one or more sensors over a computer network. The computer network may be an internet, an intranet, a LAN, a WLAN, etc. The computer network may be the Internet. The device may optionally comprise connection interface 150 which is arranged to communicate with other devices as needed. For example, the connection interface may comprise a connector, e.g., a wired connector, e.g., an Ethernet connector, an optical connector, etc., or a wireless connector, e.g., an antenna, e.g., a Wi-Fi, 4G or 5G antenna. Communication, e.g., internal communication, may use other communication protocols or media, e.g., an internal data bus.

In device 110, the communication interface 150 may be used to send or receive digital data. For example, device 110 may be configured to receive a set of LWE-encrypted values on which to perform the computation, e.g., from a data-provider device. Device 110 may perform the computation, e.g., including one or more computations of LWE-encrypted product values and/or one or more programmable bootstrappings. Device 110 may transmit the result of the computation, e.g. LWE-encrypted output values, to another device, e.g., the data-provider device or another device.

The execution of device 110 may be implemented in a processor system 130, e.g., one or more processor circuits, e.g., microprocessors, examples of which are shown herein.

Device 110 may comprise multiple processors, which may be distributed over different locations. For example, device 110 may use cloud computing.

Processor system 130 may be configured to compute an LWE-encrypted product value based on one or more LWE-encrypted input values. The computation of the product value may involve applying a cryptographic key switching operation to the set of LWE-encrypted input values to determine one or more GLWE-encrypted input polynomials. A coefficient of an input polynomial may be a linear combination of the set of input values. The computation may further comprise applying an encrypted polynomial multiplication based on the one or more GLWE-encrypted input polynomials to obtain a GLWE-encrypted output polynomial. The computation may further comprise applying a cryptographic sample extraction operation based on the GLWE-encrypted output polynomial. The LWE-encrypted product value may be obtained as an encryption of a polynomial coefficient.

Some of the figures show functional units that may be functional units of the processor system. For example, a figure may be used as a blueprint of a possible functional organization of the processor system. The processor circuit(s) are not shown separate from the units in most figures. For example, the functional units shown in FIGS. 2a-2c, 3a-3b, 4a-4b, 5a, 6, 7a-7c, 8a-8c, and 9 (see below) may be wholly or partially implemented in computer instructions that are stored at a device such as device 110, e.g., in an electronic memory of device 110, and are executable by a microprocessor of device 110. In hybrid embodiments, functional units are implemented partially in hardware, e.g., as coprocessors, e.g., arithmetic and/or cryptographic coprocessors, and partially in software stored and executed on device 110.

For example, device 110 may be a device for performing a computation using homomorphic encryption cryptography. For example, the device 110 may be used to perform a computation on data, even though said data is received in encrypted form, e.g., from a data-provider. The computation may comprise the computation of one or more LWE-encrypted product values, e.g., computing an LWE-encrypted product of two LWE-encrypted input values, or computing a square, etc.

For example, storage 140 may store LWE-encrypted data items, e.g., received from one or more data-providers or generated as intermediate results or end results, e.g., outputs, of the computation. Typically, most or all data items on which the computation of device 110 is performed, are encrypted with a key (or keys) that is not known to device 110—that is device 110 may not be configured to obtain the plain data items corresponding to the encrypted data items, e.g., such as stored in storage 140. The decryption key in plain form is secret for device 110, though the encryption/decryption key may be available in encrypted form. For example, the processor system may be configured to perform a sequence of homomorphic encryption operations, which may include arithmetic operations on encrypted values such as addition and multiplication, but may also include arithmetic operations on encrypted polynomials. Homomorphic operations may also include operations like a key switching, a bootstrap, and the like.

FIG. 1b schematically shows an example of an embodiment of an encrypted computation system 100. System 100 is configured for performing a computation using homomorphic encryption, e.g., fully homomorphic encryption. The computation may involve a computation by a MultLWE unit 107-112 of an LWE-encrypted product value.

The system 100 in this example comprises a data-provider device 160 and an encrypted computing device 110. Device 110 may be configured to receive encrypted data items from a data-provider 160. At least some data items may be received in encrypted form. Some data items may be received in plain format. The computation is run on the received data items and possibly also on stored data items. Interestingly, the computation may be performed on the encrypted data, without decrypting the data, e.g., without converting encrypted data items to data in a plain format.

The device 110 in this example may be based on device 110 of FIG. 1a, e.g., may comprise processor system 130, storage 140, and/or communication interface 150 of FIG. 1a. In this example, device 110 comprises a MultLWE unit 107-112, e.g., implemented by a processor system of the device. As part of performing the encrypted computation, MultLWE unit 121 may compute LWE-encrypted product value based on LWE-encrypted input values. For example, the LWE-encrypted input values may be or may be based on LWE-encrypted values provided by the data-provider device 160. Alternatives to perform an encrypted computation without a MultLWE unit are also possible and discussed throughout this specification, e.g., device 110 may comprise a GenPBS unit that may or may not be based on MultLWE.

Although not shown in this figure, the encrypted computation system 100 may comprise multiple encrypted computing devices, e.g., two, three or more than three. The encrypted computation may be distributed among the multiple encrypted computing devices. The encrypted computing devices may exchange intermediate computation results, typically encrypted, among each other. Each encrypted multiplication device may be implemented like encrypted computing device 110, and may perform a computation of an LWE-encrypted product value as described herein.

Homomorphic encryption schemes can be applied in many settings. For example, encrypted computing device 110 may be operated by a cloud provider. The cloud provider may offer computation and storage services to its clients. By employing homomorphic encryption, data provider device 160 of FIG. 1b, e.g., a client of the cloud provider, can send their data in encrypted form. The cloud provider can still perform the required computations, and/or the required storage, but is not able to know the corresponding plain data. For example, data provider device 160 may use an encryption key of a type corresponding to the particular homomorphic encryption system used, to encrypt the data items. When computations results are received by data-provider 160 from encrypted computing device 110, a corresponding decryption key may be used to decrypt the encrypted data items. Encryption and decryption keys may be the same—and typically are so.

For example, encrypted computation system 100 may be configured to train machine-learning models, e.g., image classifiers, e.g., medical models, without the encrypted computing devices having access to the plain data items. For example, linear regression may be performed on the input data, possibly, even without bootstrapping. For example, back-propagation may be performed on the input data, possibly, with bootstrapping. The resulting model parameters may be returned to an entity who is in possession of the decryption key. This enables multiple providers of medical data to pool their data, by sending the data to a cloud provider. The cloud provider then returns the model parameters, without ever having access to the plain data. Encryption keys may be equal to decryption keys.

After the model is trained, the encrypted computation system 100 may be used to offer the model, say, for use with medical data. This can be done with plain model parameters or encrypted model parameters—in both cases with encrypted data, e.g., encrypted input, intermediate and output data. Using plain model parameters is usually much more efficient. In both cases, an effect of the system is that a computation is performed, say an image classification, e.g., a medical image classification, without the computer knowing the plain data items. For example, a mammogram may be evaluated for cancer, without the image ever being in the plain at an encrypted computing device 110 and without any encrypted computing device 110, or a coalition of such devices, knowing what the outcome of the cancer evaluation is. From a privacy point of view it may be acceptable to operate a plain model on encrypted privacy sensitive data, while it might not be acceptable to operate on plain privacy sensitive data.

Other applications involve database services, e.g., looking up encrypted data in an encrypted database; for example, the computation may be a comparison between an input item and a database item. For example, multiple computations may be combined to produce a database index that matches an index. For example, the database, may be a genomic database, and the input a gene sequence. For example, system 100 may be used for protected control of a device. For example, a device, even a large device such as a power plant, may send sensor values to an encrypted computing device 110, and receive encrypted control signals in return. The control signals being computed from the sensor signals. An attacker of the system may be able to determine the contents of data going to and from one or more encrypted computing devices 110, or even gain access to intermediate data of these devices, but he will not be helped by that as the data is encrypted. Even a full break of all encrypted computing devices 110 of a system 100 will not reveal the data, as the decryption key is not known to these devices. Computing the control signal may involve such mathematical operations as linear algebra, averages, matrix multiplication, polynomial evaluations, and so on, all of which are possible to execute with homomorphic encryption operations.

For example, a pool of encrypted data items may be maintained in the encrypted computation system; some of these may be received and some may be the result of an encrypted computation, e.g., intermediate results. For example, an encrypted computing device 110 may be configured to apply a homomorphic encryption operation to one, two or more encrypted data items in a pool, e.g., a collection of input and/or intermediate and/or output values. The result may be a new encrypted data item that may be stored in the pool. The pool may be stored in a storage of the encrypted computation system. This may be local storage or a distributed storage. In the latter case, it may happen that one or more encrypted data items are represented multiple times in the pool. Encrypted data items may be sent from one computing device to another, e.g., if their values are needed elsewhere. The pool may be implemented in various ways, e.g., as a register file, an array, various data structure, and so on.

The encrypted data items may represent all kinds of data. For example, encrypted data items may represent numbers that need to be averaged, or which are used for linear regression, etc. For example, the encrypted data items may represent an image. For example, each pixel of the image may correspond to one or more encrypted data items. For example, a grey-scale pixel may be represented by a grey level, which in turn may be represented by a single encrypted data item. For example, 256 grey levels may be encoded in a single encrypted data item. For example, a colour pixel may be represented as multiple colour levels, e.g., RGB levels, which in turn may be represented by a tuple of encrypted data items. For example, three 256-level colours may be encoded in three encrypted data items. How many encrypted data items are used to represent some type of data depends on the capacity of the homomorphic encryption scheme. For example, more restrictive homomorphic encryption schemes may only be capable of encoding one bit per encrypted data item. In that case, one colour pixel, may require 24 encrypted data items.

Although without access to the decryption key it may not be possible to say exactly how large the noise in an encrypted value is, one can typically bound the noise, e.g., as the initial noise level is known for a fresh encryption and the noise increase for various operations are known. Noise increase may depend on the type of operation, e.g., addition versus multiplication, and on the other parameters if any. For example, a homomorphic encryption operation may be a scalar multiplication: a multiplication with a known, e.g., plain, value. For example, multiplication with a larger value may increase the noise more than multiplication with a smaller number. Exactly how much noise increases given the operations performed can be calculated mathematically, or could be estimated empirically. While some operations may add significant amounts of noise, others may not add noise, e.g., an addition with a plain constant.

A set of homomorphic encryption operations may be defined for the computation. For example, from the homomorphic encryption operations a network or circuit of operations may be built that together implement the computation, e.g., by an external compiler device or by the computation device itself. For example, the operations may include Boolean operations. The operations may include at least one computation of an LWE-encrypted product value. The way the homomorphic encryption operations are combined, e.g., which operation is applied to which operand in the pool, determines the computation that is being performed. For example, the computation may be represented as a list of homomorphic encryption operations that are to be performed together with an indication on which encrypted data item they are to be performed.

FIG. 2a (showing GenMult unit 205) schematically shows an example of an embodiment of a method of applying an encrypted GLWE multiplication, using a GenMult unit 205.

The figure shows GenMult unit 205 being used to apply an encrypted polynomial multiplication to two GLWE-encrypted input polynomials $M^{(1)}$, $M^{(2)}$ 240, 241, to obtain a GLWE-encrypted output polynomial 242. The output polynomial may be a product of the input polynomials, e.g., up to scaling. If the sum of the degrees of the input polynomials is larger than or equal to the polynomial ring dimension N, a modular reduction, e.g., $\Delta^{-1}M^{(1)}M^{(2)} \bmod X^N+1$, may occur.

From the context of polynomial encryption of RLWE ciphertexts, various techniques are known that can be used per se or applied to a GLWE setting. Generally, an encrypted polynomial multiplication may be performed by computing a product, e.g., a tensor product, followed by a relinearization and/or key switching. Both for the product and for the relinearization/key switching, several techniques are known.

According to one technique, GenMult unit 205 may apply the encrypted GLWE multiplication by computing a polynomial product of a first GLWE-encrypted polynomial and a second GLWE-encrypted polynomial as respective polynomials in the secret key. GenMult unit 205 may then transform the polynomial product to a degree-1 polynomial in the secret key using a relinearization key. This relinearization key may be arranged for such transforming of a degree-2 polynomial in the secret key to a degree-1 polynomial in the secret key. Such an approach is known for the particular case of RLWE ciphertexts, for example from J. Fan et al., "Somewhat practical fully homomorphic encryption" (available at https://eprint.iacr.org/2012/144 and incorporated herein by reference), which provides two different techniques for the relinearization.

An implementation of GenMult 205 according to the Fan et al. technique is now provided. This implementation is based on J. Fan et al., but is adapted in several respects. It uses GLWE instead of RLWE; it allows different scaling factors $\Delta_i$ for respective input ciphertexts; and it uses symmetric key encryption:

Algorithm. CT ← Gen Mult(CT$^{(1)}$, CT$^{(2)}$, RLK)

Context:
$$\begin{cases} S = \left(S^{(1)} = \sum_{i=0}^{N-1} s_{i+1}^{(1)} X^i, \dots, S^{(k)} = \sum_{i=0}^{N-1} s_{i+1}^{(k)} X^i\right) \\ \Delta = \min(\{\Delta_i^{(1)}\}, \{\Delta_i^{(2)}\}) \\ M^{(1)} = \sum_{i=0}^{N-1} m_i^{(1)} \Delta_i^{(1)} X^i \\ M^{(2)} = \sum_{i=0}^{N-1} m_i^{(2)} \Delta_i^{(2)} X^i \end{cases}$$

Input:
$$\begin{cases} CT^{(1)} = GLWE_S(M^{(1)}) = (A_1^{(1)}, \dots, A_k^{(1)}, B^{(1)}) \\ CT^2 = GLWE_S(M^{(2)}) = (A_1^{(2)}, \dots, A_k^{(2)}, B^{(2)}) \\ RLK = \{RLK_h^{(i,j)}\}_{i,j,h} = \left\{ GLWE_S\left(S^{(i)} \cdot S^{(j)} \frac{q}{\mathcal{B}^h}\right)\right\}_{i,j,h} = \\ \left\{ \left(A_{RLK_h^{(i,j)}}, B_{RLK_h^{(i,j)}}\right)\right\}_{i,j,h} \end{cases}$$

Output: $CT = GLWE_S\left(\frac{M^{(1)} \cdot M^{(2)}}{\Delta}\right)$

// tensor product for $1 \le i \le k$ do $T_{i'} \leftarrow \left[ \lfloor \frac{[A_i^{(1)} \cdot A_i^{(2)}]_Q}{\Delta} \rceil \right]_q$ for $1 \le i \le k, 1 \le j < i$ do $R_{i,j}' \leftarrow \left[ \lfloor \frac{[A_i^{(1)} \cdot A_j^{(2)} + A_j^{(1)} \cdot A_i^{(2)}]_Q}{\Delta} \rceil \right]_q$ for $1 \le i \le k$ do $A_{i'} \leftarrow \left[ \lfloor \frac{[A_i^{(1)} \cdot B^{(2)} + B^{(1)} \cdot A_i^{(2)}]_Q}{\Delta} \rceil \right]_q$ $B' \leftarrow \left[ \lfloor \frac{[B_1 \cdot B_2]_Q}{\Delta} \rceil \right]_q$ // relinearization CT ← (A', B') + $\sum_{i=1}^{k} \sum_{h=1}^{\ell} RLK_h^{(i,i)} \cdot dec_h (T_{i'}) + \sum_{i=1}^{k} \sum_{j=1}^{i-i} \sum_{h=1}^{\ell} RLK_h^{(i,j)} \cdot dec_h (R'_{i,j})$ Alternative relinearization techniques, such as the second relinearization technique of J. Fan et al., or the technique given in C. Boura et al., "CHIMERA: Combining Ring-LWE-based Fully Homomorphic Encryption schemes", J. Math. Cryptol., 14(1):316-338, 202, can be used instead. The relinearization may optionally include a key switching, in which case it can be implemented for example as follows:

$Relin_{S \to S'}(T', R', A', B') = (0, B') +$ $\sum_{i=1}^{k} \sum_{h=1}^{\ell} RLK_h^{(i)} \cdot decomp_h(A_{i'}) + \sum_{i=1}^{k} \sum_{h=1}^{\ell} RLK_h^{(i,i)} \cdot decomp_h(T_{i'}) +$ $\sum_{i=1}^{k} \sum_{j=1}^{i-1} \sum_{h=1}^{\ell} RLK_h^{(i,j)} \cdot decomp_h(R'_{i,j})$ where, for $i \in [1,k], j \in [1,i], h \in [1,l]$:

$$\begin{cases} RLK_h^{(i)} = RLWE_{S'}\left(S_i \frac{q}{\mathcal{B}^h}\right) = \left(A_{RLK_h^{(i)}}, B_{RLK_h^{(i)}}\right) \\ RLK_h^{(i,j)} = RLWE_{S'}\left(S_i \cdot S_j \frac{q}{\mathcal{B}^h}\right) = \left(A_{RLK_h^{(i,j)}}, B_{RLK_h^{(i,j)}}\right) \end{cases}$$

-continued with
$$\begin{cases} B_{RLK_h^{(i)}} = \sum_{\alpha=1}^{k} A_{\alpha, RLK_h^{(i)}} \cdot S_\alpha' + E_{RLK_h^{(i)}} - S_i \cdot \frac{q}{\mathcal{B}^j} \bmod q \\ B_{RLK_h^{(i,j)}} = \sum_{\alpha=1}^{k} A_{\alpha, RLK_h^{(i,j)}} \cdot S_\alpha' + E_{RLK_h^{(i,j)}} - S_i \cdot S_j \cdot \frac{q}{\mathcal{B}^j} \bmod q \\ A_{\alpha, RLK_h^{(i)}}, A_{\alpha, RLK_h^{(i,j)}} \text{ coefficients in } \mathcal{U}\left(-\frac{q}{2}, \frac{q}{2}\right) \\ E_{RLK_h^{(i)}}, E_{RLK_h^{(i,j)}} \text{ coefficients in } \mathcal{N}(0, \sigma_{RLK}^2) \end{cases}$$

An alternative technique for performing encrypted polynomial multiplication that can be used is known e.g. from Z. Brakerski. "Fully homomorphic encryption without modulus switching from classical gapsvp", IACR Cryptology ePrint Archive, 2012:78 and involves computing a product as a tensoring of the two ciphertexts to be multiplied, multiplied by respective powers of 2, followed by a key switching with an encryption of the tensor of the bit decomposition of the secret key.

Optionally, in between the product and the relinearization and/or key switching, one or more additional operations may be performed, for example, one or more additions and/or multiplications by constants. This is known as lazy relinearization. This can help for both efficiency and for noise management.

FIG. 2b (showing GenSquare unit 206) schematically shows an example of an embodiment of a method of applying an encrypted GLWE multiplication, using GenSquare unit 206. This example is based on the example of FIG. 2a, and the various alternatives discussed with respect to that figure apply here as well.

As discussed above, an encrypted polynomial multiplication may be performed by computing a product, e.g., a tensor product, followed by a relinearization and/or a key switching. In this example, the product being computed is a square of the input GLWE-encrypted polynomial 243. After the relinearization and/or the key switching, GenSquare unit 206 may output a GLWE encryption 244 of the square of the polynomial.

For example, the example implementation of GenMult discussed with respect to FIG. 2a may be adapted to obtain an implementation of GenSquare as follows:

Algorithm. CT ← GenSquare(CT$_{in}$, RLK)

Context:
$$\begin{cases} S = \left(S^{(1)} = \sum_{i=0}^{N-1} s_{i+1}^{(1)} X^i, \dots, S^{(k)} = \sum_{i=0}^{N-1} s_{i+1}^{(k)} X^i\right) \\ M = \sum_{i=0}^{N-1} m_i \Delta_i X^i \\ \Delta = \min(\{\Delta_i\}) \end{cases}$$

Input:
$$\begin{cases} CT_{in} = GLWE_S(M) = (A_1, \dots, A_k, B) \\ RLK = \{RLK_h^{(i,j)}\}_{i,j,h} = \left\{ GLWE_S\left(S^{(i)} \cdot S^{(j)} \frac{q}{\mathcal{B}^h}\right)\right\}_{i,j,h} = \\ \left\{ \left(A_{RLK_h^{(i,j)}}, B_{RLK_h^{(i,j)}}\right)\right\}_{i,j,h} \end{cases}$$

Output: $CT = GLWE_S\left(\frac{M^2}{\Delta}\right)$

// tensor product for $1 \le i \le k$ do $T_{i'} \leftarrow \left[ \lfloor \frac{[A_i^{(2)}]_Q}{\Delta} \rceil \right]_q$ for $1 \le i \le k, 1 \le j < i$ do $R_{i,j}' \leftarrow \left[ \lfloor \frac{[2 \cdot A_i \cdot A_j]_Q}{\Delta} \rceil \right]_q$ -continued

---

Algorithm. CT ← GenSquare(CT$_{in}$, RLK)

--- for $1 \le i \le k$ do $A_{i'} \leftarrow \left[\left\lfloor \dfrac{[2 \cdot A_i \cdot B]_Q}{\Delta} \right\rceil\right]_q$ $B' \leftarrow \left[\left\lfloor \dfrac{[B^2]_Q}{\Delta} \right\rceil\right]_q$

---

// relinearization

CT ← (A', B') + $\Sigma_{i=1}{}^k \Sigma_{h=1}^{\ell} \mathrm{RLK}_h{}^{(i,i)} \cdot \mathrm{dec}_h\,(T_{i'})$ +
$\Sigma_{i=1}{}^k \Sigma_{j=1}{}^{i-i} \Sigma_{h=1}^{\ell} \mathrm{RLK}_h{}^{(i,j)} \cdot \mathrm{dec}_h\,(\mathrm{R'}_{i,j})$

---

As above, variations of this implementation are possible, e.g., using different relinearization techniques and/or combined with key switching.

Referring to FIG. 2a and FIG. 2b, a detailed noise analysis is now provided for the example implementation of Gen-Mult and GenSquare discussed above. Analogous results are expected to apply to variations, e.g., implementations of GLWE polynomial multiplication using different products and/or different relinearization procedures.

The inputs to GenMult or GenSquare are two GLWE ciphertexts modulo q:

$$CT^{(1)} = \left(A_1^{(1)}, \ldots, A_k^{(1)}, B^{(1)} = \sum_{i=1}^{k} A_i^{(1)} \cdot S_i + E^{(1)} + P^{(1)}\right) \in \mathcal{R}_q^{k+1}$$

$$CT^{(2)} = \left(A_1^{(2)}, \ldots, A_k^{(2)}, B^{(2)} = \sum_{i=1}^{k} A_i^{(2)} \cdot S_i + E^{(2)} + P^{(2)}\right) \in \mathcal{R}_q^{k+1}$$

that, for the purpose of this analysis, will be assumed to be defined as follows:

$(S_1, \ldots, S_k) \in \mathcal{R}^k$ is the secret key polynomial which have coefficients either sampled from a uniform binary, uniform ternary or Gaussian distribution, $$\{A_i^{(1)}\}_{i=1}^{k}$$

and $$\{A_i^{(2)}\}_{i=1}^{k}$$

are polynomials in $\mathcal{R}_q$ with coefficients sampled from $$\mathcal{U}\left(\left[-\frac{q}{2}, \frac{q}{2}\right]\right),$$

$E^{(1)}$, $E^{(2)}$ are error polynomials in $\mathcal{R}_q$ such that their coefficients are sampled from Gaussian distributions $\mathcal{N}(0,\sigma^{(1)})$, $\mathcal{N}(0,\sigma^{(2)})$ respectively, $P^{(1)} = \lfloor \Delta^{(1)} \cdot M^{(1)} \rceil_q$ and $P^{(2)} = \lfloor \Delta^{(2)} \cdot M^{(2)} \rceil_q$, with $M^{(1)}$, $M^{(2)} \in \mathcal{R}_q$ and $\Delta^{(1)}$ and $\Delta^{(2)}$ the scaling factors.

The first step (modulus switching, tensor product, rescale, round and modulo) is to compute:

$$T_{i'} = \left[\left\lfloor \frac{[A_i^{(1)} \cdot A_i^{(2)}]_Q}{\Delta} \right\rceil\right]_q \quad \text{depending on } S_i^2\, k \text{ terms}$$

-continued $$R'_{i,j} = \left[\left\lfloor \frac{[A_i^{(1)} \cdot A_j^{(2)} + A_j^{(1)} \cdot A_i^{(2)}]_Q}{\Delta} \right\rceil\right]_q \quad \text{depending on } S_i \cdot S_j \; \frac{k(k-1)}{2} \text{ terms}$$

$$A_{i'} = \left[\left\lfloor \frac{[A_i^{(1)} \cdot B^{(2)} + B^{(1)} \cdot A_i^{(2)}]_Q}{\Delta} \right\rceil\right]_q \quad \text{depending on } S_i\, k \text{ terms}$$

$$B' = \left[\left\lfloor \frac{[B_1 \cdot B_2]_Q}{\Delta} \right\rceil\right]_q \quad \text{constant term 1 term}$$

where $\Delta = \min(\Delta_1, \Delta_2)$.

The last step (relinearization) is to compute:

$$Relin(T', R', A', B') = (A', B') + \sum_{i=1}^{k} \sum_{h=1}^{\ell} RLK_h^{(i,i)} \cdot dec_h(T_{i'}) +$$
$$\sum_{i=1}^{k} \sum_{j=1}^{i-1} \sum_{h=1}^{\ell} RLK_h^{(i,j)} \cdot dec_h(R'_{i,j}), \text{ where } RLK = (RLK_h^{(i,j)})_{i,j,h}$$

is the realinearization key, so that each component $$RLK_h^{(i,j)},$$

with $i \in [1,k]$, $j \in [1,i]$, $h \in [1,l]$ is defined as:

$$RLK_h^{(i,j)} = RLWE_S\left(S_i \cdot S_j \frac{q}{\mathcal{B}^h}\right) = \left(A_{RLK_h^{(i,j)}}, B_{RLK_h^{(i,j)}}\right)$$

with $$\begin{cases} B_{RLK_h^{(i,j)}} = \sum_{\alpha=1}^{k} A_{\alpha, RLK_h^{(i,j)}} \cdot S_\alpha + E_{RLK_h^{(i,j)}} - S_i \cdot S_j \cdot \frac{q}{\mathcal{B}^j} \bmod q \\ A_{\alpha, RLK_h^{(i,j)}} \text{ coefficients in } \mathcal{U}\left(\left[-\frac{q}{2}, \frac{q}{2}\right]\right) \\ E_{RLK_h^{(i,j)}} \text{ coefficients in } \mathcal{N}(0, \sigma_{RLK}^2) \end{cases}$$

The variance of the error at the output of the tensor product can in this example be estimated by the following formula, where S' indicated a squared element of the secret key, while S'' represents the product of two different secret key elements. The notations odd and even indicate the odd and the even coefficients of the polynomials S', while the notation mean indicated a mean value estimation.

$$Var(E) =$$

$$Var(Error\,(T', R', A', B')) = \frac{N}{\Delta^2}\left(\Delta_1^2 \|M_1\|_\infty^2 \sigma_2^2 + \Delta_2^2 \|M_2\|_\infty^2 \sigma_1^2 + \sigma_1^2 \sigma_2^2\right) + +$$

$$\frac{N}{\Delta^2}\left(\frac{q^2-1}{12}\left(1 + kN Var(S) + kN\mathbb{E}^2(S)\right) + \frac{kN}{4} Var(S) + \frac{1}{4}(1 + kN\mathbb{E}(S))^2\right)$$

$$(\sigma_1^2 + \sigma_2^2) + + \frac{1}{12} + \frac{kN}{12\Delta^2} \cdot \left((\Delta^2 - 1) \cdot \left(Var(S) + \mathbb{E}^2(S)\right) + 3 \cdot Var(S)\right) +$$

$$\frac{k(k-1)N}{24\Delta^2} \cdot \left((\Delta^2 - 1) \cdot \left(Var(S'') + \mathbb{E}^2(S'')\right) + 3 \cdot Var(S'')\right) +$$

$$\frac{kN}{24\Delta^2} \cdot \left((\Delta^2 - 1) \cdot \left(Var(S'_{odd}) + Var(S'_{even}) + 2 \cdot \mathbb{E}^2(S'_{mean})\right) +$$

$$3 \cdot (Var(S'_{odd}) + Var(S'_{even}))\right)$$

In the case where the messages are not dense polynomials and the error polynomial has coefficients following two different distributions, the noise formula can be adapted. In particular, suppose that the message polynomial M contains $0 \leq \alpha \leq N$ filled coefficients, and their corresponding error terms following a Gaussian distribution $$\mathcal{N}(0, \sigma_{fill}^2),$$

and there are $N-\alpha$ empty coefficients with containing error from the distribution $\mathcal{N}(0, \sigma_{emp}^2)$.

Consider two message polynomials $M_1$ and $M_2$. The first one contains the $\alpha_1$ message coefficients $m_{1,1}, \ldots, m_{1,\alpha_1}$ and the second polynomial contains the $\alpha_2$ message coefficients $m_{2,1}, \ldots, m_{2,\alpha_2}$.

Consider coefficients in the resulting plaintext polynomial filled with single product of the form $m_{1,i} \cdot m_{2,j}$ for $1 \leq i \leq \alpha_1$ and $1 \leq j \leq \alpha_2$.

For example, in a product like:

$$(a_0 + a_1 X + a_3 X^3) \cdot (b_0 + b_1 X) ==$$

$$a_0 b_0 + (a_0 b_1 + a_1 b_0)X + a_1 b_1 X^2 + a_3 b_0 X^3 + a_3 b_1 X^4 =$$

$$c_0 + c_1 X + c_2 X^2 + c_3 X^3 + c_4 X^4$$

these are the coefficients $c_0$, $c_2$, $c_3$, $c_4$.

An example is the result of a LWE to GLWE key switching, where the constant term may be the only one containing a message, and its error may be larger than the error in the other coefficients.

In this example, the variance of the error at the output of the tensor product can be estimated by the following formula:

$$\mathrm{Var}(E) = \mathrm{Var}(\mathrm{Error}\ (T', R', A', B')) =$$

$$\frac{\Delta_1^2}{\Delta^2} \|M_1\|_\infty^2 \big((\alpha_1 - 1) \cdot \sigma_{2,emp}^2 + \sigma_{2,fill}^2\big) + \frac{\Delta_2^2}{\Delta^2} \|M_2\|_\infty^2 \big((\alpha_2 - 1) \cdot \sigma_{1,emp}^2 + \sigma_{1,fill}^2\big) +$$

$$\frac{1}{\Delta^2}\big(\sigma_{1,fill}^2 \sigma_{2,fill}^2 + (\alpha_1 - 1)\sigma_{1,fill}^2 \sigma_{2,emp}^2 +$$

$$(\alpha_2 - 1)\sigma_{1,emp}^2 \sigma_{2,fill}^2 + (N - \alpha_1 - \alpha_2 + 1)(\sigma_{1,emp}^2 \sigma_{2,emp}^2)\big) +$$

$$\frac{N}{\Delta^2} \cdot \left(\frac{q^2 - 1}{12}\big(1 + kN\ \mathrm{Var}(S) + kN\mathbb{E}^2(S)\big) + \frac{kN}{4}\mathrm{Var}(S) + \frac{1}{4}(1 + kN\mathbb{E}(S))^2\right) \cdot$$

$$(\alpha_1 \alpha_{1,fill} + (N - \alpha_1)\sigma_{1,emp} + \alpha_2 \sigma_{2,fill} + (N - \alpha_2)\sigma_{2,emp}) +$$

$$\frac{1}{12} + \frac{kN}{12\Delta^2} \cdot \big((\Delta^2 - 1) \cdot \big(\mathrm{Var}(S) + \mathbb{E}^2(S)\big) + 3 \cdot \mathrm{Var}(S)\big) +$$

$$\frac{k(k-1)N}{24\Delta^2} \cdot \big((\Delta^2 - 1) \cdot \big(\mathrm{Var}(S'') + \mathbb{E}^2(S'')\big) + 3 \cdot \mathrm{Var}(S'')\big) +$$

$$\frac{kN}{24\Delta^2} \cdot \big((\Delta^2 - 1) \cdot \big(\mathrm{Var}(S'_{odd}) + \mathrm{Var}(S'_{even}) + 2 \cdot \mathbb{E}^2(S'_{mean})\big) +$$

$$3 \cdot (\mathrm{Var}(S'_{odd}) + \mathrm{Var}(S'_{even}))\big)$$

In this example, the final error of the multiplication, after tensor product and relinearization, is:

$$\mathrm{Var}(E_{Mult}) = \mathrm{Var}(E) + k\ell N\sigma_{RLK}^2 \cdot \frac{(k+1)}{2} \cdot \frac{b^2 + 2}{12} + \frac{kN}{2}\left(\frac{q^2}{12b^{2\ell}} - \frac{1}{12}\right)$$

$$\big((k-1) \cdot (\mathrm{Var}(S'') + \mathbb{E}(S''_{mean})) + \mathrm{Var}(S'_{odd}) + \mathrm{Var}(S'_{even}) + 2\mathbb{E}^2(S'_{mean})\big) +$$

$$\frac{kN}{8} \cdot ((k-1) \cdot \mathrm{Var}(S'') + \mathrm{Var}(S'_{odd}) + \mathrm{Var}(S'_{even}))$$

FIG. 2c (showing MultLWE units 207-212) schematically shows an example of an embodiment of a method of computing an LWE-encrypted product value using a MultLWE unit 207, 208, 209, 210, 211, or 212.

This example shows the computation of an LWE-encrypted product value 262 based on one or more LWE-encrypted input values. For the purpose of illustration, two LWE-encrypted input values 260, 261 are shown, but it is also possible to use just one LWE-encrypted input value, e.g., to compute its square, or to use more, for example, to compute a cube or an inner product, as also discussed below. The LWE-encrypted input values 260-261 may be encrypted under the same key.

The respective MultLWE units 207-212 discussed with respect to this figure may compute the LWE-encrypted product value 262 by applying a cryptographic key switching operation 200 to the set of LWE-encrypted input values 260-261 to determine one or more GLWE-encrypted input polynomials 245-246. A coefficient of an input polynomial 245-246 is a linear combination of the set of input values. The key switching can be implemented as a packing key switching PackingKS as described herein. The number of GLWE-encrypted input polynomials 245-246 can vary, e.g., it can be one (e.g., for using GenSquare to compute an encrypted GLWE multiplication), two (e.g., for using GenMult to compute an encrypted GLWE multiplication), or more (e.g., for repeatedly using GenSquare and/or GenMult). The key switching 200 can be configured to output RLWE encryptions 245, 246 (e.g., GLWE parameter k=1), or other types of GLWE encryptions (e.g., GLWE parameters k>1 and N>1).

Based on the one or more GLWE-encrypted input polynomials 245-246, an encrypted polynomial multiplication 205-206 may be applied, resulting in a GLWE-encrypted output polynomial 247. For example, the encrypted polynomial multiplication may be a multiplication GenMult 205, e.g., as discussed with respect to FIG. 2a or using any other technique for performing a polynomial multiplication of two, possibly different, GLWE-encrypted polynomials. The encrypted polynomial multiplication can also be a squaring GenSquare 205, e.g., as discussed with respect to FIG. 2b or using any other technique for performing a polynomial squaring of GLWE-encrypted polynomials.

The polynomial multiplication can be applied directly to the input polynomials, but it is also possible to apply one or more operations in the GLWE-encrypted domain in between, such as additions and/or scalar multiplications.

It is also possible to perform multiple polynomial multiplications, e.g., a GLWE-encrypted polynomial can be multiplied multiple times by itself to compute a power of the polynomial, e.g., a cube. It is also possible to perform additional operations in the GLWE-encrypted domain to the output polynomial 247, e.g., additional additions and/or scalar multiplications. For example, an arithmetic circuit may be applied on the GLWE-encrypted input polynomials 245-246 in the GLWE-encrypted domain that includes the one or more multiplications 205-206. The arithmetic circuit may result in multiple GLWE-encrypted polynomials.

Instead or in addition, as also discussed with respect to FIGS. 2a and 2b, additional operations may be applied in between the tensor product and the relinearization/key switching of the GenMult and GenSquare operations, e.g., using lazy relinearization.

Based on the GLWE-encrypted output polynomial 247, a cryptographic sample extraction operation 201 may be applied. For example, the sample extraction may be applied to the output polynomial 247 or, more generally, to the result of applying the arithmetic circuit in the GLWE-encrypted domain. The sample extraction may result in an LWE-encrypted product value 262 encrypting a coefficient of the polynomial to which it is applied. The LWE-encrypted product value 262 may generally represent the result of a polynomial function applied to the LWE-encrypted inputs 260-261, e.g., a degree-2 function such as a square, a product, or an inner product; or a function of degree higher than 2, such as a cube. It is also possible to extract multiple coefficients and/or extract coefficients from multiple GLWE-encrypted polynomials, as desired. Using sample extraction to obtain a LWE encryption of a coefficient from a GLWE encryption is known per se, e.g., from "TFHE: fast fully homomorphic encryption over the torus".

Computing LWE-encrypted product values in this way provides several advantages over techniques previously used in the TFHE setting. An important advantage is that padding is not needed, since the multiplication does not rely on the PBS known in the art. Also, computational efficiency can be improved. For example, when using RLWE ciphertexts to compute a product of two LWE-encrypted values, it was observed that instead of using two PBSes each involving over 500 external products, the computational costs can be reduced to the equivalent of around 7 external products. For other computations that are difficult to compute in the TFHE setting using traditional techniques, such as inner products, performance improvements are even greater.

Another advantage is the reduced size of key material needed. Again taking the example of computing the product of two LWE-encrypted values, the size of the keys needed is $2nN\ell_{KS}$ integers for the key switching plus $2N\ell_{RLK}$ integers for the relinearization key used in GenMult 205, for a total of $2N(n\ell_{KS}+\ell_{RLK})$ integers. Using existing PBS-based techniques, the keys are of total size $n(\ell'_{KS}(n+1)+4\ell'_{PBS}N)$ integers. The $\ell$ factors are relatively small compared to n, and all of about the same size. As a consequence, a reduction in the size of the used key material by a factor of over 2 can be observed. As above, the reduction is similar also for other product computations such as inner products and squares.

Generally, MultLWE units as described herein may be configured such that LWE-encrypted product value 262 is encrypted under the same key as the LWE-encrypted input values 260, 261, but it is also possible for the product value 262 to be encrypted under a different key. For illustrative purposes, in the examples given in the remainder of this specification, it may be assumed that the input and output keys are the same, with the understanding that the techniques are also applicable in the case that the input and output keys are different.

Several detailed examples of such computations of LWE-encrypted product value 262 are now given.

In an example MultLWE unit 207, a multiplication of LWE-encrypted first and second values 260, 261 may be computed. GLWE-encrypted first and second input polynomials 245, 246 may be determined having the first and second values as coefficients, respectively, for example as constant coefficients. GenMult unit 205 may be used to compute a GLWE-encrypted product 247 of the first and second input polynomials 245, 246. LWE-encrypted product 262 of the first and second values may be extracted by SampleExtract unit 201 as a coefficient of the GLWE-encrypted output polynomial 247. This unit may be implemented as follows:

Algorithm (MultLWE unit 207): $ct_{out} \leftarrow$ MultLWE($ct_1$, $ct_2$, RLK, KSK)

$$
\text{Context:} \begin{cases}
s = (s_1, \ldots, s_n) \\
s' = (s_{1'}, \ldots, s'_{kN}) \\
S' = \left(S'^{(1)}, \ldots, S'^{(k)}\right) \text{ such that } S'^{(i)} = \sum_{j=0}^{N-1} s'_{(i-1)\cdot N+j+1} X^j \\
\Delta_{out} = \max(\Delta_1, \Delta_2)
\end{cases}
$$

$$
\text{Input:} \begin{cases}
ct_1 = LWE_s(m_1 \cdot \Delta_1) \\
ct_2 = LWE_s(m_2 \cdot \Delta_2) \\
RLK\text{: as needed for } GenMult \\
KSK\text{: as needed for } PackingKS
\end{cases}
$$

Output: $ct_{out} = LWE_s(m_1 \cdot m_2 \cdot \Delta_{out})$
// KS from LWE to GLWE
$CT_1 = GLWE_s(m_1 \cdot \Delta_1) \leftarrow$ PackingKS({$ct_1$}, {0}, KSK)
$CT_2 = GLWE_s(m_2 \cdot \Delta_2) \leftarrow$ PackingKS({$ct_2$}, {0}, KSK)
// GLWE multiplication: Tensor product + Relinearization
$CT \leftarrow$ Gen Mult($CT_1$, $CT_2$, RLK)
// Sample extract the constant term (coeff. 0)
$ct_{out} \leftarrow$ SampleExtract$_0$ (CT)

In an example MultLWE unit 208, a multiplication of LWE-encrypted first and second values 260, 261 may be computed by using the key switching 200 to pack both values 260, 261 into respective coefficients of a single GLWE-encrypted input polynomial 245. GenSquare unit 206 may be used to compute a GLWE-encrypted output polynomial 247 as a square of the input polynomial. The LWE-encrypted product 262 may be obtained as a coefficient of this output polynomial. Interestingly, this improves the efficiency of computation, for example, since only a single packing is needed. This unit may be implemented as follows:

Algorithm (MultLWE unit 208): $ct_{out} \leftarrow$ MultSquareLWE($ct_1$, $ct_2$, RLK, KSK)

$$
\text{Context:} \begin{cases}
s = (s_1, \ldots, s_n) \\
s' = (s_{1'}, \ldots, s'_{kN}) \\
S' = \left(S'^{(1)}, \ldots, S'^{(k)}\right) \text{ such that } S'^{(i)} = \sum_{j=0}^{N-1} s'_{(i-1)\cdot N+j+1} X^j \\
\Delta_{out} = \max(\Delta_1, \Delta_2)
\end{cases}
$$

$$
\text{Input:} \begin{cases}
ct_1 = LWE_s(m_1 \cdot \Delta_1) \\
ct_2 = LWE_s(m_2 \cdot \Delta_2) \\
RLK\text{: as needed for } GenSquare \\
KSK\text{: as needed for } PackingKS
\end{cases}
$$

Output: $ct_{out} = LWE_s(m_1 \cdot m_2 \cdot 2\Delta_{out})$
// KS from LWE to GLWE
$CT = GLWE_s(m_1\Delta_1 + m_2\Delta_2 X) \leftarrow$ PackingKS({$ct_1$, $ct_2$}, {0, 1}, KSK)
// GLWE square: Tensor product + Relinearization
$CT_\otimes \leftarrow$ GenSquare(CT, RLK)
// Sample extract the coefficient 1
$ct_{out} \leftarrow$ SampleExtract$_1$($CT_\otimes$)

As discussed, lazy relinearization may be applied in combination with the presented techniques. For example, additional operations may be applied to non-relinearized GLWE-encrypted polynomials by applying them to the output of MultLWE unit 207-212 from which the relinearization operation of GenMult 205 or GenSquare 206, and the SampleExtract operation 201, are removed to be performed later in a different unit. The remaining parts of MultLWE 207, 208 may be denoted as follows:

$$CT_{out} \leftarrow MultLWE^*(ct_1, ct_2, KSK)$$

$$CT_{out} \leftarrow MultSquareLWE^*(ct_1, ct_2, KSK)$$

In this case, one or more operations may be applied to the outputs of these functions, after which the relinearization and the sample extraction may be performed to obtain a LWE-encrypted value.

MultLWE units 207 and 208 both allow to multiply two LWE-encrypted values. MultLWE unit 207 has the advantage of resulting in a less noisy output. MultLWE unit 208 has the advantage of being more computationally efficient. Therefore, depending on the situation, MultLWE unit 207 or 208 may be preferred to perform the multiplication.

In another example MultLWE unit 209, multiple first LWE-encrypted input values may be packed into respective coefficients of the first GLWE-encrypted input polynomial 245, and multiple second LWE-encrypted input values may be packed into respective coefficients of the second GLWE-encrypted input polynomial 246. By computing the polynomial product, a GLWE-encrypted output polynomial 247 may obtained in which respective coefficients correspond to products of respective first and second input values. These respective coefficients may then be extracted by SampleExtract unit 201. Thus, a single GLWE-encrypted polynomial multiplication 245 may suffice to compute respective LWE-encrypted products, resulting in an improved efficiency. This unit may be implemented as follows:

---

Algorithm (MultLWE unit 209).
$\{ct_{out,i}\}_{i=0}^{\alpha-1} \leftarrow$ PackedProducts$(\{ct_{1,i}\}_{i=0}^{\alpha-1}, \{ct_{2,i}\}_{i=0}^{\alpha-1}, RLK, KSK)$ Context:
$s = (s_1, \ldots, s_n)$
$s' = (s_{1'}, \ldots, s'_{kN})$
$S' = (S'^{(1)}, \ldots, S'^{(k)})$ such that $S'^{(i)} = \sum_{j=0}^{N-1} s'_{(i-1)N+j+1} X^j$
$\alpha$: such that $\alpha^2 \leq N$
$\Delta_{out} = \max(\Delta_1, \Delta_2)$ Input:
$\{ct_{1,i} = LWE_s(m_{1,i} \cdot \Delta_1)\}_{i=0}^{\alpha-1}$
$\{ct_{2,i} = LWE_s(m_{2,i} \cdot \Delta_2)\}_{i=0}^{\alpha-1}$
$RLK$: as needed for *GenMult*
$KSK$: as needed for *PackingKS*

Output: $\{ct_{out,i} = LWE_s(m_{1,i} \cdot m_{2,i} \cdot \Delta_{out})\}_{i=0}^{\alpha-1}$
// KS from LWE to GLWE
$\mathcal{L}_1 = \{0, 1, 2, \ldots, \alpha - 1\}$
$\mathcal{L}_2 = \{0, \alpha, 2\alpha, \ldots, (\alpha - 1)\alpha\}$
$CT_1 \leftarrow$ PackingKS$(\{ct_{1,i}\}_{i=1}^\alpha, \mathcal{L}_1, KSK)$
$CT_2 \leftarrow$ PackingKS$(\{ct_{2,i}\}_{i=1}^\alpha, \mathcal{L}_2, KSK)$
// GLWE multiplication: Tensor product + Relinearization
$CT \leftarrow$ GenMult$(CT_1, CT_2, RLK)$
// Sample extractions
$\{ct_{out,i} \leftarrow$ SampleExtract$_{i(\alpha+1)}(CT)\}_{i=0}^{\alpha-1}$

---

In the example shown, the encryptions from the first set of LWE-encrypted input values have the same scaling factor $\Delta_1$, and similarly for the scaling factor $\Delta_2$ of the second set of LWE-encrypted input values. The example can be adapted to accept different respective scaling factors $$\Delta_i^{(1)} \text{ and } \Delta_i^{(2)}.$$

This algorithm may start with 2 sets of a LWE ciphertexts, pack each set into one GLWE ciphertext with a precise order, compute a multiplication (e.g., tensor product followed by a relinearization) and extract each result located in precise coefficients. The two GLWE ciphertexts that are multiplied may contain the plaintexts $P_1$ and $P_2$ such that:

$$P_1 = \Delta_1 \cdot \left( \sum_{i=0}^{\alpha-1} m_{1,i} \cdot X^i \right)$$

$$P_2 = \Delta_2 \cdot \left( \sum_{i=0}^{\alpha-1} m_{2,i} \cdot X^{i\alpha} \right)$$

Now if one multiplies them together one gets the following polynomial:

$$P_1 \cdot P_2 = \Delta_1 \cdot \Delta_2 \cdot \left( \sum_{i=0}^{(\alpha-1)(\alpha+1)} m_{1,i'} \cdot m_{2,i''} \cdot X^i \right)$$

with $i' = i \mod \alpha$ and $$i'' = \left\lfloor \frac{i}{\alpha} \right\rfloor$$

and when one extracts the c-th coefficients with $c = j(\alpha+1)$ and $0 \leq j < \alpha$ one gets $\Delta_1 \Delta_2 m_{1,j} m_{2,j}$ since:

$$c = j\alpha + j \equiv j \mod \alpha$$

$$\left\lfloor \frac{c}{\alpha} \right\rfloor = j$$

Which is as intended. One of the deltas (the smallest) may be removed during the tensor product.

Interestingly, the cost of this algorithm compares favourably with the cost of doing multiple MultLWEs independently. MultLWE 209 may use two PackingKS and one GenMult. The alternative costs $2\alpha$PackingKS and $\alpha$GenMult. Those PackingKS will be a bit less costly as the polynomials to be put in the FFT will be mostly sparse, but it is needed to do a of them. Overall, the inventors found that the present algorithm shows better performance than doing a MultLWEs independently.

In another example MultLWE unit 210, multiple LWE-encrypted input values may be packed into respective coefficients of a single GLWE-encrypted input polynomial 245. The coefficients may be selected such that using GenSquare 246 to compute a square of the input polynomial 245, results in a GLWE-encrypted output polynomial 247 having squares of the respective input values as respective coefficients. These coefficients may then be extracted. This unit may be implemented as follows:

---

Algorithm (MultLWE unit 210).
$\{ct_{out,i}\}_{i=0}^{\alpha-1} \leftarrow$ PackedSquares$(\{ct_i\}_{i=0}^{\alpha-1}, RLK, KSK)$ Context:
$s = (s_1, \ldots, s_n)$
$s' = (s_{1'}, \ldots, s'_{kN})$
$S' = (S'^{(1)}, \ldots, S'^{(k)})$ such that $S'^{(i)} = \sum_{j=0}^{N-1} s'_{(i-1)N+j+1} X^j$
$\alpha$: such that $2\alpha \leq N$ Input:
$\{ct_i = LWE_s(m_i \cdot \Delta)\}_{i=0}^{\alpha-1}$
$RLK$: as needed for *GenSquare*
$KSK$: as needed for *PackingKS*

31

-continued

```
Algorithm (MultLWE unit 210).
{ct_out,i}_{i=0}^{α−1} ← PackedSquares({ct_i}_{i=0}^{α−1}, RLK, KSK)

Output: {ct_out,i = LWE_s(m_i² · Δ)}_{i=0}^{α−1}
// KS from LWE to GLWE
𝓛 = {2⁰ − 1, 2¹ − 1, 2² − 1, . . . , 2^{α−1} − 1}
CT ← PackingKS({ct_1,i}_{i=0}^{α−1}, 𝓛, KSK)
// GLWE Square: Tensor product + Relinearization
CT ← GenSquare(CT, RLK)
// Sample extractions
{ct_out,i ← SampleExtract_{2^{i+1}−2}(CT)}_{i=0}^{α−1}
```

As for the implementation of MultLWE unit 209, this implementation can be adapted to support different respective scaling factors for the respective LWE-encrypted input values.

This algorithm may start with 1 set of $\alpha$ LWE ciphertexts, pack the set into one GLWE ciphertext with a precise order, compute a square (e.g., tensor product followed by a relinearization) and finally extract each result located in precise coefficients. The GLWE ciphertext that is multiplied with itself may contains the plaintext P such that:

$$P = \Delta \cdot \left( \sum_{i=0}^{α−1} m_i \cdot X^{2^i−1} \right)$$

Now if one multiplies them together one gets the following polynomial:

$$P^2 = \Delta^2 \cdot \left( \sum_{i=0}^{α−1} \sum_{j=0}^{α−1} m_i \cdot m_j \cdot X^{2^i+2^j−2} \right)$$

When one extracts the c-th coefficients with $c=2^{k+1}−2$ and $0 \le k < \alpha$ one gets $$\Delta m_k^2$$

since:

$$c = 2^{k+1} − 2 = 2^k + 2^k − 2$$

Which is as intended. One of the deltas may be removed during the tensor product.

MultLWE unit 210 can also be adapted to compute respective products between respective first and second sets of LWE-encrypted input values. The first and second sets of LWE-encrypted values may be packed into a single GLWE-encrypted input polynomial 245 such that its square has the respective products as coefficients. For example, the sets of LWE-encrypted input values may be $$\{ct_{1,i} = LWE_s(m_{1,i} \cdot \Delta_1)\}_{i=0}^{α−1} \text{ and } \{ct_{2,i} = LWE_s(m_{2,i} \cdot \Delta_2)\}_{i=0}^{α−1}.$$

The packing 200 may be done by using coefficients $\mathcal{L}=\{2^0−1, 2^1−1, 2^2−1, . . . , 2^{2α−1}−1\}$, filling the first $\alpha$ coefficients with the ciphertexts in the first set, and the second half with the ciphertexts in the second set, where $2^{α/2} \le N$.

32

Sample extraction 201 may extract a coefficients in position $2^{i−1}+2^{α+i−1}−2$ for $i=0, . . . , \alpha−1$ to obtain the respective LWE-encrypted products.

In the above examples, the extracted coefficients of the GLWE-encrypted output polynomial 247 are equal to products of respective LWE-encrypted input values, for example squares. Interestingly, the inventors realized that it is also possible to perform the packing 200 such that a coefficient corresponds to a sum of products of the LWE-encrypted input values, in other words, an inner product of LWE-encrypted input values considered as a vector. This is demonstrated in MultLWE units 211 and 212.

In example MultLWE unit 211, an inner product between a first set of LWE-encrypted values and a second set of LWE-encrypted values may be computed by determining GLWE-encrypted first and second input polynomials 245, 246 having the first set of values and the second values as coefficients, respectively, in such a way that the polynomial product has the inner product as a coefficient. The GLWE-encrypted output polynomial 247 may be computed using GenMult 205 as a product of the first and second input polynomials 245, 246. The LWE-encrypted output value 262 may be determined by extracting 201 the coefficient corresponding to the inner product. This unit may be implemented as follows:

```
Algorithm (MultLWE 211).
ct_out ← PackedSumProducts({ct_1,i}_{i=0}^{α−1}, {ct_2,i}_{i=0}^{α−1}, RLK, KSK)

⎧ s = (s_1, . . . , s_n)
         ⎪ s' = (s_{1'}, . . . , s'_{kN})
Context: ⎨ S' = (S'^{(1)}, . . . , S'^{(k)}) such that S'^{(i)} = Σ_{j=0}^{N−1} s'_{(i−1)·N+j+1} X^j
         ⎪ α: such that α ≤ N
         ⎩ Δ_out = max(Δ_1, Δ_2)

⎧ {ct_1,i = LWE_s(m_{1,i} · Δ_1)}_{i=0}^{α−1}
         ⎪ {ct_2,i = LWE_s(m_{2,i} · Δ_2)}_{i=0}^{α−1}
Input:   ⎨ RLK: as needed for GenMult
         ⎩ KSK: as needed for PackingKS Output: ct_out = LWE_s(Σ_{i=0}^{α−1} m_{1,i} · m_{2,i} · Δ_out)
// KS from LWE to GLWE
𝓛_1 = {0, 1, 2, . . . , α − 1}
𝓛_2 = {α − 1, α − 2, α − 3, . . . , 0}
CT_1 ← PackingKS({ct_1,i}_{i=0}^{α−1}, 𝓛_1, KSK)
CT_2 ← PackingKS({ct_2,i}_{i=0}^{α−1}, 𝓛_2, KSK)
// GLWE multiplication: Tensor product + Relinearization
CT ← GenMult(CT_1, CT_2, RLK)
// Sample extraction
ct_out ← SampleExtract_{α−1}(CT)
```

As for the implementation of MultLWE unit 209, this implementation can be adapted to support different respective scaling factors for the respective LWE-encrypted input values.

This algorithm may start with 2 sets of $\alpha$ LWE ciphertexts, pack each set into one GLWE ciphertext with a precise order, compute a multiplication (e.g., tensor product followed by a relinearization) and finally extract the result located in a precise coefficient. The two GLWE ciphertexts that are multiplied may contain the plaintexts $P_1$ and $P_2$ such that:

$$P_1 = \Delta_1 \cdot \left( \sum_{i=0}^{α−1} m_{1,i} \cdot X^i \right)$$

$$P_2 = \Delta_2 \cdot \left( \sum_{i=0}^{α−1} m_{2,i} \cdot X^{α−1−i} \right)$$

Now if one multiplies them together one gets the following polynomial:

$$P_1 \cdot P_2 = \Delta_1 \cdot \Delta_2 \cdot \left( \sum_{i=0}^{\alpha-1} \sum_{j=0}^{\alpha-1} m_{1,i} \cdot m_{2,j} \cdot X^{i+\alpha-1-j} \right)$$ 5

When one extracts the c-th coefficient with c=α−1, one gets

$$\Delta_1 \Delta_2 \sum_{i=0}^{\alpha-1} m_{1,i} m_{2,i}$$

which is as intended. One of the deltas (the smallest) may be removed during the tensor product.

In example MultLWE unit 212, a sum of squares may be computed, in other words, an inner product of a set of LWE-encrypted input values with itself. To this end, a GLWE-encrypted input polynomial 245 may be determined having the set of values as coefficients, in such a way that its polynomial product has the sum of squares of a coefficient. The GLWE-encrypted output polynomial 247 may be computed using e.g. GenSquare 206 as a square of the GLWE-encrypted input polynomial 245, and the LWE-encrypted 262 product value may be obtained by extracting 201 the coefficient corresponding to the sum of the squares. This unit may be implemented as follows:

---

Algorithm (MultLWE 212). $\mathrm{ct}_{out} \leftarrow \mathrm{PackedSumSquares}(\{\mathrm{ct}_i\}_{i=0}^{\alpha-1}$, RLK, KSK)

---

Context: $\begin{cases} s = (s_1, \ldots, s_n) \\ s' = (s_1', \ldots, s_{kN}') \\ S' = \left( S'^{(1)}, \ldots, S'^{(k)} \right) \text{ such that } S'^{(i)} = \sum_{j=0}^{N-1} s_{(i-1)\cdot N+j+1}' X^j \\ \alpha: \text{ such that } \alpha \leq \dfrac{N}{2} \end{cases}$

Input: $\begin{cases} \{\mathrm{ct}_i = LWE_s(m_i \cdot \Delta)\}_{i=0}^{\alpha-1} \\ RLK: \text{ as needed for GenSquare} \\ KSK: \text{ as needed for } PackingKS \end{cases}$

Output: $\mathrm{ct}_{out} = LWE_{s'}(\Sigma_{i=0}^{\alpha-1} m_i{}^2 \cdot 2\Delta)$ // KS from LWE to GLWE
$\mathcal{L}_1 = \{0, 1, 2, \ldots, \alpha-1\}$
$\mathcal{L}_2 = \{2\alpha-1, 2\alpha-2, 2\alpha-3, \ldots, \alpha\}$
$\mathrm{CT} \leftarrow \mathrm{PackingKS}(\{\mathrm{ct}_{1,i}\}_{i=0}^{\alpha-1} \| \{\mathrm{ct}_{1,i}\}_{i=0}^{\alpha-1}, \mathcal{L}_1 \| \mathcal{L}_2, \mathrm{KSK})$ 45
// GLWE square: Tensor product + Relinearization
$\mathrm{CT} \leftarrow \mathrm{GenSquare}(\mathrm{CT}, \mathrm{RLK})$
// Sample extraction
$\mathrm{ct}_{out} \leftarrow \mathrm{SampleExtract}_{2\alpha-1}(\mathrm{CT})$

---

As for the implementation of MultLWE unit 209, this implementation can be adapted to support different respective scaling factors for the respective LWE-encrypted input values.

This algorithm may start with 1 set of α LWE ciphertexts, pack the set into one GLWE ciphertext with a precise order, compute a square (e.g., tensor product followed by a relinearization) and finally extract one result located in a precise coefficient. The GLWE ciphertext that is multiplied with itself may contain the plaintext P such that:

$$P = \Delta \cdot \left( \sum_{i=0}^{\alpha-1} m_i \cdot X^i + m_i \cdot X^{2\alpha-1-i} \right)$$

$$= \Delta \cdot \left( \sum_{i=0}^{2\alpha-1} \mu_i \cdot X^i \right)$$

With $\mu_i=m_i$ when $0 \leq i < \alpha$ and $\mu_i = m_{\alpha-1-i}$ when $\alpha \leq i < 2\alpha$. Now if one multiplies them together one gets the following polynomial:

$$P^2 = \Delta^2 \cdot \left( \Sigma_{i=0}^{2\alpha-1} \Sigma_{j=0}^{2\alpha-1} \mu_i \cdot \mu_j \cdot X^{i+j} \right)$$

When one extracts the c-th coefficients with c=2α−1 one 10 gets $$2\Delta \sum_{i=0}^{\alpha-1} m_i^2$$

which is as intended. One of the deltas may be removed during the tensor product and a factor 2 may be obtained during the polynomial square.

A noise analysis is now provided of the operations performed by MultLWE units 207-212. Units 207-208 may perform a packing key switching, before the multiplication or the square and a final sample extraction. The sample extraction may not impact the noise, while the PackingKS may have an impact on the noise.

Consider an LWE secret key $s=(s_1, \ldots, s_n)$ and an input LWE ciphertext $c=(a_1, \ldots, a_n, b)$ such that $$b = \sum_{i=1}^{n} a_i s_i + m + e$$

with e from $\mathcal{N}(0,\sigma^2)$.

Consider a GLWE secret key $S=(S_1, \ldots, S_k)$ and a key switching key composed of the following GLWE ciphertexts $$\left\{ C^{(i,j)} = \left( A_1^{(i,j)}, \ldots, A_k^{(i,j)}, B^{(i,j)} \right) \right\}$$

with $1 \leq i \leq n$ and $1 \leq j \leq \ell$ such that

$$B^{(i,j)} = \Sigma_{\psi=1}^{k} A_\psi^{(i,j)} \cdot S_\psi + s_i \frac{q}{\beta^j} + E^{(i,j)}$$ with coefficients of $E^{(i,j)}$ from $$\mathcal{N}(0, \sigma_{KSK}^2).$$

During the algorithm the $\{a_i\}$ may be rounded to the closest multiple of $$\frac{q}{\beta^\ell}$$

and then decomposed such that for $1 \leq i \leq n$, $a_i = a_i + \bar{a}_i$ and for $1 \leq j \leq \ell$, $$a_{i'} = \Sigma_{j=1}^{\ell} a_{i,j}' \frac{q}{\beta^j}$$ with $\bar{a}_i$ uniform in $$\left[\left[\frac{-q}{2\beta^\ell}, \frac{q}{2\beta^\ell}\right]\right)$$

and $a_{i,j}'$ uniform in $$\left[\left[\frac{-\beta}{2}, \frac{\beta}{2}\right]\right).$$

Then, the variance of the error at the output of the PackingKS may be estimated by:

$$\mathrm{Var}(E_{PackingKS}) =$$
$$\sigma^2 + n \cdot \left(\frac{q^2}{12\beta^{2\ell}} - \frac{1}{12}\right) \cdot \left(\mathrm{Var}(s_i) + \mathbb{E}^2(s_i)\right) + \frac{n}{4} \cdot \mathrm{Var}(s_i) + n \cdot \ell \cdot \sigma_{KSK}^2 \cdot \frac{\beta^2 + 2}{12}.$$

This is the noise formula for the coefficients that are filled in the packing. For the other coefficients the noise may be reduced to:

$$\mathrm{Var}(E_{PackingKS}) = \mathrm{Var}\left(\sum_{i=1}^n \sum_{j=1}^\ell a_{i,j}' \cdot E^{(i,j)}\right) = n \cdot \ell \cdot \sigma_{KSK}^2 \cdot \frac{\beta^2 + 2}{12}.$$

Units 209-212 may first use a key switch to pack LWE ciphertexts into one GLWE ciphertext. This may increase the noise according to the estimates given by the formulas for $\mathrm{Var}(E_{PackingKS})$. The last step may be a multiplication or a square (e.g., using a tensor product and a relinearization) which may also increase the noise. This noise may be as discussed with respect to FIG. 2a.

Figure 3A:
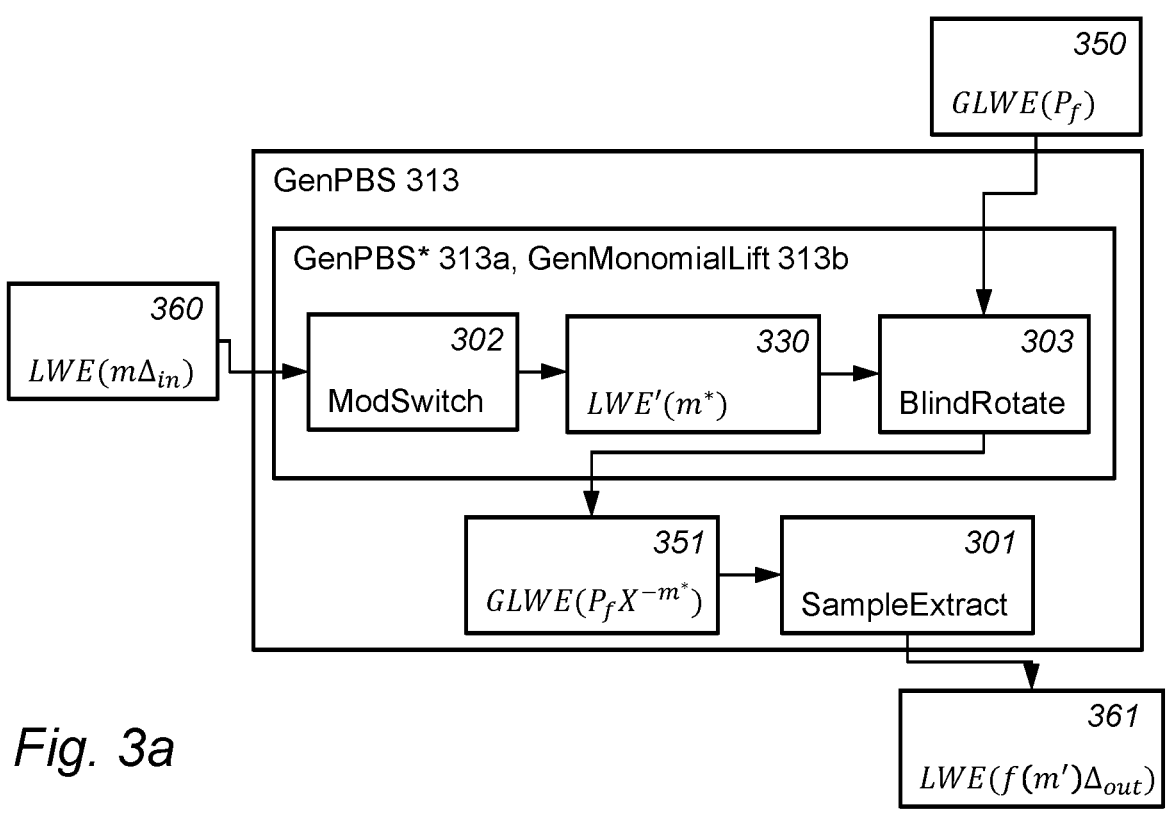
FIG. 3a schematically shows an example of an embodiment of a method "GenPBS" of applying a programmable bootstrapping operation.

FIG. 3a (showing GenPBS unit 313, GenPBS* unit 313a, and GenMonomialLift unit 313b) schematically shows an example of an embodiment of a method of applying a programmable bootstrapping operation using GenPBS unit 313.

This method may be applied in combination with the computation of an LWE-encrypted product value using a MultLWE unit, e.g., as discussed with respect to FIG. 2c. For example, the programmable bootstrapping may be applied to the LWE-encrypted product value or to an LWE-encrypted value computed from it. However, the techniques discussed with respect to this figure can also be used in settings without a MultLWE unit.

The programmable bootstrapping GenPBS, 313 of the figure, may be applied to an LWE-encrypted input value 360. As is known per se in the TFHE setting, a programmable bootstrapping may be performed based on an evaluation 303 of an LWE decryption in an exponent of a GLWE-encrypted monomial. Such an evaluation is also known as a blind rotation. The blind rotation typically uses a set of bootstrapping keys that allow the LWE decryption to be performed only in the exponent, e.g., it is not possible to decrypt the LWE-encrypted value to obtain its plaintext as such, but only to obtain a GLWE-encrypted monomial that corresponds to the plaintext.

As is known per se, the programmable bootstrapping 313 may determine a rescaling 330 of the LWE-encrypted input value by performing a modulus switching operation 302. The modulus switching operation 302 may scale the LWE-encrypted input value 360 to the set of exponents of GLWE-encrypted monomials, e.g., the set of integers modulo 2N. It is known to scale the LWE-encrypted input value 360 linearly to the set [0,2N], that is, by computing $$x \mapsto \left\lfloor \frac{2N \cdot x}{q} \right\rceil.$$

Interestingly, the inventors realized that by performing the scaling of modulus switching 302 in a different way, it is possible to perform the bootstrapping on a particular chunk of the input value. This more versatile modulus switching may be parameterized by one or both of two parameters $\varkappa$ and $\vartheta$. Parameter $\varkappa$ may define a size of a most significant portion of the input value that is not considered in the PBS, e.g., a number of most significant bits. Parameter $\vartheta$ may define a number of functions that may in some embodiments be evaluated at the same time in a single PBS, e.g., the number of functions may be $2^\vartheta$.

The newly introduced parameters $(\varkappa, \vartheta)$ are illustrated in FIG. 10a. The figure shows a LWE-encrypted input value 010 on which the modulus switching may be applied. The result may be a scaled LWE-encrypted ciphertext 011 mapped to the set [0,2N], 005 of exponents of GLWE-encrypted monomials.

The LWE-encrypted input value 010 may contain the message, having a first part $\bar{m}$, 001 of size $\varkappa$, 004, e.g., $\varkappa$ bits; and a second part m, 002. The LWE-encrypted input value may also contain an error part e, 003. The scaled LWE-encrypted ciphertext may contain the part m, 002 of the message, while part $\bar{m}$, 001, is removed due to the scaling. The scaled LWE-encrypted ciphertext may further contain an error part e', 007. Interestingly, the error part 007 may be followed a chunk of size $\theta$, 006, e.g., of $\theta$ bits, that does not contain an error.

Returning to FIG. 3a, the part of the LWE-encrypted input message 360 to be considered by the programmable bootstrapping may be encoded as a value in the window $$\left[\left[-\frac{N}{2^\vartheta}, \frac{N}{2^\vartheta}\right]\right) = \left[\left[-2^{\log_2(2N)-\vartheta-1}, 2^{\log_2(2N)-\vartheta-1}\right]\right)$$

rescaled by a factor $$\frac{q \cdot 2^\vartheta}{2N \cdot 2^\varkappa}.$$

Assuming elements $a_i$, $i \in [1,n+1]$ of the LWE-encrypted input value 360 belong to the interval $$\left[\left[-\frac{q}{2}, \frac{q}{2}\right]\right),$$

the modulus switching 302 may multiply the respective elements $a_i$ by a factor depending on the two parameters, e.g., $$\frac{2N \cdot 2^\varkappa}{q \cdot 2^\vartheta}$$

if the parameters represent bit sizes; round the result; and rescale by another factor depending on the parameter $\vartheta$, e.g., $2^\vartheta$ if $\vartheta$ is a bit size, before mapping the result to the set of exponents of GLWE-encrypted polynomials, e.g., reducing modulo 2N.

Following the modulus switching 302, blind rotation 303 may be applied to the scaled LWE-encrypted ciphertext 330. As is known per se, the blind rotation may be used to apply a univariate function to the input value, which is why this type of bootstrapping is often referred to as a programmable bootstrapping. The function being applied may or may not be the identity function. The function to be evaluated may be represented by a test polynomial 350, also referred to as a Look-Up Table (LUT). The blind rotation may start with the test polynomial and, by performing the decryption in the exponent of a GLWE-encrypted monomial that is multiplied by the test polynomial, effectively rotate the test polynomial to obtain a GLWE-encrypted polynomial 351 in which the coefficient of the test polynomial corresponding to the encrypted input value is rotated to a certain fixed place, e.g., to the constant coefficient. A LUT is said to be r-redundant if each coefficient is repeated r times consecutively. This redundancy allows to remove the noise during the PBS.

The test polynomial 350 may be represented as a trivial GLWE encryption, e.g., without randomness, e.g., $(0, P_{LUT})$, of the look-up table $P_{LUT}$. For example, $P_{LUT}$ may be a redundant look-up table of size N. The encrypted look-up table may be rotated, e.g., by using a loop of CMux operations, according to the scaled LWE ciphertext 330 and using a bootstrapping key. It is also possible to use a non-trivial GLWE-encryption 350 of the look-up table $P_{LUT}$. In this specification, the notation $P_{LUT}$ and its variants is used to represent both trivial and non-trivial GLWE encryptions 350 of the look-up table.

The blind rotation 303 may thus result in a GLWE-encrypted polynomial 351 that has a coefficient of the test polynomial 350 corresponding to the LWE-encrypted input value 360 as a certain fixed coefficient $vX^i$, e.g., the constant coefficient i=0. A cryptographic sample extraction 301 $ct_{out}$ $\leftarrow$ SampleExtract$_i$(CT$_{in}$) may optionally be applied to this GLWE-encrypted polynomial 351 that extracts this ith coefficient as a LWE-encrypted output value 361. Accordingly, the LWE-encrypted output value 361 may represent a result of a function being applied to the LWE-encrypted input value 360 scaled according to parameters $(\varkappa, \vartheta)$. Parameter values $(\varkappa, \vartheta)=(0,0)$ may be used to apply the programmable bootstrapping known in the art, while parameter values $(\varkappa, \vartheta) \neq (0,0)$ may be used to obtain more flexibility.

A detailed example of implementing the improved programmable bootstrapping is as follows:

Algorithm (GenPBS 313). $ct_{out} \leftarrow$ GenPBS($ct_{in}$, BSK, $P_f$, $\Delta_{out}$, $\varkappa$, $\vartheta$)

Context:
$$\begin{cases} s = (s_1, \ldots, s_n) \\ s' = (s_{1'}, \ldots, s'_{kN}) \\ S' = \left( S'^{(1)}, \ldots, S'^{(k)} \right) \text{ such that } S'^{(i)} = \\ \quad \sum_{j=0}^{N-1} s'_{(i-1)\cdot N+j+1} X^j \\ f: \mathbb{Z} \to \mathbb{Z} \\ (\beta, m'): \text{ see below} \end{cases}$$

Input:
$$\begin{cases} ct_{in} = LWE_s(m \cdot \Delta_{in}) = (a_1, \ldots, a_n, a_{n+1} = b) \\ BSK = \left\{ BSK_i = GGSW_{S'}^{(B,\ell)}(s_i) \right\}_{1 \le i \le n} \\ p_f: \text{ a } r \text{ redundant } LUT \text{ for } x \mapsto f(x) \\ \Delta_{out}: \text{ the output scaling factor} \\ (\aleph, \vartheta): \text{ define along with } N \text{ the window size} \end{cases}$$

-continued

Algorithm (GenPBS 313). $ct_{out} \leftarrow$ GenPBS($ct_{in}$, BSK, $P_f$, $\Delta_{out}$, $\varkappa$, $\vartheta$)

Output: $ct_{out} = LWE_s((-1)^\beta \cdot f(m') \cdot \Delta_{out})$

// modulus switching for $1 \le i \le n+1$ do $a_i \leftarrow \left[ \left\lceil \frac{a_i \cdot 2N \cdot 2^{\aleph - \vartheta}}{q} \right\rceil \cdot 2^\vartheta \right]_{2N}$ // blind rotate of the LUT CT $\leftarrow$ BlindRotate$((0, \Delta_{out} \cdot P_f), \{\alpha_i\}_{1 \le i \le n+1}$, BSK)

// sample extract the constant term (coeff. 0), skip this step to implement GenPBS*

$ct_{out} \leftarrow$ SampleExtract$_0$(CT)

Let m be a message, $\Delta$ its scaling factor, $\varkappa$ and $\vartheta$ the parameters of the modulus switching 302. Define $$q' = \frac{q}{\Delta 2^\varkappa}.$$

For example, for simplicity it may be assumed that $q' \cdot 2^\vartheta < 2N$, but this is not needed in general. In the definition of the output ciphertext $ct_{out}$, the values $\beta$ and m' may be characterized as follows:

if $\varkappa \ge 0$, set m'=m mod q'/2 and $$\beta = \begin{cases} 0 & \text{if } m \bmod q' < \frac{q'}{2} \\ 1 & \text{else} \end{cases}$$

if $\varkappa < 0$, set m'=m and $\beta$ a random bit.

Thus, it may be observed that the output of GenPBS 313 may be correct only up to sign, e.g., depending on whether $\beta=0$. In some cases, this may not be a problem, e.g., it may be ensured that $\varkappa \ge 0$ and m mod q' is either always smaller than q'/2 or always at least equal to q'/2. This is what is typically done in the prior art when applying the known programmable bootstrapping. In other cases, it may not be acceptable if the output is only correct up to sign. In such cases, interestingly, the generalized programmable bootstrapping 313 can be used as a subroutine to a programmable bootstrapping whose output is always correct, as demonstrated in FIGS. 4-6. This is enabled by its improved flexibility compared to the known PBS.

It is not necessary for the programmable bootstrapping to include the sample extraction 301. For example, additional operations may be performed on the result 351 of the blind rotation 303 in the GLWE-encrypted domain before switching back to the LWE-encrypted domain. This is shown in the figure as GenPBS* operation 313a.

A special case of the GenPBS* operation 313a is where the test function $P_f$ is set to a constant function $P_f = \Delta_{out}$. This may be referred to as a "monomial lift" and is shown in the figure as GenMonomialLift operation 313b. For example, GenMonomialLift 313b may be implemented as:

---

Algorithm (GenMonomialLift 313b).
$CT_{out} \leftarrow$ GenMonomialLift($ct_{in}$, BSK, $\Delta_{out}$, $\varkappa$, $\vartheta$)

Context: $\begin{cases} s = (s_1, \ldots, s_n) \\ s' = (s_{1'}, \ldots, s'_{kN}) \\ S' = \left(S'^{(1)}, \ldots, S'^{(k)}\right) \text{ such that } S'^{(i)} = \\ \sum_{j=0}^{N-1} s'_{(i-1) \cdot N + j + 1} X^j \\ m^*: \text{see below} \end{cases}$ Input: $\begin{cases} ct_{in} = LWE_s(m \cdot \Delta_{in}) = (a_1, \ldots, a_n, a_{n+1} = b) \\ BSK = \left\{ BSK_i = GGSW_{S'}^{(\mathcal{B},\ell)}(s_i) \right\}_{1 \le i \le n} \\ \Delta_{out}: \text{the output scaling factor} \\ (\aleph, \vartheta): \text{define along with } N \text{ the window size} \end{cases}$ Output: $CT_{out} = GLWE_S(\Delta_{out} \cdot X^{-m^*})$
// modulus switching for $1 \le i \le n+1$ do $a_i \leftarrow \left[ \left[ \dfrac{a_i \cdot 2N \cdot 2^{\aleph - \vartheta}}{q} \right] \cdot 2^{\vartheta} \right]_{2N}$ // blind rotate of the LUT
$CT_{out} \leftarrow$ BlindRotate($0, \ldots, 0, \Delta_{out}$), $\{a_i\}_{1 \le i \le n+1}$, BSK)

---

The output of this algorithm may be characterized as follows. Let m be a message, $\Delta$ its scaling factor, $\varkappa$ and $\vartheta$ the parameters of the modulus switching 302. Consider the LWE ciphertext: $LWE_s(m \cdot \Delta_{in}) = (a_1, \ldots, a_n, a_{n+1} = b)$. Define $\forall i \in [1, n+1]$:

$$a_i' \leftarrow \left[ \left[ \frac{a_i \cdot 2N \cdot 2^{\varkappa - \vartheta}}{q} \right] \cdot 2^{\vartheta} \right]_{2N},$$

then in the definition of $$CT_{out}, m^* = \left[ a'_{n+1} - \sum_{i=1}^{n} a'_i s_i \right]_{2N}.$$

Figure 3B:
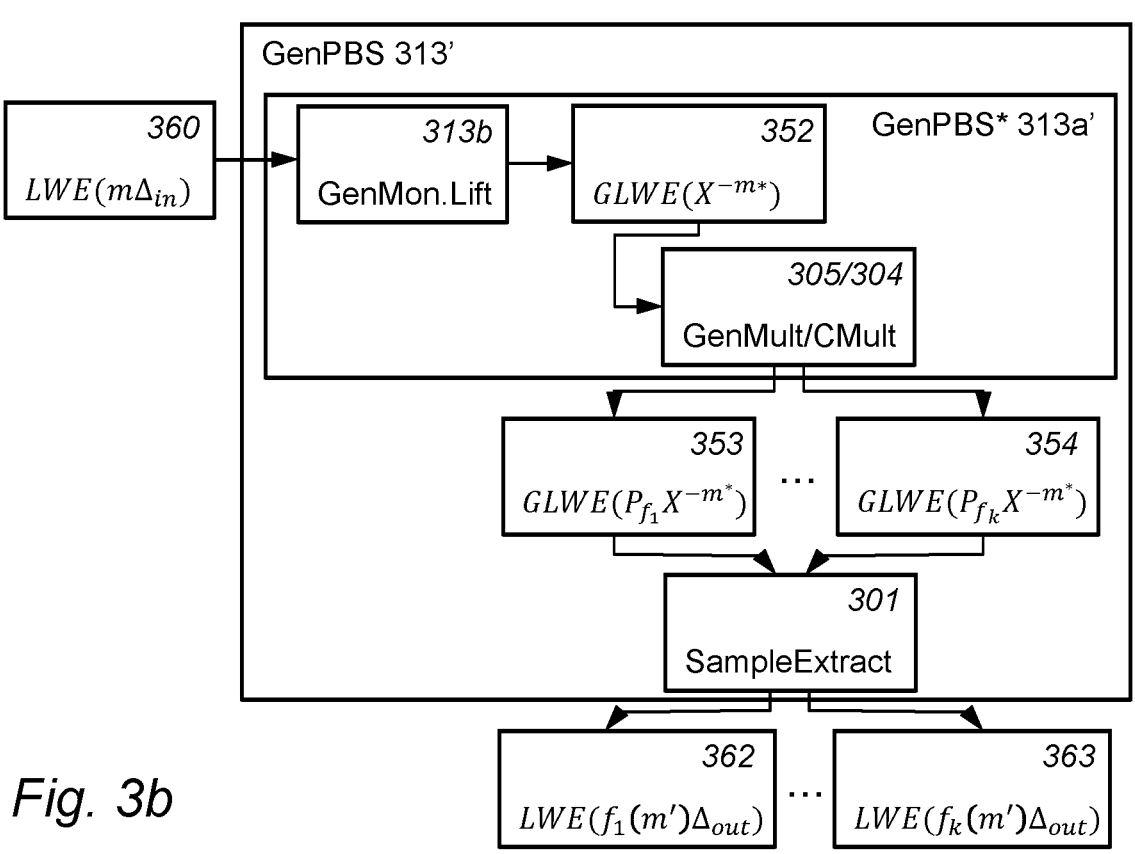
FIG. 3b schematically shows an example of an embodiment of a method "GenPBS" of applying a programmable bootstrapping operation.

FIG. 3b (showing GenPBS unit 313' and GenPBS* unit 313a') schematically shows an example of an embodiment of a method of applying a programmable bootstrapping operation using a GenPBS unit 313'. This example is based on that of FIG. 3a, and the various options described with respect to that figure as well.

In the example of this figure, one or more programmable bootstrappings may be applied to the same LWE-encrypted input message 360. First, a GenMonomialLift operation 313b, as discussed with respect to FIG. 3a, may be applied to the input message, resulting in a GLWE-encrypted monomial 352 as discussed with respect to FIG. 3a. Due to the use of GenMonomialLift, the operations in this figure benefit from the configurability of the programmable bootstrapping by parameter $\varkappa$ and/or $\vartheta$ as discussed with respect to FIG. 3a.

In order to apply one or more respective functions to the LWE-encrypted input value, the GLWE-encrypted monomial 352 may be multiplied by one or more respective test polynomials for the respective functions, thus obtaining one or more GLWE-encrypted polynomials 353, 354 that have the function outputs as fixed coefficients as described with respect to FIG. 3a. One or more of the test polynomials may be encrypted, in which case a multiplication of GLWE-encrypted operations may be performed, e.g., using Gen-Mult unit 205 as discussed with respect to FIG. 2a, or using other techniques as known per se. Instead or in addition, one or more of the test polynomials may be plain, in which case a multiplication CMult 304 of the GLWE-encrypted monomial 352 by a plain polynomial may be performed using techniques that are known per se.

The resulting GLWE-encrypted polynomials 353-354 may represent the output of one or more programmable bootstrappings without key switching GenPBS*, 313a', e.g., corresponding to GenPBS* unit 313a of FIG. 3a. It is also possible to apply a sample extraction 301 to some or all of the GLWE-encrypted polynomials 353-354 to obtain respective LWE-encrypted function outputs 362-363, as also discussed with respect to FIG. 3a. Thus, the LWE-encrypted function outputs 362-363 may represent the output of one or more programmable bootstrappings GenPBS 313' without key switching, e.g., corresponding to GenPBS unit 313 of FIG. 3a. Especially when used to apply multiple functions, the technique of FIG. 3b may be more efficient than that of FIG. 3a.

Instead of using a GenMonomialLift 313b, it is also possible to use a GenPBS* unit 313a with a function $$P_f^{(0)}$$

such that each function $$P_{f_i} = P_f^{(0)} \cdot P_{f_i}^{(1)}.$$

This technique is known per se for programmable bootstrapping that is not parameterizable by parameters $(\varkappa, \vartheta)$ from S. Carpov et al., "New techniques for multi-value input homomorphic evaluation and applications", Proceedings CT-RSA 2019. The polynomial multiplication 304-305 may then be used to multiply the output of the GenPBS* unit by the respective polynomials $$P_{f_i}^{(1)},$$

received as an encrypted or plain input. In some cases, it is possible to define polynomials $$P_{f_i}^{(1)}$$

with coefficients smaller than those of $P_{f_i}$, in which case this alternative can result in an efficiency improvement.

Figures 4A, 4B:
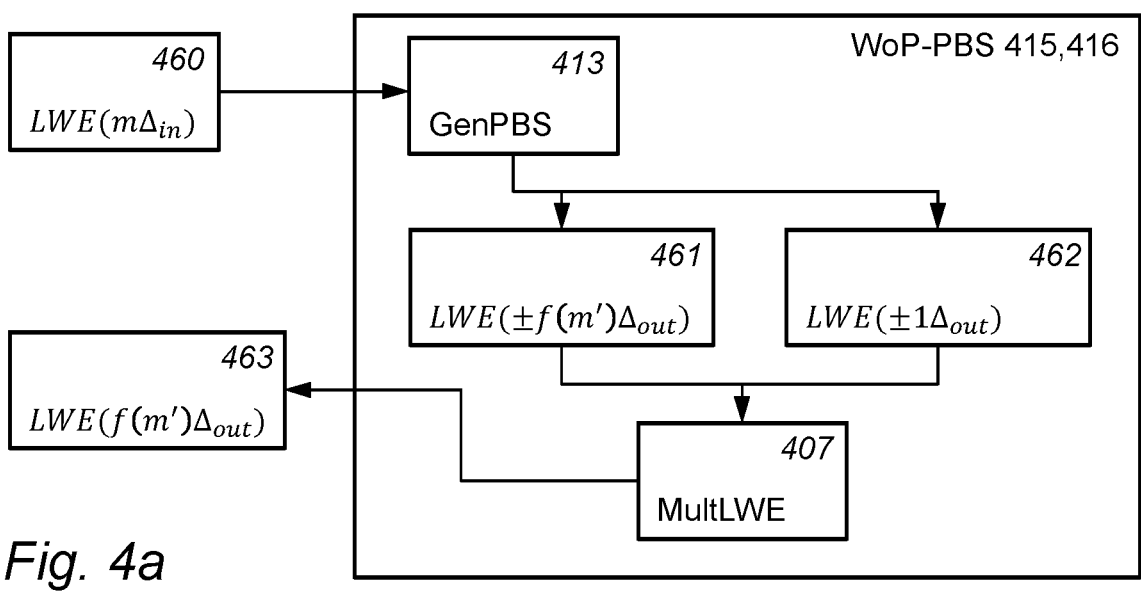
FIG. 4a schematically shows an example of an embodiment of a method "WoP-PBS" of applying a function to an LWE-encrypted input value.
FIG. 4b schematically shows an example of an embodiment of a method "WoP-PBS" of applying a function to an LWE-encrypted input value.

FIG. 4a (showing WoP-PBS units 415, 416) schematically shows an example of an embodiment of a method of applying a function to an LWE-encrypted input value using WoP-PBS unit 415 or 416.

As shown in the figure, a programmable bootstrapping GenPBS 413 may be applied to an LWE-encrypted input value 460, e.g., GenPBS 313 of FIG. 3a or GenPBS 313' of FIG. 3b, to obtain an LWE-encrypted function output 461.

A disadvantage of the programmable bootstrapping known in the art, e.g., GenPBS 313 in the special case $(\varkappa, \vartheta) = (0,0)$, is that it only works if the most significant bit is known, e.g., known to be zero. The function effectively ignores the most significant bit), and its sign may be incorrect. This is why, in the prior art, it needs to be assumed that inputs to the programmable bootstrapping have a bit of padding as most significant bit. Also for the generalized version GenPBS 413, its output 461 may be guaranteed to be correct only up to sign.

Interestingly, the inventors realized that, when applied several times on the same LWE-encrypted input value with the same scaling, the programmable bootstrapping 413 may consistently make the same error in its sign. That is, its outputs may all have the correct sign, or they may all have the wrong sign. This is because the blind rotation per se may be independent of the underlying encoded function.

Thus, the inventors envisaged to apply the programmable bootstrapping 413 several times. The function itself may be applied obtain LWE-encrypted function output 461 correct up to a sign, and a constant function may be applied to obtain an LWE-encrypted constant output 462 correct up to the sign. To obtain the correct scaling, GenPBS 413 may be called with parameter $\varkappa = -1$, such that the LWE-encrypted input value 460 is effectively scaled to the size N of the lookup table. More generally, given a number of most significant bits $\varkappa$ of the LWE-encrypted input value 460 to be discarded, GenPBS 413 may be called with parameter $\varkappa - 1$. The constant output may be equal to one, up to a scaling factor $\Delta_{out}$. For example:

$$\begin{cases} ct_f \leftarrow GenPBS(ct_{in}, BSK, P_f, \Delta_{out}, \varkappa - 1, \vartheta) \\ ct_{Sign} \leftarrow GenPBS(ct_{in}, BSK, P_1, \Delta_{out}, \varkappa - 1, \vartheta) \end{cases}.$$

Figure 6:
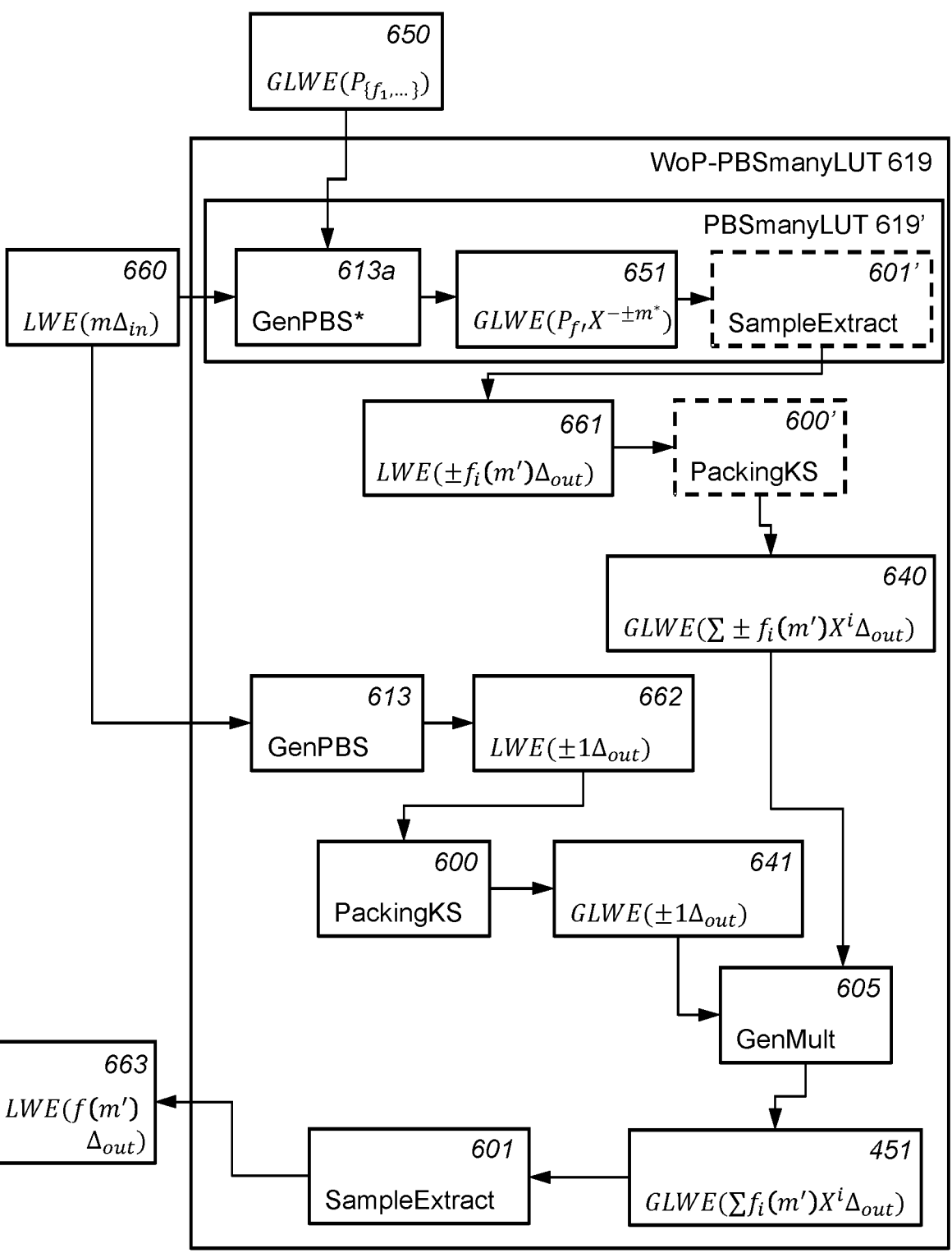
FIG. 6 schematically shows an example of an embodiment of a method "WoP-PBSmanyLUT" of applying multiple functions to an LWE-encrypted input value.

It is also possible to use PBSmanyLUT 619' of FIG. 6 to improve efficiency. In any case because the sign error in the LWE-encrypted constant output 462 is consistent with the sign error in the LWE-encrypted function output 461, the LWE-encrypted function output 461 may be corrected according to the LWE-encrypted constant output 462.

As shown in this example, the correction may be performed by first computing the LWE-encrypted function output 461 and then multiplying it by the LWE-encrypted constant 462 by using a MultLWE unit 462, thus resulting in LWE-encrypted corrected function output 463. For example, any suitable MultLWE unit 207-212 may be used, or more generally, any technique for multiplying LWE-encrypted values that does not require padding. It may be observed that:

$$\text{Decrypt}(ct_f) = f(m) \Leftrightarrow \text{Decrypt}(ct_{Sign}) = 1$$

and $$\text{Decrypt}(ct_f) = -f(m) \Leftrightarrow \text{Decrypt}(ct_{Sign}) = -1$$

Therefore, by applying MultLWE 407 to these two ciphertexts 461, 462, it may be observed that both cases a correct function output 463 is obtained. Namely, letting $ct_{out} \leftarrow \text{Mul-tLWE}(ct_f, ct_{Sign}, RLK)$, then:

$$\text{Decrypt}(ct_{out}) = \begin{cases} 1 \cdot f(m) \\ (-1) \cdot (-f(m)) \end{cases} = f(m).$$

For example, a WoP-PBS unit 415 using GenPBS 313 of FIG. 3a may be implemented as follows:

Algorithm (WoP-PBS 415).
$ct_{out} \leftarrow \text{WoP-PBS}_1(ct_{in}, BSK, RLK, KSK, P_f, \Delta_{out}, \varkappa, \vartheta)$ Context:
$$\begin{cases} s = (s_1, \ldots, s_n) \\ s' = (s_{1'}, \ldots, s'_{kN}) \\ S' = (S'^{(1)}, \ldots, S'^{(k)}) \text{ such that } S'^{(i)} = \\ \sum_{j=0}^{N-1} s'_{(i-1) \cdot N + j + 1} X^j \\ f: \mathbb{Z} \to \mathbb{Z} \\ P_1: \text{ a redundant } LUT \text{ for } x \mapsto 1 \\ (\beta, m'): \text{ as defined for } GenPBS \end{cases}$$

Input:
$$\begin{cases} ct_{in} = LWE_s(m \cdot \Delta_{in}) = (a_1, \ldots a_n, a_{n+1} = b) \\ BSK = \{BSK_i = GGSW_{S'}^{(\mathcal{B}, \ell)}(s_i)\}_{1 \le i \le n} \\ RLK = \{RLK_h^{(i,j)}\}_{i,j,h} = \{GLWE_S(S^{(i)} \cdot S^{(j)} \frac{q}{\mathcal{B}^h})\}_{i,j,h} = \\ \{(A_{RLK_h^{(i,j)}}, B_{RLK_h^{(i,j)}})\}_{i,j,h} \\ KSK: \text{ as needed for } MultLWE \\ P_f: \text{ a redundant } LUT \text{ for } x \mapsto f(x) \\ \Delta_{out}: \text{ the output scaling factor} \\ (\aleph, \vartheta): \text{ define along with } N \text{ the window size} \end{cases}$$

Output: $ct_{out} \leftarrow = LWE_s(f(m') \cdot \Delta_{out})$
// compute two PBS in parallel
$ct_f = LWE_s, ((-1)^\beta \cdot f(m') \cdot \Delta_{out}) \leftarrow GenPBS(ct_{in}, BSK, P_f, \Delta_{out}, \varkappa - 1, \vartheta)$
$ct_{Sign} = LWE_s, ((-1)^\beta \cdot \Delta_{out}) \leftarrow GenPBS(ct_{in}, BSK, P_1, \Delta_{out}, \varkappa - 1, \vartheta)$
// compute the multiplication
$ct_{out} \leftarrow MultLWE(ct_f, ct_{Sign}, RLK, KSK)$ An alternative WoP-PBS unit 416 may be obtained by using GenPBS 313' of FIG. 3b instead. Compared to WoP-PBS unit 415, this alternative may be more computationally efficient since it uses a monomial lift instead of two PBSs. For example:

Algorithm (WoP-PBS 416). $ct_{out} \leftarrow \text{WoP-PBS}_1^{ML}(ct_{in}, BSK, RLK, KSK, \Delta_{out}, P_f, \varkappa, \vartheta)$ Context:
$$\begin{cases} s = (s_1, \ldots, s_n) \\ s' = (s_{1'}, \ldots, s'_{kN}) \\ S' = (S'^{(1)}, \ldots, S'^{(k)}) \text{ such that } S'^{(i)} = \sum_{j=0}^{N-1} s'_{(i-1) \cdot N + j + 1} X^j \\ f: \mathbb{Z} \to \mathbb{Z} \\ P_1: \text{ as defined for } WoP - PBS \text{ 415} \\ (\beta, m'): \text{ as defined for } GenPBS \\ m^*: \text{ as defined for } GenMonomialLift \end{cases}$$

Input:
$$\begin{cases} ct_{in} = LWE_s(m \cdot \Delta_{in}) = (a_1, \ldots a_n, a_{n+1} = b) \\ BSK = \{BSK_i = GGSW_{S'}^{(\mathcal{B}, \ell)}(s_i)\}_{1 \le i \le n} \\ RLK = \{RLK_h^{(i,j)}\}_{i,j,h} = GLWE_{S'}(S'^{(i)} \cdot S'^{(j)} \frac{q}{\mathcal{B}^h}) = \\ (A_{RLK_h^{(i,j)}}, B_{RLK_h^{(i,j)}}) \\ KSK: \text{ as needed for } MultLWE \\ \Delta_{out}: \text{ the output scaling factor} \\ P_f: \text{ a redundant } LUT \text{ for } x \mapsto f(x) \\ (\aleph, \vartheta): \text{ define along with } N \text{ the window size} \end{cases}$$

Output: $ct_{out} = LWE_s(f(m') \cdot \Delta_{out})$
// compute monomial lift using PBS: m* defined as in the context of GenMonomialLift
$CT_{ML} = GLWE(\Delta_{out} X^{-m^*}) \leftarrow GenMonomialLift(ct_{in}, BSK, \Delta_{out}, \varkappa - 1, \vartheta)$
// compute in parallel two polynomial products
$CT_f \leftarrow CT_{ML} \times P_f$
$CT_{Sign} \leftarrow CT_{ML} \times P_1$
// sample extraction
$ct_f = LWE((-1)^\beta \cdot \Delta_{out} \cdot f(m')) \leftarrow SampleExtract_0(CT_f)$ -continued

---

Algorithm (WoP-PBS 416). $ct_{out} \leftarrow$ WoP - $PBS_1^{ML}(ct_{in}, BSK, RLK,$
$KSK, \Delta_{out}, P_f, \varkappa, \vartheta)$

---

$ct_{Sign} = GLWE((-1)^\beta \cdot \Delta out) \leftarrow SampleExtract_0(CT_{Sign})$
// compute the multiplication
$ct_{out} \leftarrow MultLWE(ct_f, ct_{Sign}, RLK, KSK)$

---

This example involves evaluating a monomial lift on the input ciphertext $ct_{in}$. This gives $CT_{in}=GLWE(X^{-\Delta_{in}\mu}*)$ or $CT_{in}=GLWE(-X^{-\Delta_{in}\mu}*)$ since the input may not have a bit of padding. Next, two polynomial products are computed, possibly in parallel. Let $$P_f = \sum_{i=0}^{N-1} f(i)X^i, \text{ and } P_1 = \sum_{i=0}^{N-1} X^i.$$

By applying a SampleExtract on the constant term of the resulting product, the algorithm may compute $$\text{Sample Extract}_0 \ (ct_{in} \times P_f) = LWE(\pm\Delta_{out}f(\mu^*))$$

Similarly, the constant term of the second product $ct_{in} \times P_\Delta$ may be equal to:

$$\text{Sample Extract}_0 \ (ct_{in} \times P_f) = LWE(\pm\Delta_{out}).$$

On both products, the rotation induced by the encrypted monomial may be the same, leading to identical signs. Then, decryption of the output of the operation $$\text{Decrypt} \ (MultLWE(LWE(\pm\Delta_{out} \cdot f(\mu^*)), LWE(\pm\Delta_{out}), RLK))$$

may, as desired, lead to:

$$\Delta_{out} \cdot f(\mu^*).$$

FIG. 4*b* (showing WoP-PBS unit 417) schematically shows an example of an embodiment of a method of applying a function to an LWE-encrypted input value using WoP-PBS unit 417.

This example is based on the same idea as FIG. 4*a*, namely, to correct an LWE-encrypted function output up to the sign that is computed by a programmable bootstrapping by using LWE-encrypted constant output correct up to that same sign. However, in this example, the correction is applied in the GLWE domain prior to the sample extraction of the programmable bootstrapping.

In particular, shown in the figure is an LWE-encrypted input value 460. As shown in the figure, a programmable bootstrapping operation 417 may be applied to the LWE-encrypted input value. As discussed with respect to FIGS. 3a and 3b, the programmable bootstrapping may involve a GenPBS* operation 413a, e.g., using GenPBS* 313a of FIG. 3a or GenPBS* of FIG. 3b, resulting in a GLWE-encrypted polynomial 450 having the function output correct up to the sign as a coefficient.

Interestingly, however, prior to extracting the coefficient from the GLWE-encrypted polynomial 450, this polynomial may first be corrected to ensure that it is correct and not just correct up to the sign. To this end, as in FIG. 4a, the programmable bootstrapping 413 may be used to apply a constant function to the LWE-encrypted input value 460, resulting in an LWE-encrypted constant output 464 correct up to the same sign as the GLWE-encrypted polynomial 450. Although shown as a separate unit 413, the programmable bootstrapping 413 of the constant function may share operations with the programmable bootstrapping 413a of the function to be applied, e.g., programmable bootstrapping 413 may be implemented as GenPBS 313' of FIG. 3b with programmable bootstrapping 413 being implemented as GenPBS* 313', with both using the result 352 of the Gen-MonomialLift operation 313b.

In order to perform the correction in the GLWE domain, the LWE-encrypted constant output 464 correct up to the sign may be converted, in a packing key switching operation 400, to a GLWE-encrypted constant polynomial 440 correct up to the sign. The GLWE-encrypted monomial of the programmable bootstrapping of the function 450 may then be multiplied, using a GenMult operation 405, by the GLWE-encrypted constant polynomial 440 correct up to the sign. Thus, a GLWE-encrypted monomial of the programmable bootstrapping 451 may be obtained that is correct no longer only up to the sign. The GenMult operation 205 of FIG. 2a may be used, but it is also possible to use any other technique for multiply GLWE-encrypted polynomials.

At the point of applying the GenMult operation 405, the GLWE-encrypted monomial 450 may already have been multiplied by the test polynomial for the function to be applied, e.g., as a result of applying the GenPBS* operation 413a, but this is not needed. For example, the GenMult operation 405 may also be applied to the result of applying a GenMonomialLift operation 413b to the LWE-encrypted ciphertext 460, with the outcome of the GenMult operation 405 then being multiplied by the test polynomial. It is also possible to multiply the GLWE-encrypted constant polynomial 440 correct up to the sign by the test polynomial for the function prior to multiplying the GLWE-encrypted monomial by this GLWE-encrypted constant polynomial.

In any case, as a result of applying the correction, a product 451 of the monomial correct up to the sign, the test polynomial, and the constant polynomial correct up to the sign may be obtained. Similarly to FIGS. 3a and 3b, a fixed coefficient of that polynomial 451 may correspond to the desired function output. In this case however, the coefficient is correct, not just correct up to the sign. Similarly to FIGS. 3a and 3b, the LWE-encrypted corrected function output 463' may then be obtained from this polynomial 451 by performing a SampleExtract operation 401 to extract the fixed coefficient.

As also discussed for FIGS. 3a and 3b, in some cases it is not needed to perform sample extraction 401 as part of applying the PBS, e.g., the sample extraction may be performed at a later stage of the computation. This operation without the sample extraction is shown as WoP-PBS* 417a in the figure. It is also possible to define an operation that uses GenMonomialLift 413b and that neither includes the subsequent multiplication by a test polynomial, nor the subsequent sample extraction. This operation corresponds to a monomial lift operation whose result is correct, not just up to padding. This operation is shown in the figure as WoP-ML operation 417b.

For example, WoP-ML operation 417b may be implemented as follows:

---

Algorithm (WoP-ML 417b). $CT_{out} \leftarrow$ WoP - ML($ct_{in}$, BSK, KSK, RLK, $\Delta_{out}$, $\varkappa$, $\vartheta$)

Context:
$$\begin{cases} s = (s_1, \ldots, s_n) \\ s' = (s_{1'}, \ldots, s'_{kN}) \\ S' = (S'^{(1)}, \ldots, S'^{(k)}) \text{ such that } S'^{(i)} = \sum_{j=0}^{N-1} s'_{(i-1)N+j+1} X^j \\ f: \mathbb{Z} \to \mathbb{Z} \\ P_1 \text{: as defined for } WoP - PBS_1 \\ m^* \text{: as discussed w.r.t. FIG. } 3a \end{cases}$$

Input:
$$\begin{cases} ct_{in} = LWE_s(m \cdot \Delta_{in}) = (a_1, \ldots, a_n, a_{n+1} = b) \\ BSK = \{BSK_i = GGSW_{S'}^{(B,\ell)}(s_i)\}_{1 \le i \le n} \\ KSK \text{: as needed for } PackingKS \\ RLK \text{: as needed for } GenMult \\ \Delta_{out} \text{: the output scaling factor} \\ (\aleph, \vartheta) \text{: define along with } N \text{ the window size} \end{cases}$$

Output: $CT_{out} = GLWE_s(X^{-m^* mod N} \cdot \Delta_{out})$
// compute the monomial lift
$CT_{ML} \leftarrow$ GenMonomialLift($ct_{in}$, BSK, $\Delta_{out}$, $\varkappa - 1$, $\vartheta$)
// compute the sign
$ct_{Sign} = LWE_s((-1)^\beta \cdot \Delta_{out}) \leftarrow$ GenPBS($ct_{in}$, BSK, $P_1$, $\Delta_{out}$, $\varkappa - 1$, $\vartheta$)
// keyswitch the sign
$CT_{Sign} \leftarrow$ PackingKS($\{ct_{Sign}\}$, $\{0\}$, KSK)
// compute the multiplication
$CT_{out} \leftarrow$ GenMult($CT_{ML}$, $CT_{Sign}$, RLK)

---

As discussed, in the above algorithm, the GenPBS 413 for $ct_{Sign}$ may overlap with the GenPBS* 413a/GenMonomial-Lift 413b, e.g., the computation of $ct_{Sign}$ may be performed as $ct_{Sign} \leftarrow CT_{ML} \times P_1$. This may improve efficiency at the expense of resulting in higher noise.

FIG. 5a (showing WoP-PBS unit 518) schematically shows an example of an embodiment of a method of applying a first function $f_0(x)$ and a second function $f_1(x)$ to an LWE-encrypted input value 560 using WoP-PBS unit 518. Interestingly, this allows to evaluate an overall function $f(x)$ on the input value 560 more efficiently.

Figure 5B:
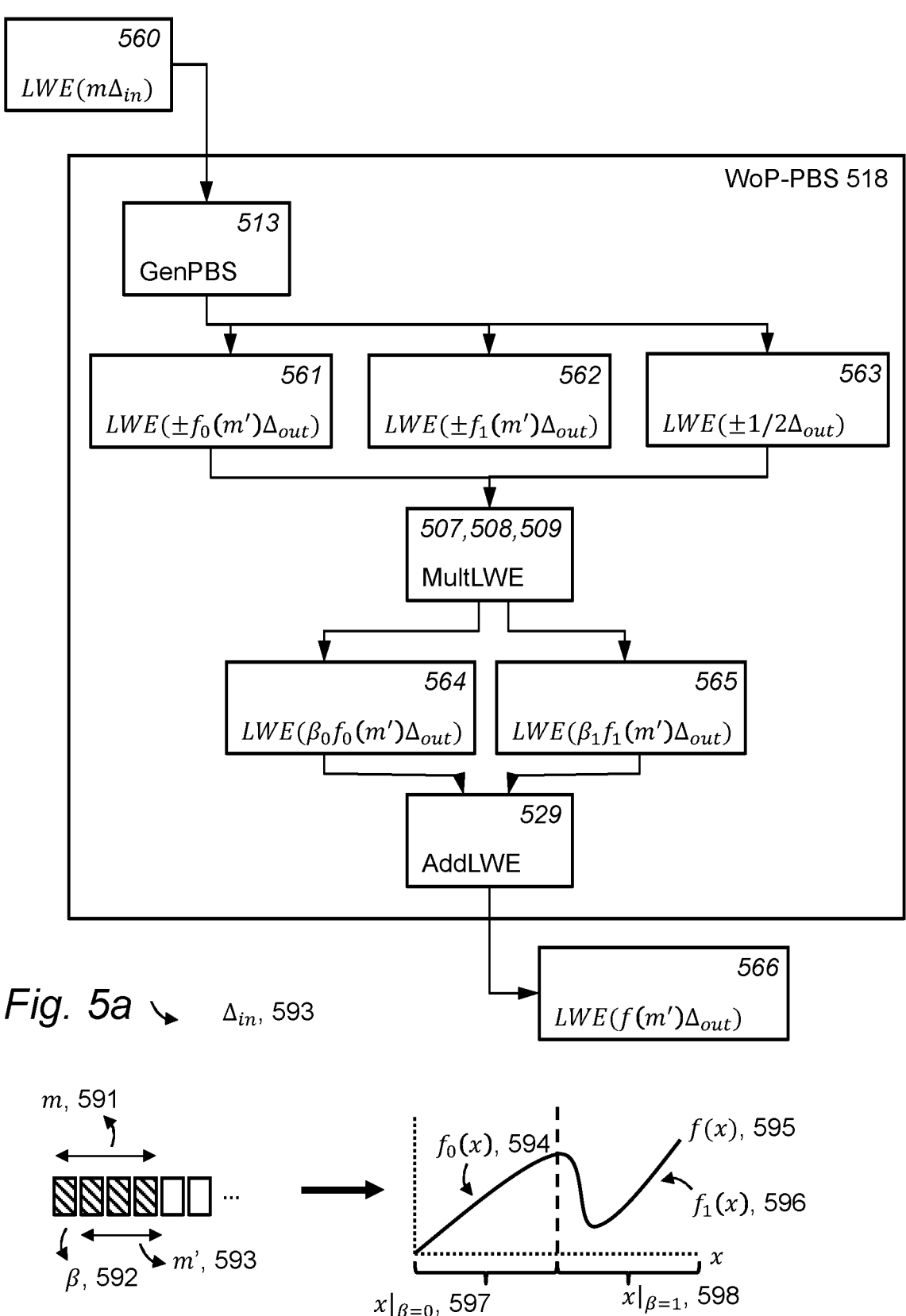
FIG. 5b schematically shows an overall function being divided into a function and a further function depending on a most significant bit.

This is illustrated at a high level in FIG. 5b. Shown is a message m, 591, written as $\beta \| m'$ with $\beta$, 592, the most significant bit and m', 593, the rest of the message. To compute overall function $f(x)$, 595, the function may be broken into the first and second functions $f_0$, 594 and $f_1$, 595. The first one may provide the right result if $\beta$, 592 is equal to 0 and the second one if $\beta=1$. Thus, function $f(x)$ may be computed by computing the first and second functions using a programmable bootstrapping, and choosing $f_0(x)$ if x lies in the domain 597 satisfying $\beta=0$ and choosing $f_1(x)$ if x lies in the domain 598 satisfying $\beta=1$. The encryption of the bit $\beta$ may be obtained by computing a programmable bootstrapping using a constant function.

Interestingly, by splitting up the computation of the overall function into computations of the first and second functions, efficiency can be improved. This is because the first and second functions are defined on domains 597, 598 that are half the size of the overall function. The computation of the sign $\beta$ can be done on the same domain. Applying a PBS on a domain that is half the size typically makes it much more efficient to apply the PBS. For example, a known PBS may have a computational complexity of:

$$\mathbb{C}_{PBS}(n, N, k, \ell) = n[(\ell+1)(k+1)(N \log_2(N)) + N\ell(k+1)^2]$$

In this example, it can be seen that doing a PBS with half the polynomial size N yields a speed up strictly bigger than 2, namely, the complexity is proportional to $N \log_2(N)$ with N the polynomial size. Compared to the techniques of FIG. 4a-4b, instead of two PBSes (for the overall function and for the sign), three PBSes may be performed with half the polynomial size, potentially improving efficiency. Another advantage is that the three PBSes can be computed in parallel. Since a single PBS may not parallelize well, this provides a particular improvement when executed on a multithreaded machine. Put in another way, one can bootstrap one more bit of message with the parameters of the classical PBS.

This idea is illustrated in FIG. 5a. As shown in the figure, a programmable bootstrapping operation GenPBS 513 may be applied to the LWE-encrypted input value 560 to apply the first function, the second function and a constant function to the LWE-encrypted input value 560. For example, GenPBS 313 of FIG. 3a, GenPBS 313' of FIG. 3b, or PBSmanyLUT 619' of FIG. 6 may be used. The modulus switching may be performed in such a way that the programmable bootstrapping results in an LWE-encrypted first function output 561, an LWE-encrypted second function output 562, and an LWE-encrypted constant output 563, all correct up to the same sign.

Compared to FIGS. 4a and 4b, because the first and second functions may not need the most significant bit, the scaling may be performed in such a way that one more bit of the LWE-encrypted input message 560 is ignored. For example, in situations where WoP-PBS 415-417 scale the input message to the domain [0,N], WoP-PBS 518, may scale the input message to the domain [0,2N]. In that sense, the present WoP-PBS may be regarded as providing a higher precision. More generally, given a number of $\chi \ge 0$ most significant bits of the input message to be ignored, GenPBS may be called with this same value $\chi$. The computation of the LWE-encrypted constant output 563 may be performed using the same scaling to provide a result correct up to the same sign.

The LWE-encrypted constant output 563 correct up to the sign may now be used to select and correct either the LWE-encrypted first function output 561 correct up to the sign or the LWE-encrypted second function output 562 correct up to the sign. In this example, this is done by computing the LWE-encrypted first and second function outputs 561, 562, and applying the correction in the LWE-encrypted domain, analogously to FIG. 4a. However, it is also possible to apply the correction in the GLWE-encrypted domain, analogously to FIG. 4b.

Specifically, in this figure, the selecting and correcting is performed by using a MultLWE operation 507-509 to compute an LWE-encrypted product 564 of the LWE-encrypted first function output 561 and the LWE-encrypted constant output 563, wherein the LWE-encrypted constant output 563 is translated to form a selection bit for the first function output, thereby obtaining an LWE-encrypted conditionally selected first function output 564. Similarly, the MultLWE operation 507-509 may be used to compute an LWE-encrypted product 565 of the LWE-encrypted second function output 562 and the LWE-encrypted constant output 563, wherein the LWE-encrypted constant output 563 is translated to form a selection bit for the second function output, thereby obtaining an LWE-encrypted conditionally selected second function output 565. The LWE-encrypted conditionally selected outputs 564, 565 may be added in an AddLWE operation 529 to obtain the LWE-encrypted overall function output 566. The MultLWE operation can be MultLWE operation 207, 208, or 209 of FIG. 2c, for example, but it is also possible to use any other technique for LWE-encrypted multiplication that does not need padding.

For example, the LWE-encrypted constant output may correspond to $s=\pm\frac{1}{2}\cdot\Delta_{out}$ with respect to the output scaling factor $\Delta_{out}$. The selection bit for the first function output may be obtained by computing $\beta_0=s+\frac{1}{2}\cdot\Delta_{out}$ and the selection bit for the second function output may be obtained by computing $\beta_1=s-\frac{1}{2}\cdot\Delta_{out}$.

For example, suppose that the LWE-encrypted input message 560 does not have its most significant bit set. In this case, the LWE-encrypted first function output 561 may correspond to the output of the overall function, with a sign that is also correct. The LWE-encrypted constant output 563 may also be correct with a correct sign: $s=\frac{1}{2}\cdot\Delta_{out}$. The selection bits may be $\beta_0=1$ and $\beta_1=0$ so that the LWE-encrypted overall function output 566 corresponds to the correct output of the function.

Now suppose that the LWE-encrypted input message 560 does have its most significant bit set. In this case, the LWE-encrypted second function output 562 may correspond to the output of the overall function, with the sign being incorrect. The LWE-encrypted constant output 563 may also have an incorrect sign: $s=-\frac{1}{2}\cdot\Delta_{out}$. The selection bits may be $\beta_0=0$ and $\beta_1=-1$ so that the LWE-encrypted overall function output 566 again corresponds to the correct output of the function.

For example, WoP-PBS 518 may be implemented as follows:

---

Algorithm (WoP-PBS 518). $ct_{out} \leftarrow$ WoP - $PBS_2$ ($ct_{in}$, BSK, RLK, KSK, $P_f$, $\Delta_{out}$, $\varkappa$, $\vartheta$)

Context:
$$\begin{cases} s = (s_1, \ldots, s_n) \\ s' = (s_{1'}, \ldots, s'_{kN}) \\ S' = \left(S'^{(1)}, \ldots, S'^{(k)}\right) \text{ such that } S'^{(i)} = \sum_{j=0}^{N-1} s'_{(i-1)\cdot N+j+1} X^j \\ f = \begin{cases} f_0(x) \text{ if } x < \dfrac{q}{2\Delta_{in}\cdot 2^{\varkappa}} \\ f_1(x) \text{ otherwise} \end{cases} \\ (\beta, m') \text{: as defined for } GenPBS \\ P_1 \text{: as defined for } WoP - PBS \text{ 415} \end{cases}$$

Input:
$$\begin{cases} ct_{in} = LWE_s(m\cdot\Delta_{in}) = (a_1, \ldots, a_n, a_{n+1} = b) \\ BSK = \left\{BSK_i = GGSW_{S'}^{(\beta,\ell)}(s_i)\right\}_{1\le i\le n} \\ KSK \text{: as needed for } MultLWE \\ RLK \text{: as needed for } MultLWE \\ P_{f_0}, P_{f_1} \leftarrow P_f \\ \Delta_{out} \text{: the output scaling factor} \end{cases}$$

Output: $ct_{out} = LWE_s(f(m') \cdot \Delta_{out})$
// compute in parallel 3 PBSes
$ct_{f_0} = LWE_s((-1)^{\beta} \cdot \Delta_{out} \cdot f_0(m')) \leftarrow \text{GenPBS}(ct_{in}, \text{BSK}, P_{f_0}, \Delta_{out}, \varkappa, \vartheta)$
$ct_{f_1} = LWE_s((-1)^{\beta} \cdot \Delta_{out} \cdot f_1(m')) \leftarrow \text{GenPBS}(ct_{in}, \text{BSK}, P_{f_1}, \Delta_{out}, \varkappa, \vartheta)$ $$ct_{Sign} = LWE_{s'}\left((-1)^{\beta}\cdot\frac{\Delta_{out}}{2}\right) \leftarrow GenPBS\left(ct_{in}, BSK, P_1, \frac{\Delta_{out}}{2}, \varkappa, \vartheta\right)$$

// compute two sums in parallel $$ct_{\beta_0} = LWE_{s'}((1-\beta)\cdot\Delta_{out}) \leftarrow ct_{Sign} + \left(0, \frac{\Delta_{out}}{2}\right)$$

$$ct_{\beta_1} = LWE_{s'}(-\beta\cdot\Delta_{out}) \leftarrow ct_{Sign} - \left(0, \frac{\Delta_{out}}{2}\right)$$

// compute two multiplications in parallel
$ct_{\beta\cdot f_0} \leftarrow \text{MultLWE}(ct_{f_0}, ct_{\beta_0}, \text{RLK}, \text{KSK})$
$ct_{\beta\cdot f_1} \leftarrow \text{MultLWE}(ct_{f_1}, ct_{\beta_1}, \text{RLK}, \text{KSK})$
// add the previous results
$ct_{out} \leftarrow ct_{\beta\cdot f_0} + ct_{\beta\cdot f_1}$

---

Several variations of the above algorithm are possible. For MultLWE, any one of MultLWE units 307, 308, 309 can be used. Using MultLWE unit 309 generally provides better performance than MultLWE units 307, 308. Instead of using a separate MultLWE unit 507-509 and a separate AddLWE unit 529, it is also possible to use a single MultLWE unit to directly compute the sum of the products, e.g., MultLWE unit 211:

$$ct_{out} \leftarrow PackedSumProducts\{ct_{\beta_i}\}_0^1, \{ct_{f_i}\}_0^1, RLK, KSK).$$

This may provide even better performance.

It is also possible to add the conditionally selected function outputs prior to relinearizing them to LWE ciphertexts by performing lazy relinearization. This can both improve performance reduce noise, e.g.:

---

$CT_{\beta\cdot f_0} \leftarrow \text{MultLWE}^*(ct_{f_0}, ct_{\beta_0}, \text{RLK}, \text{KSK})$
$CT_{\beta\cdot f_1} \leftarrow \text{MultLWE}^*(ct_{f_1}, ct_{\beta_1}, \text{RLK}, \text{KSK})$
// add the previous results
$CT_{out} \leftarrow ct_{\beta\cdot f_0} + ct_{\beta\cdot f_1}$
// do the relinearization later

---

As also discussed above, the GenPBS operation 513 can be implemented in various ways. In particular, one possibility is to use a GenPBS* unit 313a with a function $$P_f^{(0)}$$

such that each function $$P_{f_i} = P_f^{(0)} \cdot P_{f_i}^{(1)},$$

as also discussed with respect to FIG. 3b. Another possibility is to use a GenMonomialLift 313b and respective polynomial multiplications 304 or 305, as also discussed with respect to FIG. 3b, e.g.:

---

$CT_{ML} \leftarrow \text{GenMonomialLift}(ct_{in}, \text{BSK}, \Delta_{out}, \varkappa, \vartheta)$
$ct_{f_0} \leftarrow \text{SampleExtract}_0(CT_{ML} \times P_{f_0})$
$ct_{f_1} \leftarrow \text{SampleExtract}_0(CT_{ML} \times P_{f_1})$
$ct_{sign} \leftarrow \text{SampleExtract}_0(CT_{ML} \times P_1)$

---

These two possibilities are particularly advantageous in a mono-threaded computation, as only a single PBS needs be computed, or an operation of the same cost, e.g., the monomial lift. The output noise may be larger, however. The second possibility using the monomial lift generally provides higher noise, so the possibility using GenPBS* is generally preferred. In the multithreaded setting, it may be preferred to use GenPBS 313 because of its smaller noise.

FIG. 6 (showing WoP-PBSmanyLUT unit 619) schematically shows an example of an embodiment of a method of applying multiple functions to an LWE-encrypted input value using WoP-PBSmanyLUT unit 619.

Shown is an LWE-encrypted input value 660. The inventors realized that, by performing the programmable bootstrapping using the generalized modulus switching as discussed with respect to FIG. 3a-3b, it becomes possible to apply multiple respective functions to the LWE-encrypted input value 660 efficiently.

To this end, in the programmable bootstrapping, a test polynomial 650 may be used that represents function outputs of the multiple respective functions, say, $2^\vartheta$ functions. In particular, the test polynomial $f(x)$ may be defined by coefficient-wise interleaving of the test polynomials $f_1(x)$, $f_2(x)$, . . . for the respective functions. E.g., the first $2^\vartheta$ coefficients may represent respective constant coefficients of the $f_i$, the next $2^\vartheta$ coefficients may represent respective degree-one coefficients of the $f_i$, etc.

The figure shows a GenPBS* operation 613*a* in which the test polynomial is used. For example, the GenPBS* operation may be GenPBS* operation 313*a* of FIG. 3*a* or GenPBS* operation 313*a'* of FIG. 3*b*. Although the figure only shows a single set of multiple respective functions being applied, it is also possible to apply multiple sets of functions analogously to FIG. 3*b*.

The modulus switching of the programmable bootstrapping 613*a* may be performed using the discussed test polynomial in such a way that the $\vartheta$ lowest bits of the scaled LWE-encrypted ciphertext are set to zero. The blind rotation may then result in a GLWE-encrypted polynomial 651 of which the constant coefficient (or another fixed coefficient) corresponds to the output of the first function, and the following coefficients correspond to the outputs of the other functions. Setting the $\vartheta$ lowest bits to zero may ensure that the $2^\vartheta$ coefficients starting at the fixed coefficient are the function outputs of the respective functions applied to the same input.

The respective coefficients of the GLWE-encrypted polynomial 651 may be extracted in a sample extraction operation 601' to obtain LWE-encrypted outputs 661 of the respective functions. The figure shows a PBSmanyLUT 619' unit providing this combination of GenPBS* 613*a* and SampleExtract 601'.

Interestingly, PBSmanyLUT 619' enables to evaluate multiple functions efficiently in one blind rotation by using the freedom of GenPBS* 613 to use a variable window size. Conceptually, the idea is to define a smaller window for the plaintexts, by trimming the bound in the LSB. The $\vartheta$ parameter of the GenPBS may represent a number of bits that is withdrawn compared to the known TFHE PBS, $\vartheta=0$. After the modulus switching, $\vartheta$ LSB may be set to 0, e.g., a plaintext of the $m^*=m \cdot \Delta + e \cdot 2^\vartheta$ may be obtained. The form of the LUT polynomial may be set accordingly to the $\vartheta$ parameter so that it contains up to $2^\vartheta$ functions, e.g.:

$$P_{(f_1,\dots,f_{2^\vartheta})} = X^{\frac{N}{2p}} \sum_{j=0}^{p-1} X^{-j\frac{N}{p}} \sum_{k=0}^{\frac{N}{p2^\vartheta}-1} X^{k \cdot 2^\vartheta} \sum_{i=0}^{2^\vartheta-1} f_{i+1}(j)X^i,$$

$$\text{with } p = \frac{q}{\Delta_{in} \cdot 2^{\varkappa+1}}$$

The lookup table may be redundant, in which case each block of functions, e.g., sequence of $f_i$, $i \in [1, 2^\vartheta]$ coefficients, is effectively repeated along the polynomial. For example, representing the look-up table as an array comprising the coefficients of the polynomial $$P(X) = \sum_{i=0}^{N-1} c_i X^i :$$

$$c_0, c_1, c_2, \dots, c_{N-1},$$

a redundant look-up table may be represented as $$f(0), f(0), f(0), \dots, f(1), f(1), f(1), \dots, \dots$$

A redundant look-up table representing multiple functions may be represented as $$((f_1(0), f_2(0), \dots), (f_1(0), f_2(0), \dots), \dots),$$

$$((f_1(1), f_2(1), \dots), (f_1(1), f_2(1), \dots), \dots), \dots, \dots$$

In this case, after the blind rotation and the extraction of the first coefficient of the resulting polynomial, an encryption of $f_1(m) \cdot \Delta_{out}$ may be obtained. Due to the LUT representing the multiple functions, the next coefficient of the GLWE ciphertext may represent $f_2(m) \cdot \Delta_{out}$. By sample extracting $2^\vartheta$ consecutive coefficients, $2^\vartheta$ output ciphertexts may be obtained, one for each represented function. Interestingly, since the sample extractions are comparatively efficient, the complexity is approximately the same as for a PBS evaluating only one function, and also the size of the key material is the same as for a PBS evaluating one function.

It is not needed to evaluate exactly $2^\vartheta$ functions, e.g., it is possible to set the lowest $\vartheta$ bits of the scaled LWE ciphertext to zero but extract fewer than $2^\vartheta$ coefficients. It is advantageous in terms of efficiency to scale by a power of two, e.g., using a parameter $\vartheta$ representing a number of bits, because it allows to use bitwise operations. This is not needed, however: generally, the LWE ciphertext may be scaled by any factor $\Theta$ instead of $2^\vartheta$ to allow the evaluation of at most $\Theta$ functions using a single blind rotation.

It may be noted that the output 661 of PBSmanyLUT 619' are typically correct only up to a sign, e.g., unless it can be assumed that their most significant bit is zero. Despite this limitation, PBSmanyLUT 619' is still an advantageous application of GenPBS* 613*a* that may be used independently.

For example, PBSmanyLUT unit 619' may be implemented as follows:

---

Algorithm (PBSmanyLUT 619').

$ct_1, \dots, ct_{2^\vartheta} \leftarrow$ PBSmanyLUT($ct_{in}$, BSK, $P_{(f_1,\dots,f_{2^\vartheta})}$, $\Delta_{out}$, $\varkappa$, $\vartheta$)

Context: $\begin{cases} s = (s_1, \dots, s_n) \\ s' = (s_{1'}, \dots, s'_N) \\ S' = (S'^{(1)}, \dots, S'^{(k)}) \text{ such that } S'^{(i)} = \sum_{j=0}^{N-1} s'_{(i-1) \cdot N + j+1} X^j \\ f: \mathbb{Z} \to \mathbb{Z} \\ (\beta, m') : \text{as defined for } GenPBS \end{cases}$ Input: $\begin{cases} ct_{in} = LWE_s(m \cdot \Delta_{in}) = (a_1, \dots, a_n, a_{n+1} = b) \\ BSK = \{BSK_i = GGSW_{S'}^{(B,\ell)}(s_i)\}_{1 \le i \le n} \\ P_{(f_1,\dots f_{2^\vartheta})} : \text{a redundant } LUT \text{ for: } x \mapsto f_1(x) \| \dots \| f_{2^\vartheta}(x) \\ (\aleph, \vartheta) : \text{define along with } N \text{ the window size} \end{cases}$ Output: $ct_1, \dots, ct_{2^\vartheta}$ such that $ct_j = LWE_{s'}((-1)^\beta \cdot f_j(m') \cdot \Delta_{out})$ // modulus switching for $1 \le i \le n+1$ do $a_i \leftarrow \left[\left[\frac{a_i \cdot 2N \cdot 2^{\aleph-\vartheta}}{q}\right] \cdot 2^\vartheta\right]_{2N}$

51

-continued

```
Algorithm (PBSmanyLUT 619').
ct₁, . . . , ct₂θ ← PBSmanyLUT(ctᵢₙ, BSK, P₍f₁,...,f₂θ₎, Δₒᵤₜ, ϰ, ϑ)

// blind rotate of the LUT
CT ← BlindRotate ((0, Δₒᵤₜ · P₍f₁,...,f₂θ₎), {αᵢ}₁≤ᵢ≤ₙ₊₁, BSK)
// sample extract the first 2θ terms (coeffs. from 0 to 2θ − 1)
for 1 ≤ j ≤ 2θ do ctⱼ ← SampleExtractⱼ₋₁(CT)
```

As shown in the figure, a test polynomial 650 representing multiple functions can also be used to implement a WoP-PBSmanyLUT unit 619' that evaluates the multiple functions without the LWE-encrypted input value 660 needing to have a bit of padding.

To this end, a programmable bootstrapping operation 613 may be used to apply a constant function to the LWE-encrypted input value 660, resulting in an LWE-encrypted constant output 662 correct up to the sign. This LWE-encrypted constant output 662 may then be used to correct the programmable bootstrapping of the test polynomial 650 representing the multiple functions. To compute the LWE-encrypted constant output, e.g., GenPBS unit 313 or 313' can be used. Interestingly, the LWE-encrypted constant output can also be one of the LWE-encrypted outputs 661 of PBSmanyLUT 619'.

To apply the correction, any of the techniques discussed with respect to FIGS. 4a, 4b, and 5a can be used.

In particular, analogously to FIG. 4a, the correction may be performed by multiplying the respective LWE-encrypted function outputs 661 by the LWE-encrypted constant output 662, e.g., using a MultLWE unit as discussed with respect to FIG. 2c, or any other technique of multiplying LWE-encrypted values.

As FIG. 6 shows, it is also possible to perform the correction in the GLWE-encrypted domain, analogously to FIG. 4b. To this end, the LWE-encrypted constant output 662 correct up to the sign may be converted to a GLWE-encrypted constant polynomial 641 correct up to the sign, using a packing key switching operation 600. The GLWE-encrypted monomial 651 of the programmable bootstrapping of the function may then be multiplied by the GLWE-encrypted constant polynomial 641 using a GenMult operation for multiplying GLWE-encrypted polynomials, e.g., GenMult 205 of FIG. 2a. As discussed above, the multiplication of the monomial 651, the constant polynomial 641, and the test polynomial 650 can in principle be done in any order. In these examples, SampleExtract 601' and PackingKS 600' are not performed, except that SampleExtract 601' may possibly be used to compute the LWE-encrypted constant output 662. A sample extraction operation 601 may then be used to extract the respective function outputs 663, correct not only up to the sign, similarly to SampleExtract 601'.

In another example, SampleExtract 601' is performed, and the LWE-encrypted function outputs 661 correct up to the sign may be converted to a GLWE-encrypted polynomial 640 having the respective function outputs as coefficients, after which GenMult 605 and SampleExtract 601 may be performed as described above. This alternative can be used in case it is desired to perform the correction with GenMult 605 in the GLWE domain using different GLWE parameters than those use for GenPBS* 613.

In particular, the provided techniques for efficiently evaluating multiple functions on the same LWE-encrypted input value 660 may be used to more efficiently implement a so-called circuit bootstrapping operation. As is known per se, such an operation coverts an LWE-encrypted input value 660 representing a bit to a ciphertext for use in a levelled evaluation, e.g., a GGSW ciphertext. Interestingly, the ability of PBSmanyLUT unit 619' and WoP-PBSmanyLUT unit 619 to compute several functions a single bootstrap, can allows to improve the computational cost of circuit bootstrapping by a factor $\ell$, namely, circuit bootstrapping may apply $\ell$ PBS operations to the same input ciphertext, which may be replaced by a single invocation of PBSmanyLUT 619' or WoP-PBSmanyLUT 619.

For example, a known circuit bootstrapping may use $\ell$ programmable bootstrappings as follows:

for $1 \le v \le \ell$ do $ct_v =$ $$LWE_{s'}\left(m \cdot \frac{q}{\mathcal{B}^v}\right) \leftarrow PBS\left(ct_{in}, BSK, P_v \cdot X^{N'/2}\right) + \left(0, \frac{q}{2\mathcal{B}^v}\right)$$

These programmable bootstrappings may be implemented using PBSmanyLUT unit 619' by computing:

$$\begin{cases} ct_1, \ldots, ct_\ell \leftarrow PBSmanyLUT\left(ct_{in}, BSK, P \cdot X^{N'/2}, 1, \aleph = 0, \rho = \lceil \log_2(\ell) \rceil\right) \\ ct_1 + \left(0, \frac{q}{2\mathcal{B}^1}\right), \ldots, ct_\ell + \left(0, \frac{q}{2\mathcal{B}^\ell}\right) \end{cases}$$

such that P is a redundant LUT $$\left(\underbrace{\frac{q}{2\mathcal{B}^1}, \ldots, \frac{q}{2\mathcal{B}^\ell}, 0, \ldots, 0}_{2^\rho \, elements}, \underbrace{\frac{q}{2\mathcal{B}^1}, \ldots, \frac{q}{2\mathcal{B}^\ell}, 0, \ldots, 0}_{2^\rho \, elements}, \ldots, \underbrace{\frac{q}{2\mathcal{B}^1}, \ldots, \frac{q}{2\mathcal{B}^\ell}, 0, \ldots, 0}_{2^\rho \, elements}\right)$$

$$N' \, elements$$

which represents the polynomial $$P(X) = \sum_{i=0}^{\frac{N}{2^\rho}-1} \sum_{j=0}^{2^\rho-1} \frac{q}{2\mathcal{B}^j} X^{2^\rho \cdot i + j}.$$

FIG. 7a (showing Decomp unit 720) schematically shows an example of an embodiment of a method of extracting least significant parts of an input value using Decomp unit 720.

The figure shows an LWE-encrypted input value 760 from which one or more least significant parts are to be extracted. As shown in the figure, a least significant part 761 may be extracted from the LWE-encrypted input value by applying a, possibly rescaled, identity function to the LWE-encrypted input value 760 using a programmable bootstrapping without padding WoP-PBS 715-718, e.g., a WoP-PBS unit as discussed with respect to FIG. 4a, 4b, or 5a.

Interestingly, in the programmable bootstrapping, the modulus switching may scale the LWE-encrypted input value such that the LWE-encrypted function output 761 encrypts a least significant part of the input value. For example, to extract the least significant 4 bits of a 16-bit value, the most significant 12 bits may be ignored, etcetera. Interestingly, a PBS is needed only of the size of the part to be extracted, not of the overall message size, which can greatly improve efficiency. Also, the input value 760 itself need not have a bit of padding. This is not possible in a PBS that requires a bit of padding since the bit preceding the part to be extracted is not known.

The LWE-encrypted function output 761 may then be subtracted from the LWE-encrypted input value in a Sub-LWE operation 728 to obtain a LWE encryption of the most significant part of the LWE-encrypted input value 760. The above procedure may be repeated to extract respective least significant parts of the LWE-encrypted input value 760, e.g., to obtain a decomposition of the LWE-encrypted input value into respective chunks, e.g., of a certain bit size. For example, $\alpha$ ciphertexts may be obtained each encrypting $m_i \Delta_i$ such that $$m_{in}\Delta_{in} = \sum_{i=0}^{\alpha-1} m_i \Delta_i.$$

For example, Decomp unit 720 may be implemented as follows:

---

Algorithm (Decomp 720). $\mathrm{ct}_{out} \leftarrow \mathrm{Decomp}(\mathrm{ct}_{in}, \mathrm{BSK}, \mathrm{RLK}, \mathrm{KSK}, \mathcal{L})$ Context: $\begin{cases} s = (s_1, \dots, s_n) \\ s' = (s_1', \dots, s_N') \\ S' = \left(S'^{(1)}, \dots, S'^{(k)}\right) \text{ such that } S'^{(i)} = \sum_{j=0}^{N-1} s'_{(i-1)N+j+1} X^j \\ P_{Id}: LUT \text{ for the identity function} \\ \forall\, i \in [1, \alpha-1],\ \Delta_i = \Delta_{in} \cdot 2^{\sum_{j=0}^{i-1} d_j} \\ m_{in}\Delta_{in} = \sum_{i=0}^{\alpha-1} m_i \Delta_i \end{cases}$ Input: $\begin{cases} ct_{in} = LWE_s(m_{in} \cdot \Delta_{in}) \\ BSK = \left\{BSK_i = GGSW_{S'}^{(\mathcal{B},\ell)}(s_i)\right\}_{1 \le i \le n} \\ RLK: \text{ as needed for } WoP-PBS \\ KSK: \text{ as needed for } WoP-PBS \\ \mathcal{L} = \{d_i\}_{i \in [0,\alpha-1]}: \text{ list of sizes (in bits) for the output ciphertexts} \\ \text{s.t. } \Delta_{in} 2^{\sum_{i=0}^{\alpha-1}} \le q \end{cases}$ Output: $\{\mathrm{ct}_{out,i} = LWE_{s'}(m_i \cdot \Delta_i)\}_{i \in [0,\alpha-1]}$
ct $\leftarrow \mathrm{ct}_{in}$
$d_\alpha \leftarrow -1$
for $i \in [0, \alpha-1]$ do
$\quad \varkappa_i \leftarrow \sum_{j=i+1}^{\alpha-1} d_j$
$\quad \mathrm{ct}_{out,i} \leftarrow \mathrm{WoP-PBS}(ct, BSK, RLK, KSK, P_{Id}, \Delta_i, \varkappa_i, 0)$
$\quad \mathrm{ct} \leftarrow \mathrm{ct} - \mathrm{ct}_{out,i}$

---

Optionally, a key switching may be performed in the relinearization that is computed in the GLWE polynomial that is part of the WoP-PBS. This allows to improve efficiency if the chosen LWE dimension is smaller than the original LWE dimension. Instead of computing an identity function using the WoP-PBS 715-718, it is also optionally possible to use another function if desired.

The computation of respective least significant parts using the described techniques is illustrated in FIG. 10b. Here, an input message m, 020, encrypted using error e, is decomposed into $\alpha=4$ four respective least significant parts. In consecutive iterations, least significants $m_0$, 024; $m_1$, 023; $m_2$, 022; and $m_3$, 021 are consecutively extracted and subtracted from the input message 020. The respective extracted least significant parts have respective scaling factors $\delta_i$, 045-042, with the scaling factor 045 of the part extracted first corresponding to that of the input message 020 itself.

FIG. 7b (showing LP-WoP-BS unit 721) schematically shows an example of an embodiment of a method of bootstrapping an LWE-encrypted input value using LP-WoP-BS unit 721.

As illustrated in the figure, given an LWE-encrypted input value 760, the Decomp unit 720 of FIG. 7a may be used to obtain respective extracted LWE-encrypted most significant parts 761-0 to 761-$\alpha$ of the input value. By using an AddLWE unit 729 to add these (suitably scaled) significant parts 761-$i$ together, an LWE-encrypted output value 762 may be obtained representing a bootstrapping of the input value, in other words, a LWE encryption of the same value (possibly up to rescaling) with an amount of noise that is independent of the amount of noise in LWE encryption 760. Thus, generally, noise in an LWE-encrypted input value 760 may be efficiently reduced.

For example, LP-WoP-BS unit 721 may be implemented as follows:

---

Algorithm (LP-WoP-BS 721). $\mathrm{ct}_{out} \leftarrow \mathrm{LP-WoP-BS}(\mathrm{ct}_{in}, \mathrm{BSK}, \mathrm{RLK}, \mathrm{KSK})$ Context: $\begin{cases} P_{Id}: LUT \text{ for the identity function} \\ \mathcal{L} = \{d_i\}_{i \in [0,\alpha-1]} \end{cases}$ Input: $\begin{cases} ct_{in} = LWE_s(m_{in} \cdot \Delta_{in}) \\ BSK = \left\{BSK_i = GGSW_{S'}^{(\mathcal{B},\ell)}(s_i)\right\}_{1 \le i \le n} \\ RLK: \text{ as needed for Decomp} \\ KSK: \text{ as needed for Decomp} \end{cases}$ Output: $\{\mathrm{ct}_{out} = LWE_s(m \cdot \Delta_{in})$
$\{\mathrm{ct}_i\}_{i \in [0,\alpha-1]} \leftarrow \mathrm{Decomp}(\mathrm{ct}_{in}, \mathrm{BSK}, \mathrm{RLK}, \mathrm{KSK}, \mathcal{L}, \Delta_{out})$
$\mathrm{ct}_{out} \leftarrow \sum_{i=0}^{\alpha-1} \mathrm{ct}_i$

---

FIG. 7c (showing LP-WoP-PBS unit 722) schematically shows an example of an embodiment of a method of applying an overall function to an LWE-encrypted input value using LP-WoP-PBS unit 722.

As illustrated in the figure, given an LWE-encrypted input value 760, the Decomp unit 720 of FIG. 7a may be used to obtain respective extracted LWE-encrypted most significant parts 761-0 to 761-$\alpha$ of the input value.

Given the LWE-encrypted most significant parts 761-$i$, a DecompF unit 727 may be used to apply an overall function to the LWE-encrypted input value 770 by applying respective programmable bootstrapping operations to the respective extracted LWE-encrypted most significant parts 761-$i$.

For various types of functions, it is known per se that their evaluation can be made more efficient by applying them on LWE-encrypted chunks 761-$i$ instead of to the LWE-encrypted overall input value 760. In particular, the techniques provided in A. Guimarães et al., "Revisiting the functional bootstrap in TFHE", IACR Trans. Cryptogr. Hardw. Embed. Syst., 2021(2):229-253, 2021 (incorporated herein by reference) may be applied. This reference provides two algorithms to compute programmable bootstrappings based on decompositions, whose signatures may be denoted as:

$$\mathrm{ct}_{out} \leftarrow \mathrm{Tree-PBS}(\{ct_{in,j}\}_j, BSK, KSK, \{P_i\}_{i \in [1,L]})$$

$$\mathrm{ct}_{out} \leftarrow \mathrm{ChainPBS}(\{ct_{in,j}\}_j, BSK, KSK, \{P_i\}_{i \in [1,L]})$$

where $\{P_i\}_{i \in [1,L]}$ are respective lookup tables encoding a function F and BSK, KSK are respective required key material. $ct_{in,j}$ are LWE-encrypted chunks 761-$i$ encrypting $m_j$ with $m = \Sigma_j m_j B^j$ and $ct_{out}$ is the LWE-encrypted function output 763.

For example, LP-WoP-PBS unit 722 may be implemented as:

---

Algorithm (LP-WoP-PBS 722). $ct_{out} \leftarrow$ LP - WoP - PBS($ct_{in}$, BSK, RLK, $P_f$, $\Delta_{out}$)

---

Context: (f: $\mathbb{Z} \to \mathbb{Z}$

Input: $\begin{cases} ct_{in} = LWE_s(m_{in} \cdot \Delta_{in}) \\ BSK = \{BSK_i = GGSW_{S'}^{(B,\ell)}(s_i)\}_{1 \le i \le n} \\ P_f: r - \text{redundant LUT } for\ x \mapsto f(x) \\ KSK: \text{as needed for Tree} - PBS \\ RLK: \text{as needed for Decomp} \end{cases}$ Output: $ct_{out} = LWE_s(f(m_{in}) \cdot \Delta_{out})$ $\{ct_i\}_{i \in [0,\alpha-1]} \leftarrow$ Decomp($ct_{in}$, BSK, RLK, $\mathcal{L}$)
$ct_{out} \leftarrow$ Tree - PBS($\{ct_{in,j}\}_j$, BSK, KSK, $\{P_i\}_{i \in [1,L]}$)

---

In the above algorithm, it is also possible to use $$ct_{out} \leftarrow ChainPBS(\{ct_{in,j}\}_j, BSK, KSK, \{P_i\}_{i \in [1,L]})$$

instead of Tree-PBS. Interestingly, the Tree-PBS and ChainPBS invocations as used in LP-WoP-PBS can also be improved by replacing their use of a known PBS by uses of a WoP-PBS described herein, e.g., WoP-PBS 415, 416, 417, 518 or WoP-PBSmanyLUT 619. This relaxes the need to call Tree-PBS or ChainPBS with ciphertexts having a bit of padding, thus providing the advantages discussed for the WoP-PBS also in this case.

FIG. 8*a* schematically shows an example of an embodiment of a method of computing an AND gate on one or more LWE-encrypted binary input values.

It is known per se in the TFHE setting to evaluate Boolean circuits by performing a linear combination followed by a programmable bootstrapping for respective gate. The inventors realized that, using a multiplication operation of LWE-encrypted ciphertexts as described herein, that does not require the ciphertexts to have a bit of padding, it is possible to improve this evaluation of Boolean circuits.

The example shows a first LWE-encrypted bit 860 and a second LWE-encrypted bit 861. Interestingly, the bits are encoded as 0 if b=0 and q/2 if b=1, where q is the modulus of the LWE encryption. As shown in the figure, using this encoding, an AND gate can be computed over the LWE-encrypted bits 860-861 more efficiently as a homomorphic multiplication of the two values, e.g., using any one of MultLWE units 207-212, e.g., $$ct_1 \text{ AND } ct_2 = MultLWE(ct_1, ct_2, RLK, KSK)$$

Interestingly, this encoding enabled by the availability of a MultLWE operation without padding, enables other binary operations to be performed without a bootstrapping, e.g., a XOR operation may be computed as $ct_1$ XOR $ct_2 = ct_1 + ct_2$, and/or a NOT may be computed by adding q/2. Other Boolean gates may be implemented in terms of these elementary gates, e.g.:

$$ct_1 \text{ NAND } ct_2 = NOT(ct_1 \text{ AND } ct_2)$$

$$ct_1 \text{ OR } ct_2 = ct_1 \text{ XOR } ct_2 \text{ XOR } (ct_1 \text{ AND } ct_2)$$

Thus, evaluation of a binary circuit is made more efficient by the availability of a MultLWE operation as described herein.

Although operations such as XOR or NOT may not require a programmable bootstrapping, some of them may increase noise, e.g., XOR. Accordingly, depending on the computation, a noise reduction may be needed. Interestingly, in this case, it is possible to reduce the noise using a programmable bootstrapping particularly efficiently. Two possible ways of doing this are discussed with respect to FIG. 8*b* and FIG. 8*c*.

In FIG. 8*b*, noise in an LWE-encrypted bit 862 is reduced by performing a programmable bootstrapping using a Gen-PBS unit 813, e.g., GenPBS 313 or 313', wherein the GLWE-encrypted monomial for the binary value 862 is multiplied by a test polynomial such that the programmable bootstrapping results in an LWE-encrypted bootstrapping output 863 equal to plus or minus a quarter of the LWE modulus. By adding 829 a quarter of the LWE modulus 864 (e.g., a trivial encryption of that value), an encryption 865 of the same bit as encryption 862 may be obtained with an amount of noise that is independent of the amount of noise in encryption 862, so noise may be reduced. This may be implemented as $$ct_{out} \leftarrow GenPBS\left(ct_{in}, BSK, P_1 \cdot X^{N/2}, \Delta_{out} = \frac{q}{4}, \aleph = 0, \vartheta = 0\right) + \underbrace{\left(0, \frac{q}{4}\right)}_{trivialLWE}.$$

Effectively, the function $$P_1 * X^{N/2} = -\sum_{i=0}^{N/2-1} X^i + \sum_{i=N/2}^{N-1} X^i$$

may be evaluated, so that the sample extraction of the constant term in the programmable bootstrapping gives $$ct_{tmp} = LWE_S(\pm \frac{q}{4}).$$

Then, a trivial LWE of the form $$(0, \frac{q}{4})$$

may be added. The result is a bootstrapping of the input value, since:

$$\begin{cases} \text{if } ct_{tmp} = LWE_S\left(-\frac{q}{4}\right) \text{ then } ct_{tmp} + \left(0, \frac{q}{4}\right) = LWE_S(0) \\ \text{else } if ct_{tmp} = LWE_S\left(\frac{q}{4}\right) \text{ then } ct_{tmp} + \left(0, \frac{q}{4}\right) = LWE_S\left(\frac{q}{2}\right) \end{cases}$$

In FIG. 8*c*, a GenPBS unit 813 is used, e.g., GenPBS 313 or 313', wherein the modulus switching scales the LWE-encrypted binary value 862 such that the programmable bootstrapping results in an LWE-encrypted function output

865' that is equal to zero or half the LWE modulus and that thus directly represents a bootstrapping of the input ciphertext 862. This may be implemented as:

$$ct_{out} \leftarrow GenPBS(ct_{in}, BSK, P_f = \sum_{i=\frac{N}{4}}^{\frac{3N}{4}-1} X^i, \Delta_{out} = \frac{q}{2}, \aleph = -1, \vartheta = 0).$$

Here, another window size is used which may be regard as one bit shifted, e.g., $\vartheta=-1$ and $$\Delta_{out} = \frac{q}{2}.$$

In this case, it may be observed that the sign does not impact the value of the encoded bit, e.g., $$\pm 0 = 0 \text{ and } \pm \frac{q}{2} = \frac{q}{2}.$$

Then, evaluating a GenPBS with the function $$P_f = \sum_{i=\frac{N}{4}}^{\frac{3N}{4}-1} X^i \text{ and } \Delta_{out} = \frac{q}{2},$$

may result in either 0 or $$\pm \frac{q}{2},$$

as desired.

FIG. 9 (showing AddMSB1 unit 923 and MulMSB2 unit 925) schematically shows an example of an embodiment of a method of adding or multiplying LWE-encrypted input values and keeping a most significant part using AddMSB1 unit 923 or MulMSB1 unit 925.

These units may be used to efficiently evaluate an arithmetic circuit on LWE-encrypted integers modulo $2^p$, $p>1$. Such an arithmetic circuit may include any combination of the following operators acting on encrypted values $m_1$, $m_2 \in \{0, 2^p-1\}$:

opposite of the LSB: $m_1 \mapsto -m_1 \bmod 2^p$
addition and keeping the LSB: $(m_1, m_2) \mapsto (m_1+m_2) \bmod 2^p$ (AddLSB)
addition and keeping the MSB:

$$(m_1, m_2) \mapsto \left\lfloor \frac{m_1 + m_2}{2^p} \right\rfloor \bmod 2^p (AddMSB)$$

multiplication and keeping the LSB: $(m_1, m_2) \mapsto (m_1 \cdot m_2) \bmod 2^p$ (MulLSB)
multiplication and keeping the MSB:

$$(m_1, m_2) \mapsto \left\lfloor \frac{m_1 \cdot m_2}{2^p} \right\rfloor \bmod 2^p (MulMSB)$$

In an embodiment, the arithmetic circuit may include one or more opposite operations. An opposite may be computed of an LWE-encrypted ciphertext by performing a homomorphic negation.

In an embodiment, the arithmetic circuit may include one or more "AddLSB" operations. An AddMSB operation may be performed on LWE-encrypted ciphertexts as a homomorphic addition.

In an embodiment, the arithmetic circuit may include one or more "MulLSB" operations. A MulMSB operation may be performed on LWE-encrypted ciphertexts by performing an LWE-encrypted multiplication, e.g., using any MultLWE 207-212 of FIG. 2c or by using another technique for LWE-encrypted multiplication.

Since some of the operations add noise, e.g., homomorphic additions, it may be needed to perform a noise reduction. For this, any WoPPBS with the identity function can be used, e.g., WoPPBS 415, 416, 518 or LP-WoP-BS 721 in particular due to its efficiency.

In an embodiment, the arithmetic circuit may include one or more AddMSB operations and/or one or more MulMSB operations. FIG. 9 shows an example of performing an AddMSB operation or a MulMSB operation on a first LWE-encrypted input value 960 and a second LWE-encrypted input value 961, using an AddMSB1 unit 923 or a MulMSB1 unit 925, respectively.

As shown in FIG. 9, a WoP-PBS unit 915-919 may be used, e.g., WoP-PBS 415, 416, 417, 518, or WoP-PBSmanyLUT 619 to apply an identity function to the LWE-encrypted input values 960, 961, to obtain LWE-encrypted padded input values 962, 963 to which p bits of padding are added. This step is optional and is not needed for example if the bits of padding are already present due to an earlier operation.

For AddMSB1 unit 923, given the LWE-encrypted padded input values 962, 963, an addition operation AddLWE, 929 may be applied to obtain a LWE-encrypted sum 964 of the padded input values 962, 963. For MulMSB1 unit 925, a multiplication operation MultLWE 907, 908 may be applied to obtain an LWE-encrypted product 964 of the padded input values 962, 963. For example, MultLWE unit 207 or 208, or any other technique for multiplying LWE-encrypted input values, may be used.

Generally, given the LWE-encrypted sum or product 964, the desired output 967 of unit 923, 925 may correspond to the p most significant bits of this result. Generally, this output may be obtained by using the programmable bootstrapping 915-919 to apply an identity function to the LWE-encrypted sum or product, wherein the modulus switching of the programmable bootstrapping scales the LWE-encrypted sum or product 964 such that the programmable bootstrapping results in an LWE-encrypted least significant part 965 of the sum or product. The LWE-encrypted least significant part 965 may then be subtracted, in a SubLWE operation 928, from the LWE-encrypted sum or product 966, to obtain the LWE-encrypted most significant part 967 of the sum or product.

Optionally, key switchings may be performed to the input 964 of WoP-PBS 915-919 and/or to the output of SubLWE 928. These are not shown in the figure for simplicity and can also be performed as part of relinearization instead. For AddMSB1, instead of extracting and subtracting the least significant part, it may for some parameters be possible to use the WoP-PBS 915-919 to directly extract the most significant part 967.

For example, AddMSB1 unit 923 may be implemented as follows:

---

Algorithm (AddMSB1 923). $ct_{out} \leftarrow AddMSB_1(ct_1, ct_2, BSK, KSK)$

Context:
$$\begin{cases} \Delta = \dfrac{q}{2^p} \\ 0 \le m_1, m_2 < 2^p \\ m = \left\lfloor \dfrac{m_1 + m_2}{2^p} \right\rfloor \bmod 2^p \\ Id: \text{identity function} \end{cases}$$

Input:
$$\begin{cases} ct_1 = LWE_s(m_1 \cdot \Delta) \\ ct_2 = LWE_s(m_2 \cdot \Delta) \\ BSK = \left\{ BSK_i = GGSW_{S'}^{(\mathcal{B},\ell)}(s_i) \right\}_{1 \le i \le n} \\ KSK: \text{as needed for } PublicKS \end{cases}$$

Output: $ct_{out} = LWE_s(m \cdot \Delta)$
// add p bits of padding
$ct_{1'} \leftarrow$ WoP - PBS($ct_1$, BSK, RLK, $P_{Id_p}$, $\Delta/2^p$, 0, 0)
$ct_{2'} \leftarrow$ WoP - PBS($ct_2$, BSK, RLK, $P_{Id_p}$, $\Delta/2^p$, 0, 0)
// compute the addition
$ct' \leftarrow ct_{1'} + ct_{2'}$
// key switch
$ct'' \leftarrow$ PublicKS($ct'$, KSK, $x \mapsto x$)
// extract the LSB
$ct'_{LSB} \leftarrow$ WoP - PBS($ct''$, BSK, RLK, $P_{Id_p}$, $\Delta/2^p$, p, 0)
// subtract the LSB to only keep the MSB
$ct \leftarrow ct' - ct'_{LSB}$
// key switch
$ct_{out} \leftarrow$ PublicKS($ct$, KSK, $x \mapsto x$)

---

Similarly, MulMSB1 unit 925 may be implemented as follows:

---

Algorithm (MulMSB1 925). $ct_{out} \leftarrow MulMSB_1(ct_1, ct_2, BSK, KSK, RLK)$ Context:
$$\begin{cases} \Delta = \dfrac{q}{2^p} \\ 0 \le m_1, m_2 < 2^p \\ m = \left\lfloor \dfrac{m_1 \cdot m_2}{2^p} \right\rfloor \bmod 2^p \\ Id: \text{identity function} \end{cases}$$

Input:
$$\begin{cases} ct_1 = LWE_s(m_1 \cdot \Delta) \\ ct_2 = LWE_s(m_2 \cdot \Delta) \\ BSK = \left\{ BSK_i = GGSW_{S'}^{(\mathcal{B},\ell)}(s_i) \right\}_{1 \le i \le n} \\ KSK: \text{as needed for } PrivateKS \\ RLK: \text{as needed for } MultLWE \end{cases}$$

Output: $ct_{out} = LWE_s(m \cdot \Delta)$
// add p bits of padding
$ct_{1'} \leftarrow$ WoP - PBS($ct_1$, BSK, RLK, $P_{Id_p}$, $\Delta/2^p$, 0, 0)
$ct_{2'} \leftarrow$ WoP - PBS($ct_2$, BSK, RLK, $P_{Id_p}$, $\Delta/2^p$, 0, 0)
// compute the homomorphic multiplication
$ct' \leftarrow$ MultLWE($ct_{1'}$, $ct_{2'}$, RLK)
// key switch
$ct'' \leftarrow$ PublicKS($ct'$, KSK, $x \mapsto x$)
// extract the LSB
$ct'_{LSB} \leftarrow$ WoP - PBS($ct''$, BSK, RLK, $P_{Id_p}$, $\Delta/2^p$, p, 0)
// subtract the LSB to only keep the MSB
$ct \leftarrow ct' - ct'_{LSB}$
// key switch
$ct_{out} \leftarrow$ PrivateKS($ct$, KSK)

---

Interestingly, the inventors also devised an alternative way of implementing the AddMSB and MulMSB operations using an improved version of the algorithm $$ct_{out} \leftarrow \text{Tree} - PBS\big(\{ct_{in, j}\}_j, BSK, KSK, \{P_i\}_{i \in [1, L]}\big)$$

of A. Guimarães et al., "Revisiting the functional bootstrap in TFHE", as also discussed with respect to FIG. 7c. This technique allows to compute a function on one or more ciphertexts using a programmable bootstrapping. These techniques use a known programmable bootstrapping and so have the limitation that their inputs need to have a bit of padding. By using a WoPPBS as described herein, e.g., WoPPBS 415, 416, 417 or 518, these techniques may be applied also to ciphertexts without a bit of padding. This improved version of the above algorithm may be denoted as:

$$ct_{out} \leftarrow \text{Tree} - WoP - PBS\big(\{ct_{in, j}\}_j, BSK, KSK, \{P_i\}_{i \in [1, L]}\big).$$

Although this alternative is less efficient than AddMSB1 and MulMSB1 discussed above, it has the advantage that it can be applied also to inputs with relatively large amounts of noise and results in values that have relatively little noise, due to it using programmable bootstrappings. Therefore it can be advantageous in settings where the inputs are too noisy to apply AddMSB1 or MulMSB1, or where a less noisy result is desired.

Using this algorithm, AddMSB can be implemented as follows:

---

Algorithm (AddMSB2). $ct_{out} \leftarrow AddMSB_2(ct_1, ct_2, BSK, KSK)$

Context:
$$\begin{cases} \Delta = \dfrac{q}{2^p} \\ 0 \le m_1, m_2 < 2^p \\ m = \left\lfloor \dfrac{m_1 \cdot m_2}{2^p} \right\rfloor \bmod 2^p \text{ and } \{P_i\}_{i \in [1, 2^p]} \text{ are chosen} \\ \text{accordingly} \\ s = (s_1, \dots, s_n) \\ s' = (s_{0'}, \dots, s'_{k*N}) s' \text{ is the coefficients of } S' \text{ viewed} \\ \text{as an } LWE \text{ secret key} \end{cases}$$

Input:
$$\begin{cases} ct_1 = LWE_s(m_1 \cdot \Delta) \\ ct_2 = LWE_s(m_2 \cdot \Delta) \\ BSK = \left\{ BSK_i = GGSW_{S'}^{(\mathcal{B},\ell)}(s_i) \right\}_{1 \le i \le n} \\ KSK: \text{key switching key from } s' \text{ to } s \end{cases}$$

Output: $ct_{out} = LWE_s(m \cdot \Delta)$
// compute a 2D WoP-PBS
$ct \leftarrow$ Tree - WoP - PBS($\{ct_1, ct_2\}$, BSK, KSK, $\{P_i\}_{i \in [1, 2^p]}$)
// key switch
$ct_{out} \leftarrow$ PublicKS($ct$, KSK, $x \mapsto x$)

---

Similarly, MulMSB may be implemented as follows:

---

Algorithm (MulMSB2). $ct_{out} \leftarrow MulMSB_2(ct_1, ct_2, BSK, KSK)$

Context:
$$\begin{cases} \Delta = \dfrac{q}{2^p} \\ 0 \le m_1, m_2 < 2^p \\ m = \left\lfloor \dfrac{m_1 \cdot m_2}{2^p} \right\rfloor \bmod 2^p \text{ and } \{P_i\}_{i \in [1, 2^p]} \text{ are chosen} \\ \text{accordingly} \\ s = (s_1, \dots, s_n) \\ s' = (s_{0'}, \dots, s'_{k*N}) \\ s' = (s_{0'}, \dots, s'_{k*N}) s' \text{ is the coefficients of } S' \text{ viewed} \\ \text{as an } LWE \text{ secret key} \end{cases}$$

-continued

---

Algorithm (MulMSB2). $ct_{out} \leftarrow$ MulMSB$_2$(ct$_1$, ct$_2$, BSK, KSK)

---

Input: $\begin{cases} ct_1 = LWE_s(m_1 \cdot \Delta) \\ ct_2 = LWE_s(m_2 \cdot \Delta) \\ BSK = \left\{ BSK_i = GGSW_{S'}^{(\mathcal{B},\ell)}(s_i) \right\}_{1 \leq i \leq n} \\ KSK \text{: key switching key from } s' \text{ to } s \end{cases}$ Output: $ct_{out} = LWE_s(m \cdot \Delta)$
// compute a 2D WoP-PBS
ct $\leftarrow$ Tree - WoP - PBS({ct$_1$, ct$_2$}, BSK, KSK, {P$_i$}$_{i \in [1, 2^{p}]}$)
// key switch
$ct_{out} \leftarrow$ PublicKS(ct, KSK, x $\mapsto$ x)

---

FIG. 11 schematically shows an example of an embodiment of a method 1200 of performing a computation on LWE-encrypted values. An LWE-encrypted value may be an encryption of a value based on a Learning With Errors problem. The encryption may support a programmable bootstrapping operation. The programmable bootstrapping operation may evaluate an LWE decryption in an exponent of a GLWE-encrypted monomial. A GLWE-encrypted polynomial may be an encryption of a polynomial based on a Generalized Learning With Errors problem.

The method may comprise obtaining 1210 a set of auxiliary keys for performing the computation. The auxiliary keys may not allow to decrypt the LWE-encrypted values. The auxiliary keys may comprise a set of bootstrapping keys for performing the programmable bootstrapping operation.

The method may comprise computing 1220 an LWE-encrypted product value based on one or more LWE-encrypted input values.

The computing 1220 may comprise applying 1221 a cryptographic key switching operation to the set of LWE-encrypted input values to determine one or more GLWE-encrypted input polynomials. A coefficient of an input polynomial may be a linear combination of the set of input values.

The computing 1220 may comprise applying 1222 an encrypted polynomial multiplication based on the one or more GLWE-encrypted input polynomials to obtain a GLWE-encrypted output polynomial.

The computing 1220 may comprise applying 1223 a cryptographic sample extraction operation based on the GLWE-encrypted output polynomial, thereby obtaining the LWE-encrypted product value as an encryption of a polynomial coefficient.

Many different ways of executing the method 1200 are possible, as will be apparent to a person skilled in the art. For example, the order of the steps can be performed in the shown order, but the order of the steps can be varied or some steps may be executed in parallel. Moreover, in between steps other method steps may be inserted. The inserted steps may represent refinements of the method such as described herein, or may be unrelated to the method. For example, some steps may be executed, at least partially, in parallel. Moreover, a given step may not have finished completely before a next step is started.

Embodiments of the methods may be executed using software, which comprises instructions for causing a processor system to perform method 1200. Software may only include those steps taken by a particular sub-entity of the system. The software may be stored in a suitable storage medium, such as a hard disk, a floppy, a memory, an optical disc, etc. The software may be sent as a signal along a wire, or wireless, or using a data network, e.g., the Internet. The software may be made available for download and/or for remote usage on a server. Embodiments of the method may be executed using a bitstream arranged to configure programmable logic, e.g., a field-programmable gate array (FPGA), to perform the method.

It will be appreciated that the presently disclosed subject matter also extends to computer programs, particularly computer programs on or in a carrier, adapted for putting the presently disclosed subject matter into practice. The program may be in the form of source code, object code, a code intermediate source, and object code such as partially compiled form, or in any other form suitable for use in the implementation of an embodiment of the method. An embodiment relating to a computer program product comprises computer executable instructions corresponding to each of the processing steps of at least one of the methods set forth. These instructions may be subdivided into subroutines and/or be stored in one or more files that may be linked statically or dynamically. Another embodiment relating to a computer program product comprises computer executable instructions corresponding to each of the devices, units and/or parts of at least one of the systems and/or products set forth.

Typically, the devices described herein, e.g., in FIG. 1*a*-1*b*, comprise one or more microprocessors which executes appropriate software stored at the system; for example, that software may have been downloaded and/or stored in a corresponding memory, e.g., a volatile memory such as RAM or a non-volatile memory such as Flash. Alternatively, the systems may, in whole or in part, be implemented in programmable logic, e.g., as field-programmable gate array (FPGA). The systems may be implemented, in whole or in part, as a so-called application-specific integrated circuit (ASIC), e.g., an integrated circuit (IC) customized for their particular use. For example, the circuits may be implemented in CMOS, e.g., using a hardware description language such as Verilog, VHDL, etc. In particular, the systems may comprise circuits for the evaluation of cryptographic primitives.

A processor circuit may be implemented in a distributed fashion, e.g., as multiple sub-processor circuits. A storage may be distributed over multiple distributed sub-storages. Part or all of the memory may be an electronic memory, magnetic memory, etc. For example, the storage may have volatile and a non-volatile part. Part of the storage may be read-only.

FIG. 11*b* shows a computer readable medium 1000 having a writable part 1010, and a computer readable medium 1001 also having a writable part. Computer readable medium 1000 is shown in the form of an optically readable medium. Computer readable medium 1001 is shown in the form of an electronic memory, in this case a memory card. Computer readable medium 1000 and 1001 may store data 1020 wherein the data may indicate instructions, which when executed by a processor system, cause a processor system to perform an embodiment of a method of performing a computation on LWE-encrypted values, according to an embodiment.

The data 1020 may be embodied on the computer readable medium 1000 as physical marks or by magnetization of the computer readable medium 1000. However, any other suitable embodiment is conceivable as well. Furthermore, it will be appreciated that, although the computer readable medium 1000 is shown here as an optical disc, the computer readable medium 1000 may be any suitable computer readable medium, such as a hard disk, solid state memory, flash memory, etc., and may be non-recordable or recordable. The computer program 1020 comprises instructions for causing a processor system to perform said method of performing a computation on LWE-encrypted values.

FIG. 11*c* shows in a schematic representation of a processor system 1140 according to an embodiment of a device for performing a computation on LWE-encrypted values. The processor system comprises one or more integrated circuits 1110. The architecture of the one or more integrated circuits 1110 is schematically shown in FIG. 6*b*. Circuit 1110 comprises a processing unit 1120, e.g., a CPU, for running computer program components to execute a method according to an embodiment and/or implement its modules or units. Circuit 1110 comprises a memory 1122 for storing programming code, data, etc. Part of memory 1122 may be read-only. Circuit 1110 may comprise a communication element 1126, e.g., an antenna, connectors or both, and the like. Circuit 1110 may comprise a dedicated integrated circuit 1124 for performing part or all of the processing defined in the method. Processor 1120, memory 1122, dedicated IC 1124 and communication element 1126 may be connected to each other via an interconnect 1130, say a bus. The processor system 1110 may be arranged for contact and/or contact-less communication, using an antenna and/or connectors, respectively.

For example, in an embodiment, processor system 1140, e.g., the device for performing the computation on LWE-encrypted values, may comprise a processor circuit and a memory circuit, the processor being arranged to execute software stored in the memory circuit. For example, the processor circuit may be an Intel Core i7 processor, ARM Cortex-R8, etc. In an embodiment, the processor circuit may be ARM Cortex M0. The memory circuit may be an ROM circuit, or a non-volatile memory, e.g., a flash memory. The memory circuit may be a volatile memory, e.g., an SRAM memory. In the latter case, the device may comprise a non-volatile software interface, e.g., a hard drive, a network interface, etc., arranged for providing the software.

While device 1110 is shown as including one of each described component, the various components may be duplicated in various embodiments. For example, the processor 1120 may include multiple microprocessors that are configured to independently execute the methods described herein or are configured to perform steps or subroutines of the methods described herein such that the multiple processors cooperate to achieve the functionality described herein. Further, where the device 1110 is implemented in a cloud computing system, the various hardware components may belong to separate physical systems. For example, the processor 1120 may include a first processor in a first server and a second processor in a second server.

It should be noted that the above-mentioned embodiments illustrate rather than limit the presently disclosed subject matter, and that those skilled in the art will be able to design many alternative embodiments.

In the claims, any reference signs placed between parentheses shall not be construed as limiting the claim. Use of the verb 'comprise' and its conjugations does not exclude the presence of elements or steps other than those stated in a claim. The article 'a' or 'an' preceding an element does not exclude the presence of a plurality of such elements. Expressions such as "at least one of" when preceding a list of elements represent a selection of all or of any subset of elements from the list. For example, the expression, "at least one of A, B, and C" should be understood as including only A, only B, only C, both A and B, both A and C, both B and C, or all of A, B, and C. The presently disclosed subject matter may be implemented by hardware comprising several distinct elements, and by a suitably programmed computer. In the device claim enumerating several parts, several of these parts may be embodied by one and the same item of hardware. The mere fact that certain measures are recited in mutually different dependent claims does not indicate that a combination of these measures cannot be used to advantage.

In the claims references in parentheses refer to reference signs in drawings of exemplifying embodiments or to formulas of embodiments, thus increasing the intelligibility of the claim. These references shall not be construed as limiting the claim.

The invention claimed is:

1. A computer-implemented method of performing a computation on LWE-encrypted values, wherein an LWE-encrypted value is an encryption of a value based on a Learning With Errors problem, wherein the encryption supports a programmable bootstrapping operation, wherein the programmable bootstrapping operation evaluates an LWE decryption in an exponent of a GLWE-encrypted monomial, wherein a GLWE-encrypted polynomial is an encryption of a polynomial based on a Generalized Learning With Errors problem, the method comprising:

obtaining a set of auxiliary keys for performing the computation, wherein the auxiliary keys do not allow to decrypt the LWE-encrypted values, wherein the auxiliary keys comprise a set of bootstrapping keys for performing the programmable bootstrapping operation;

computing an LWE-encrypted product value based on one or more LWE-encrypted input values by:

applying a cryptographic key switching operation to the set of LWE-encrypted input values to determine one or more GLWE-encrypted input polynomials, wherein a coefficient of an input polynomial is a linear combination of the set of input values;

applying an encrypted polynomial multiplication based on the one or more GLWE-encrypted input polynomials to obtain a GLWE-encrypted output polynomial;

applying a cryptographic sample extraction operation based on the GLWE-encrypted output polynomial, thereby obtaining the LWE-encrypted product value as an encryption of a polynomial coefficient.

2. The method of claim 1, wherein:

the set of auxiliary keys further comprises a relinearization key, wherein a GLWE-encrypted polynomial is a degree-1 polynomial in a secret key, and wherein the relinearization key is arranged for transforming a degree-2 polynomial in the secret key to a degree-1 polynomial in the secret key;

applying the encrypted polynomial multiplication comprises computing a polynomial product of respective GLWE-encrypted polynomials seen as respective polynomials in the secret key; and transforming the polynomial product to a degree-1 polynomial in the secret key using the relinearization key.

3. The method of claim 1, wherein the LWE-encrypted input values comprise LWE-encrypted first and second values, wherein the GLWE-encrypted input polynomials comprise GLWE-encrypted first and second input polynomials having the first and second values as coefficients, respectively; wherein applying the encrypted polynomial multiplication comprises computing a GLWE-encrypted product of the first and second input polynomials; and wherein applying the cryptographic sample extraction operation comprises extracting an LWE-encrypted product of the first and second values as a coefficient of the GLWE-encrypted output polynomial.

4. The method of claim 1, wherein the LWE-encrypted input values comprise a first set of LWE-encrypted values and a second set of LWE-encrypted values, wherein the GLWE-encrypted input polynomials comprise GLWE-encrypted first and second input polynomials having the first set of values and the second values as coefficients, respectively; wherein applying the encrypted polynomial multiplication comprises computing a GLWE-encrypted product of the first and second input polynomials; and wherein applying the cryptographic sample extraction operation comprises extracting an LWE-encrypted inner product as a coefficient of the GLWE-encrypted output polynomial.

5. The method of claim 1, further comprising applying the programmable bootstrapping operation to the LWE-encrypted product value.

6. The method of claim 1, comprising:

using the programmable bootstrapping operation to apply a function to an LWE-encrypted input value, wherein a modulus switching scales the LWE-encrypted input value such that the programmable bootstrapping results in an LWE-encrypted function output correct up to a sign;

using the programmable bootstrapping operation to apply a constant function to the LWE-encrypted input value, resulting in an LWE-encrypted constant output correct up to the sign;

obtaining an LWE-encrypted corrected function output by correcting the programmable bootstrapping of the function according to the LWE-encrypted constant output correct up to the sign.

7. The method of claim 6, wherein the correcting comprises computing the LWE-encrypted product value as an encryption of a product of the function output correct up to the sign and the constant output correct up to the sign.

8. The method of claim 6, wherein the correcting comprises converting the LWE-encrypted constant output correct up to the sign to a GLWE-encrypted constant polynomial correct up to the sign and multiplying the GLWE-encrypted monomial of the programmable bootstrapping of the function by the GLWE-encrypted constant polynomial.

9. The method of claim 6, wherein the method further comprises using the programmable bootstrapping to obtain an LWE-encrypted further function output correct up to the sign of a further function, and using the LWE-encrypted constant output correct up to the sign to select and correct the LWE-encrypted function output correct up to the sign or the LWE-encrypted further function output correct up to the sign.

10. The method of claim 6, wherein the programmable bootstrapping to apply the function and the programmable bootstrapping to apply the constant function are performed by multiplying a GLWE-encrypted monomial for the input value by respective test polynomials for the function and the constant function.

11. The method of claim 6, comprising using the programmable bootstrapping operation to apply multiple respective functions to the LWE-encrypted input value by applying a test polynomial representing function outputs of the multiple respective functions, and extracting respective polynomial coefficients.

12. The method of claim 6, comprising one or more times of:

applying an identity function to the LWE-encrypted input value to obtain an LWE-encrypted function output, wherein a modulus switching scales the LWE-encrypted input value such that the LWE-encrypted function output encrypts a least significant part of the input value, and subtracting the LWE-encrypted corrected function output from the LWE-encrypted input value.

13. The method of claim 12, further comprising adding together respective extracted LWE-encrypted most significant parts to obtain an LWE-encrypted output value representing a bootstrapping of the input value.

14. The method of claim 12, further comprising applying an overall function to the LWE-encrypted input value by applying respective programmable bootstrapping operations to the respective extracted LWE-encrypted most significant parts.

15. The method of claim 1, comprising evaluating a binary circuit on one or more LWE-encrypted binary input values, wherein the evaluating comprises computing one or more respective LWE-encrypted AND gate outputs by computing respective LWE-encrypted product values, and wherein the evaluation optionally comprises applying the programmable bootstrapping operation to reduce a noise in an LWE-encrypted binary value.

16. The method of claim 15, wherein the binary value is represented as zero or half the modulus of the LWE encryption, and wherein applying the programmable bootstrapping to the LWE-encrypted binary value comprises:

multiplying the GLWE-encrypted monomial for the binary value by a test polynomial such that the programmable bootstrapping results in an LWE-encrypted bootstrapping output equal to plus or minus a quarter of the LWE modulus, and adding a quarter of the LWE modulus; or scaling the LWE-encrypted binary value such that the programmable bootstrapping results in an LWE-encrypted function output equal to zero or half the LWE modulus.

17. The method of any previous claim 1, comprising:

computing an LWE-encrypted sum or product of a first and a second LWE-encrypted input value;

using the programmable bootstrapping to apply an identity function to the LWE-encrypted sum or product, wherein a modulus switching scales the LWE-encrypted sum or product such that the programmable bootstrapping results in an LWE-encrypted least significant part of the sum or product;

subtracting the LWE-encrypted least significant part from the LWE-encrypted sum or product.

18. A device for performing a computation on LWE-encrypted values, wherein an LWE-encrypted value is an encryption of a value based on a Learning With Errors problem, wherein the encryption supports a programmable bootstrapping operation, wherein the programmable bootstrapping operation evaluates an LWE decryption in an exponent of a GLWE-encrypted monomial, wherein a GLWE-encrypted polynomial is an encryption of a polynomial based on a Generalized Learning With Errors problem, the device comprising:

a storage for storing a set of auxiliary keys for performing the computation, wherein the auxiliary keys do not allow to decrypt the LWE-encrypted values, wherein the auxiliary keys comprise a set of bootstrapping keys for performing the programmable bootstrapping operation;

a processor system configured to compute an LWE-encrypted product value based on one or more LWE-encrypted input values by:

applying a cryptographic key switching operation to the set of LWE-encrypted input values to determine one or more GLWE-encrypted input polynomials, wherein a coefficient of an input polynomial is a linear combination of the set of input values;

applying an encrypted polynomial multiplication based on the one or more GLWE-encrypted input polynomials to obtain a GLWE-encrypted output polynomial;

applying a cryptographic sample extraction operation based on the GLWE-encrypted output polynomial, thereby obtaining the LWE-encrypted product value as an encryption of a polynomial coefficient.

19. A non-transitory computer readable medium comprising data representing instructions which, when executed by a processor system, cause the processor system to perform the method according to claim 1.

\* \* \* \* \*